US012663540B2

(12) United States Patent (10) Patent No.: US 12,663,540 B2
Takahata et al. (45) Date of Patent: Jun. 23, 2026

(54) OBSTACLE DETECTION DEVICE, OBSTACLE DETECTION METHOD, AND COMPUTER-READABLE MEDIUM

(71) Applicant: Panasonic Automotive Systems Co., Ltd., Kanagawa (JP)

(72) Inventors: Atsushi Takahata, Osaka (JP); Seisuke Yamada, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 29 days.

(21) Appl. No.: 18/826,740

(22) Filed: Sep. 6, 2024

(65) Prior Publication Data

US 2024/0427016 A1 Dec. 26, 2024

Related U.S. Application Data

(63) Continuation of application No. PCT/JP2022/046099, filed on Dec. 14, 2022.

(30) Foreign Application Priority Data

Mar. 11, 2022 (JP) ................................. 2022-038513

(51) Int. Cl.
G01S 15/931 (2020.01)
G01S 7/534 (2006.01)

(52) U.S. Cl.
CPC ............ G01S 15/931 (2013.01); G01S 7/534 (2013.01); *G01S 2015/938* (2013.01)

(58) Field of Classification Search
None
See application file for complete search history.

(56) References Cited

U.S. PATENT DOCUMENTS 8,233,153 B2 * 7/2012 Knuttel .............. G01B 9/02007
356/498
11,214,143 B2 * 1/2022 Kim ................... B60K 31/0008
(Continued)

FOREIGN PATENT DOCUMENTS

DE 102011109830 A 2/2013
DE 102009046000 B4 * 10/2013 ............. G01S 13/87
(Continued)

OTHER PUBLICATIONS

International Search Report, dated Feb. 7, 2023, for International Patent Application No. PCTJP2022046099. (2 pages) (English Translation).

*Primary Examiner* — Fekadeselassie Girma
(74) *Attorney, Agent, or Firm* — Seed Intellectual Property Law Group LLP

(57) ABSTRACT

An obstacle detection device according to the present disclosure includes: a transmission circuit, which, in operation, transmits a transmitted wave signal subjected to frequency modulation; a reception circuit, which, in operation, receives a signal externally; an object detection circuit, which, in operation, detects an object existing in a wave transmission direction of the transmitted wave signal, based on a reflected wave of the transmitted wave signal received by the reception circuit; an interference detection circuit, which, in operation, detects, as interference, another transmitted wave signal transmitted from another transmission circuit different from the transmission circuit, based on the signal received by the reception circuit; and a determination circuit, which, in operation, determines a frequency modulation pattern to be applied to the transmitted wave signal and a transmission timing of the transmitted wave signal, based on detection results of the object detection circuit and the interference detection circuit.

15 Claims, 39 Drawing Sheets

(56)     References Cited

U.S. PATENT DOCUMENTS

| | | | | | |
|---|---|---|---|---|---|
| 11,754,668 | B2 * | 9/2023 | Gao | .................. | G01S 13/38 |
| | | | | | 342/200 |
| 11,899,126 | B2 * | 2/2024 | Maher | .............. | G01S 7/028 |
| 12,013,478 | B2 * | 6/2024 | Li | .................... | G01S 7/006 |
| 2003/0006930 | A1 * | 1/2003 | Lodwig | .......... | G01S 13/878 |
| | | | | | 342/146 |
| 2006/0181448 | A1 * | 8/2006 | Natsume | ........ | G01S 7/36 |
| | | | | | 342/111 |
| 2007/0188373 | A1 * | 8/2007 | Shirakawa | ...... | G01S 13/931 |
| | | | | | 342/159 |
| 2007/0194878 | A1 * | 8/2007 | Touge | .......... | G01S 13/0209 |
| | | | | | 340/5.2 |
| 2007/0200747 | A1 * | 8/2007 | Okai | ............ | G01S 7/0235 |
| | | | | | 342/159 |
| 2021/0302574 | A1 * | 9/2021 | Sugae | .......... | G01S 7/524 |
| 2022/0191662 | A1 * | 6/2022 | Cheraghi | ...... | H04W 4/48 |
| 2022/0291327 | A1 * | 9/2022 | Gulati | ......... | H04W 76/15 |
| 2023/0300805 | A1 * | 9/2023 | Li | .............. | H04W 72/0446 |
| | | | | | 370/329 |

FOREIGN PATENT DOCUMENTS

| | | | | | |
|---|---|---|---|---|---|
| JP | 2007218690 | A | | 8/2007 | |
| JP | 2007232498 | A | | 9/2007 | |
| JP | 2020060410 | A | | 4/2020 | |
| JP | 2020165810 | A | | 10/2020 | |
| JP | 2021162347 | A | | 10/2021 | |
| WO | WO-2005038483 | A1 * | 4/2005 | ......... | G01S 13/0209 |

* cited by examiner

FIG.2

FREQUENCY MODULATION A

WAVE TRANSMISSION

INTENSITY [dB]

TIME

FREQUENCY MODULATION A

WAVE RECEPTION

INTENSITY [dB]

TIME

FREQUENCY MODULATION B

WAVE TRANSMISSION

INTENSITY [dB]

TIME

FREQUENCY MODULATION B

WAVE RECEPTION

INTENSITY [dB]

TIME

FIG.9
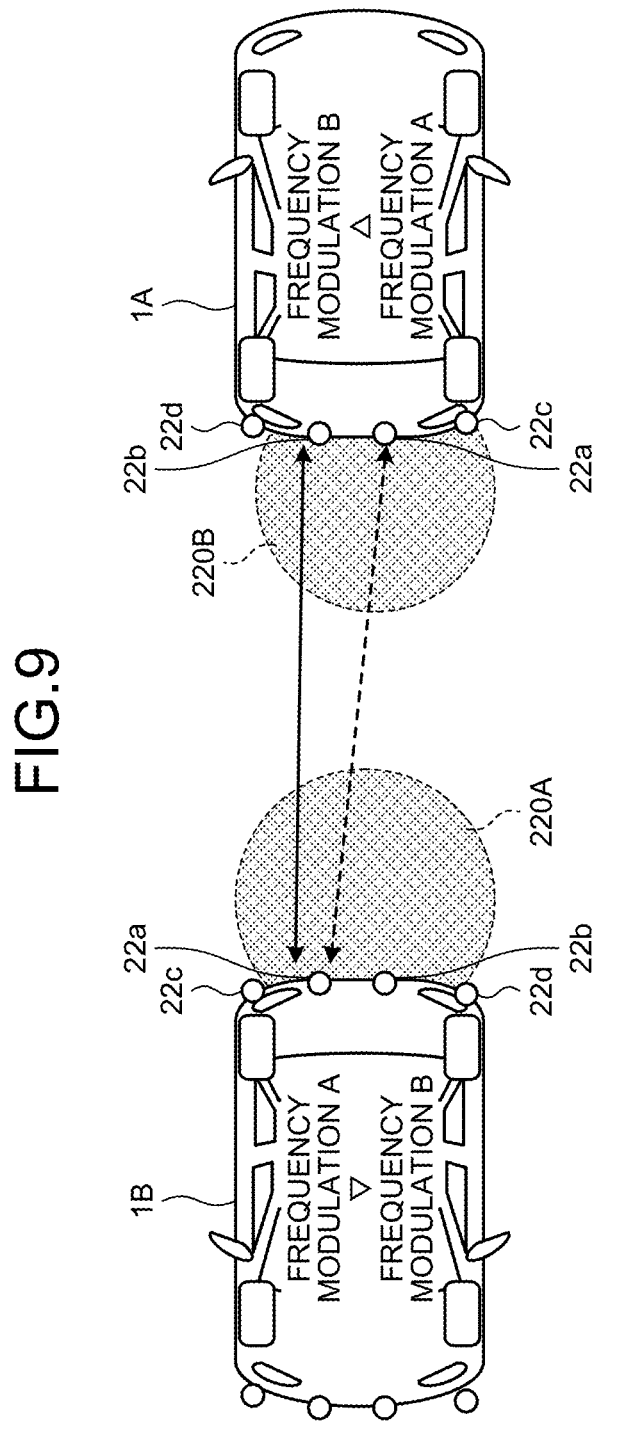
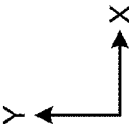

FIG.17A

| No. | INTERFERENCE PATTERN | | | | | | WAVE TRANSMISSION CONDITION | |
|---|---|---|---|---|---|---|---|---|
| | SONAR 22a/22c (FREQUENCY MODULATION A) | | | SONAR 22b/22d (FREQUENCY MODULATION A) | | | SONAR 22a/22c | |
| | SHORT-DISTANCE INTER-FERENCE | OB-STA-CLE | LONG-DISTANCE INTER-FERENCE | SHORT-DISTANCE INTERFERENCE | OBSTA-CLE | LONG-DISTANCE INTERFERENCE | FRE-QUEN-CY MODU-LATION | WAVE TRANS-MISSION TIMING (ACCELERATING OR DELAYING) |
| 1 | A1K NOT DETECT-ED | A1 DE-TECT-ED | A1E NOT DETECT-ED | A2K NOT DETECTED | A1>A2: COMING CLOSER | A2E NOT DETECTED | A | ACCELERATING |
| 2 | | | | A2K NOT DETECTED | A1≤A2: GOING AWAY | A2E NOT DETECTED | B | DELAYING |
| 3 | | | | A2K NOT DETECTED | A2 NOT DETECT-ED | A2E NOT DETECTED | A | ACCELERATING |
| 4 | | | | A2K DETECTED | A1>A2: COMING CLOSER | A2E NOT DETECTED | B | DELAYING |
| 5 | | | | A2K DETECTED | A1≤A2: GOING AWAY | A2E NOT DETECTED | B | DELAYING |
| 6 | | | | A2K DETECTED | A2 NOT DETECT-ED | A2E NOT DETECTED | B | DELAYING |
| 7 | | | | A2K NOT DETECTED | A1>A2: COMING CLOSER | A2E DETECTED | A | ACCELERATING |
| 8 | | | | A2K NOT DETECTED | A1≤A2: GOING AWAY | A2E DETECTED | B | DELAYING |
| 9 | | | | A2K NOT DETECTED | A2 NOT DETECT-ED | A2E DETECTED | B | DELAYING |
| 10 | | | | A2K DETECTED | A1>A2: COMING CLOSER | A2E DETECTED | B | DELAYING |
| 11 | | | | A2K DETECTED | A1≤A2: GOING AWAY | A2E DETECTED | B | DELAYING |
| 12 | | | | A2K DETECTED | A2 NOT DETECT-ED | A2E DETECTED | B | DELAYING |
| 13 | A1K DETECT-ED | | | A1K<A2K: INTERFERENCE OF ANOTHER VEHICLE IS DELAYED | A1>A2: COMING CLOSER | A2E NOT DETECTED | A | ACCELERATING |
| 14 | | | | A1K<A2K: INTERFERENCE OF ANOTHER VEHICLE IS DELAYED | A1≤A2: GOING AWAY | A2E NOT DETECTED | A | ACCELERATING |
| 15 | | | | A1K<A2K: INTERFERENCE OF ANOTHER VEHICLE IS DELAYED | A2 NOT DETECT-ED | A2E NOT DETECTED | A | ACCELERATING |
| 16 | | | | A1K≥A2K: INTERFERENCE OF ANOTHER VEHICLE IS ACCELERATED | A1>A2: COMING CLOSER | A2E NOT DETECTED | B | DELAYING |
| 17 | | | | A1K≥A2K: INTERFERENCE OF ANOTHER VEHICLE IS ACCELERATED | A1≤A2: GOING AWAY | A2E NOT DETECTED | B | DELAYING |
| 18 | | | | A1K≥A2K: INTERFERENCE OF ANOTHER VEHICLE IS ACCELERATED | A2 NOT DETECT-ED | A2E NOT DETECTED | B | DELAYING |

FIG.17B

| No. | INTERFERENCE PATTERN | | | | | | WAVE TRANSMISSION CONDITION | |
|---|---|---|---|---|---|---|---|---|
| | SONAR 22a/22c (FREQUENCY MODULATION A) | | | SONAR 22b/22d (FREQUENCY MODULATION A) | | | SONAR 22a/22c | |
| | SHORT-DISTANCE INTERFERENCE | OBSTACLE | LONG-DISTANCE INTERFERENCE | SHORT-DISTANCE INTERFERENCE | OBSTACLE | LONG-DISTANCE INTERFERENCE | FREQUENCY MODULATION | WAVE TRANSMISSION TIMING (ACCELERATING OR DELAYING) |
| 19 | A1K NOT DETECTED | A1 DETECTED | A1E DETECTED | A2K NOT DETECTED (A1K ALSO NOT DETECTED) | A1>A2: COMING CLOSER | A1E<A2E: INTERFERENCE OF ANOTHER VEHICLE IS DELAYED | A | ACCELERATING |
| 20 | | | | A2K NOT DETECTED (A1K ALSO NOT DETECTED) | A1≤A2: GOING AWAY | A1E<A2E: INTERFERENCE OF ANOTHER VEHICLE IS DELAYED | B | DELAYING |
| 21 | | | | A2K NOT DETECTED (A1K ALSO NOT DETECTED) | A2 NOT DETECTED | A1E<A2E: INTERFERENCE OF ANOTHER VEHICLE IS DELAYED | A | ACCELERATING |
| 22 | | | | A2K NOT DETECTED (A1K ALSO NOT DETECTED) | A1>A2: COMING CLOSER | A1E≥A2E: INTERFERENCE OF ANOTHER VEHICLE IS ACCELERATED | A | ACCELERATING |
| 23 | | | | A2K NOT DETECTED (A1K ALSO NOT DETECTED) | A1≤A2: GOING AWAY | A1E≥A2E: INTERFERENCE OF ANOTHER VEHICLE IS ACCELERATED | B | DELAYING |
| 24 | | | | A2K NOT DETECTED (A1K ALSO NOT DETECTED) | A2 NOT DETECTED | A1E≥A2E: INTERFERENCE OF ANOTHER VEHICLE IS ACCELERATED | B | DELAYING |
| 25 | A1K DETECTED | A1 DETECTED | A1E DETECTED | A1K<A2K: INTERFERENCE OF ANOTHER VEHICLE IS DELAYED | A1>A2: COMING CLOSER | A1E≥A2E: INTERFERENCE OF ANOTHER VEHICLE IS ACCELERATED | A | ACCELERATING |
| 26 | | | | A1K<A2K: INTERFERENCE OF ANOTHER VEHICLE IS DELAYED | A1≤A2: GOING AWAY | A1E≥A2E: INTERFERENCE OF ANOTHER VEHICLE IS ACCELERATED | A | ACCELERATING |
| 27 | | | | A1K<A2K: INTERFERENCE OF ANOTHER VEHICLE IS DELAYED | A2 NOT DETECTED | A1E≥A2E: INTERFERENCE OF ANOTHER VEHICLE IS ACCELERATED | A | ACCELERATING |
| 28 | | | | A1K≥A2K: INTERFERENCE OF ANOTHER VEHICLE IS ACCELERATED | A1>A2: COMING CLOSER | A1E<A2E: INTERFERENCE OF ANOTHER VEHICLE IS DELAYED | B | DELAYING |
| 29 | | | | A1K≥A2K: INTERFERENCE OF ANOTHER VEHICLE IS ACCELERATED | A1≤A2: GOING AWAY | A1E<A2E: INTERFERENCE OF ANOTHER VEHICLE IS DELAYED | B | DELAYING |
| 30 | | | | A1K≥A2K: INTERFERENCE OF ANOTHER VEHICLE IS ACCELERATED | A2 NOT DETECTED | A1E<A2E: INTERFERENCE OF ANOTHER VEHICLE IS DELAYED | B | DELAYING |
| 31 | | | | A2K NOT DETECTED (A1K DETECTED) | A1>A2: COMING CLOSER | A1E≥A2E: INTERFERENCE OF ANOTHER VEHICLE IS ACCELERATED | A | ACCELERATING |
| 32 | | | | A2K NOT DETECTED (A1K DETECTED) | A1≤A2: GOING AWAY | A1E≥A2E: INTERFERENCE OF ANOTHER VEHICLE IS ACCELERATED | B | DELAYING |
| 33 | | | | A2K NOT DETECTED (A1K DETECTED) | A2 NOT DETECTED | A1E≥A2E: INTERFERENCE OF ANOTHER VEHICLE IS ACCELERATED | B | DELAYING |

FIG.17C

| No. | INTERFERENCE PATTERN | | | | | | WAVE TRANSMISSION CONDITION | |
| --- | --- | --- | --- | --- | --- | --- | --- | --- |
| | SONAR 22a/22c (FREQUENCY MODULATION A) | | | SONAR 22b/22d (FREQUENCY MODULATION A) | | | SONAR 22a/22c | |
| | SHORT-DISTANCE INTER-FERENCE | OB-STA-CLE | LONG-DISTANCE INTER-FERENCE | SHORT-DISTANCE INTERFERENCE | OBSTA-CLE | LONG-DISTANCE INTERFERENCE | FRE-QUEN-CY MODU-LATION | WAVE TRANS-MISSION TIMING (ACCELERATING OR DELAYING) |
| 34 | | | | A2K NOT DETECTED (A1K DETECTED) | A1>A2: COMING CLOSER | A1E<A2E: INTERFERENCE OF ANOTHER VEHICLE IS DELAYED | A | ACCELERATING |
| 35 | | | | A2K NOT DETECTED (A1K DETECTED) | A1≤A2: GOING AWAY | A1E<A2E: INTERFERENCE OF ANOTHER VEHICLE IS DELAYED | B | DELAYING |
| 36 | | | | A2K NOT DETECTED (A1K DETECTED) | A2 NOT DETECT-ED | A1E<A2E: INTERFERENCE OF ANOTHER VEHICLE IS DELAYED | A | ACCELERATING |
| 37 | | | | A1K<A2K: INTERFERENCE OF ANOTHER VEHICLE IS DELAYED | A1>A2: COMING CLOSER | A2E NOT DETECTED | A | ACCELERATING |
| 38 | | | | A1K<A2K: INTERFERENCE OF ANOTHER VEHICLE IS DELAYED | A1≤A2: GOING AWAY | A2E NOT DETECTED | A | ACCELERATING |
| 39 | | | | A1K<A2K: INTERFERENCE OF ANOTHER VEHICLE IS DELAYED | A2 NOT DETECT-ED | A2E NOT DETECTED | A | ACCELERATING |
| 40 | | | | A1K<A2K: INTERFERENCE OF ANOTHER VEHICLE IS DELAYED | A1>A2: COMING CLOSER | A2E NOT DETECTED | A | ACCELERATING |
| 41 | A1K DETECT-ED | A1 DE-TECT-ED | A1E DETECT-ED | A1K<A2K: INTERFERENCE OF ANOTHER VEHICLE IS DELAYED | A1≤A2: GOING AWAY | A2E NOT DETECTED | A | ACCELERATING |
| 42 | | | | A1K<A2K: INTERFERENCE OF ANOTHER VEHICLE IS DELAYED | A2 NOT DETECT-ED | A2E NOT DETECTED | A | ACCELERATING |
| 43 | | | | A1K≥A2K: INTERFERENCE OF ANOTHER VEHICLE IS ACCELERATED | A1>A2: COMING CLOSER | A2E NOT DETECTED | B | DELAYING |
| 44 | | | | A1K≥A2K: INTERFERENCE OF ANOTHER VEHICLE IS ACCELERATED | A1≤A2: GOING AWAY | A2E NOT DETECTED | B | DELAYING |
| 45 | | | | A1K≥A2K: INTERFERENCE OF ANOTHER VEHICLE IS ACCELERATED | A2 NOT DETECT-ED | A2E NOT DETECTED | B | DELAYING |
| 46 | | | | A1K≥A2K: INTERFERENCE OF ANOTHER VEHICLE IS ACCELERATED | A1>A2: COMING CLOSER | A2E NOT DETECTED | B | DELAYING |
| 47 | | | | A1K≥A2K: INTERFERENCE OF ANOTHER VEHICLE IS ACCELERATED | A1≤A2: GOING AWAY | A2E NOT DETECTED | B | DELAYING |
| 48 | | | | A1K≥A2K: INTERFERENCE OF ANOTHER VEHICLE IS ACCELERATED | A2 NOT DETECT-ED | A2E NOT DETECTED | B | DELAYING |

FIG.18A

| No. | INTERFERENCE PATTERN | | | | | | WAVE TRANSMISSION CONDITION | |
|---|---|---|---|---|---|---|---|---|
| | SONAR 22a/22c (FREQUENCY MODULATION A) | | | SONAR 22b/22d (FREQUENCY MODULATION A) | | | SONAR 22a/22c | |
| | SHORT-DISTANCE INTERFERENCE | OBSTACLE | LONG-DISTANCE INTERFERENCE | SHORT-DISTANCE INTERFERENCE | OBSTACLE | LONG-DISTANCE INTERFERENCE | FREQUENCY MODULATION | WAVE TRANSMISSION TIMING (ACCELERATING OR DELAYING) |
| 49 | A1K DETECTED | A1 NOT DETECTED | A1E NOT DETECTED | A1K<B2K: INTERFERENCE OF ANOTHER VEHICLE IS DELAYED | B2 DETECTED | B2E NOT DETECTED | A | ACCELERATING |
| 50 | | | | A1K≥B2K: INTERFERENCE OF ANOTHER VEHICLE IS ACCELERATED | B2 DETECTED | B2E NOT DETECTED | B | DELAYING |
| 51 | | | | A1K<B2K: INTERFERENCE OF ANOTHER VEHICLE IS DELAYED | B2 NOT DETECTED | B2E NOT DETECTED | A | ACCELERATING |
| 52 | | | | A1K≥B2K: INTERFERENCE OF ANOTHER VEHICLE IS ACCELERATED | B2 NOT DETECTED | B2E NOT DETECTED | B | DELAYING |
| 53 | | | | B2K NOT DETECTED (A1K DETECTED) | B2 DETECTED | B2E NOT DETECTED | B | DELAYING |
| 54 | | | | B2K NOT DETECTED (A1K DETECTED) | B2 NOT DETECTED | B2E NOT DETECTED | B | DELAYING |
| 55 | A1K DETECTED | | A1E DETECTED | B2K NOT DETECTED (A1K ALSO NOT DETECTED) | B2 DETECTED | A1E<B2E: INTERFERENCE OF ANOTHER VEHICLE IS DELAYED | A | ACCELERATING |
| 56 | | | | B2K NOT DETECTED (A1K ALSO NOT DETECTED) | B2 DETECTED | A1E≥B2E: INTERFERENCE OF ANOTHER VEHICLE IS ACCELERATED | B | DELAYING |
| 57 | | | | B2K NOT DETECTED (A1K ALSO NOT DETECTED) | B2 NOT DETECTED | A1E<B2E: INTERFERENCE OF ANOTHER VEHICLE IS DELAYED | A | ACCELERATING |
| 58 | | | | B2K NOT DETECTED (A1K ALSO NOT DETECTED) | B2 NOT DETECTED | A1E≥B2E: INTERFERENCE OF ANOTHER VEHICLE IS ACCELERATED | B | DELAYING |

FIG.18B

| No. | INTERFERENCE PATTERN SONAR 22a/22c (FREQUENCY MODULATION A) SHORT-DISTANCE INTERFERENCE | OBSTACLE | LONG-DISTANCE INTERFERENCE | SONAR 22b/22d (FREQUENCY MODULATION A) SHORT-DISTANCE INTERFERENCE | OBSTACLE | LONG-DISTANCE INTERFERENCE | WAVE TRANSMISSION CONDITION SONAR 22a/22c FREQUENCY MODULATION | WAVE TRANSMISSION TIMING (ACCELERATING OR DELAYING) |
|---|---|---|---|---|---|---|---|---|
| 59 | A2K DETECTED | A1 NOT DETECTED | A1E DETECTED | A1K<B2K: INTERFERENCE OF ANOTHER VEHICLE IS DELAYED | B2 DETECTED | A1E<B2E: INTERFERENCE OF ANOTHER VEHICLE IS DELAYED | A | ACCELERATING |
| 60 | | | | A1K<B2K: INTERFERENCE OF ANOTHER VEHICLE IS DELAYED | B2 NOT DETECTED | A1E<B2E: INTERFERENCE OF ANOTHER VEHICLE IS DELAYED | A | ACCELERATING |
| 61 | | | | A1K<B2K: INTERFERENCE OF ANOTHER VEHICLE IS DELAYED | B2 DETECTED | A1E≥B2E: INTERFERENCE OF ANOTHER VEHICLE IS ACCELERATED | A | ACCELERATING |
| 62 | | | | A1K<B2K: INTERFERENCE OF ANOTHER VEHICLE IS DELAYED | B2 NOT DETECTED | A1E≥B2E: INTERFERENCE OF ANOTHER VEHICLE IS ACCELERATED | A | ACCELERATING |
| 63 | | | | A1K<B2K: INTERFERENCE OF ANOTHER VEHICLE IS DELAYED | B2 DETECTED | B2E NOT DETECTED (A1E DETECTED) | A | ACCELERATING |
| 64 | | | | A1K<B2K: INTERFERENCE OF ANOTHER VEHICLE IS DELAYED | B2 NOT DETECTED | B2E NOT DETECTED (A1E DETECTED) | A | ACCELERATING |
| 65 | | | | A1K≥B2K: INTERFERENCE OF ANOTHER VEHICLE IS ACCELERATED | B2 DETECTED | A1E<B2E: INTERFERENCE OF ANOTHER VEHICLE IS DELAYED | B | DELAYING |
| 66 | | | | A1K≥B2K: INTERFERENCE OF ANOTHER VEHICLE IS ACCELERATED | B2 NOT DETECTED | A1E<B2E: INTERFERENCE OF ANOTHER VEHICLE IS DELAYED | B | DELAYING |
| 67 | | | | A1K≥B2K: INTERFERENCE OF ANOTHER VEHICLE IS ACCELERATED | B2 DETECTED | A1E≥B2E: INTERFERENCE OF ANOTHER VEHICLE IS ACCELERATED | B | DELAYING |
| 68 | | | | A1K≥B2K: INTERFERENCE OF ANOTHER VEHICLE IS ACCELERATED | B2 NOT DETECTED | A1E≥B2E: INTERFERENCE OF ANOTHER VEHICLE IS ACCELERATED | B | DELAYING |
| 69 | | | | A1K≥B2K: INTERFERENCE OF ANOTHER VEHICLE IS ACCELERATED | B2 DETECTED | B2E NOT DETECTED (A1E DETECTED) | B | DELAYING |
| 70 | | | | A1K≥B2K: INTERFERENCE OF ANOTHER VEHICLE IS ACCELERATED | B2 NOT DETECTED | B2E NOT DETECTED (A1E DETECTED) | B | DELAYING |
| 71 | | | | B2K NOT DETECTED (A1K DETECTED) | B2 DETECTED | A1E<B2E: INTERFERENCE OF ANOTHER VEHICLE IS DELAYED | A | ACCELERATING |
| 72 | | | | B2K NOT DETECTED (A1K DETECTED) | B2 NOT DETECTED | A1E<B2E: INTERFERENCE OF ANOTHER VEHICLE IS DELAYED | A | ACCELERATING |
| 73 | | | | B2K NOT DETECTED (A1K DETECTED) | B2 DETECTED | A1E≥B2E: INTERFERENCE OF ANOTHER VEHICLE IS ACCELERATED | B | DELAYING |
| 74 | | | | B2K NOT DETECTED (A1K DETECTED) | B2 NOT DETECTED | A1E≥B2E: INTERFERENCE OF ANOTHER VEHICLE IS ACCELERATED | B | DELAYING |

| No. | INTERFERENCE PATTERN SONAR 22a/22c (FREQUENCY MODULATION A) SHORT-DISTANCE INTERFERENCE | OBSTACLE | LONG-DISTANCE INTERFERENCE | SONAR 22b/22d (FREQUENCY MODULATION A) SHORT-DISTANCE INTERFERENCE | OBSTACLE | LONG-DISTANCE INTERFERENCE | WAVE TRANSMISSION CONDITION SONAR 22a/22c FREQUENCY MODULATION | WAVE TRANSMISSION TIMING (ACCELERATING OR DELAYING) |
|---|---|---|---|---|---|---|---|---|
| 49 | A1K DETECTED | A1 NOT DETECTED | A1E NOT DETECTED | A1K<B2K: INTERFERENCE OF ANOTHER VEHICLE IS DELAYED | B2 DETECTED | B2E NOT DETECTED | B | DELAYING |
| 50 | A1K DETECTED | A1 NOT DETECTED | A1E NOT DETECTED | A1K≥B2K: INTERFERENCE OF ANOTHER VEHICLE IS ACCELERATED | B2 DETECTED | B2E NOT DETECTED | B | DELAYING |
| 51 | A1K DETECTED | A1 NOT DETECTED | A1E NOT DETECTED | A1K<B2K: INTERFERENCE OF ANOTHER VEHICLE IS DELAYED | B2 NOT DETECTED | B2E NOT DETECTED | B | DELAYING |
| 52 | A1K DETECTED | A1 NOT DETECTED | A1E NOT DETECTED | A1K≥B2K: INTERFERENCE OF ANOTHER VEHICLE IS ACCELERATED | B2 NOT DETECTED | B2E NOT DETECTED | B | DELAYING |
| 53 | A1K DETECTED | A1 NOT DETECTED | A1E DETECTED | B2K NOT DETECTED (A1K DETECTED) | B2 DETECTED | B2E NOT DETECTED | B | DELAYING |
| 54 | A1K DETECTED | A1 NOT DETECTED | A1E DETECTED | B2K NOT DETECTED (A1K DETECTED) | B2 NOT DETECTED | B2E NOT DETECTED | B | DELAYING |
| 55 | A1K DETECTED | | A1E DETECTED | B2K NOT DETECTED (A1K ALSO NOT DETECTED) | B2 DETECTED | A1E<B2E: INTERFERENCE OF ANOTHER VEHICLE IS DELAYED | B | DELAYING |
| 56 | A1K DETECTED | | A1E DETECTED | B2K NOT DETECTED (A1K ALSO NOT DETECTED) | B2 DETECTED | A1E≥B2E: INTERFERENCE OF ANOTHER VEHICLE IS ACCELERATED | B | DELAYING |
| 57 | A1K DETECTED | | A1E DETECTED | B2K NOT DETECTED (A1K ALSO NOT DETECTED) | B2 NOT DETECTED | A1E<B2E: INTERFERENCE OF ANOTHER VEHICLE IS DELAYED | B | DELAYING |
| 58 | A1K DETECTED | | A1E DETECTED | B2K NOT DETECTED (A1K ALSO NOT DETECTED) | B2 NOT DETECTED | A1E≥B2E: INTERFERENCE OF ANOTHER VEHICLE IS ACCELERATED | B | DELAYING |

FIG.33B

| No. | SONAR 22a/22c (FREQUENCY MODULATION A) | | | SONAR 22b/22d (FREQUENCY MODULATION A) | | | WAVE TRANSMISSION CONDITION — SONAR 22a/22c | |
|---|---|---|---|---|---|---|---|---|
| | SHORT-DISTANCE INTERFERENCE | OBSTACLE | LONG-DISTANCE INTERFERENCE | SHORT-DISTANCE INTERFERENCE | OBSTACLE | LONG-DISTANCE INTERFERENCE | FREQUENCY MODULATION | WAVE TRANSMISSION TIMING (ACCELERATING OR DELAYING) |
| 59 | A2K DETECTED | A1 NOT DETECTED | A1E DETECTED | A1K<B2K: INTERFERENCE OF ANOTHER VEHICLE IS DELAYED | B2 DETECTED | A1E<B2E: INTERFERENCE OF ANOTHER VEHICLE IS DELAYED | B | DELAYING |
| 60 | | | | A1K<B2K: INTERFERENCE OF ANOTHER VEHICLE IS DELAYED | B2 NOT DETECTED | A1E<B2E: INTERFERENCE OF ANOTHER VEHICLE IS DELAYED | B | DELAYING |
| 61 | | | | A1K<B2K: INTERFERENCE OF ANOTHER VEHICLE IS DELAYED | B2 DETECTED | A1E≥B2E: INTERFERENCE OF ANOTHER VEHICLE IS ACCELERATED | B | DELAYING |
| 62 | | | | A1K<B2K: INTERFERENCE OF ANOTHER VEHICLE IS DELAYED | B2 NOT DETECTED | A1E≥B2E: INTERFERENCE OF ANOTHER VEHICLE IS ACCELERATED | B | DELAYING |
| 63 | | | | A1K<B2K: INTERFERENCE OF ANOTHER VEHICLE IS DELAYED | B2 DETECTED | B2E NOT DETECTED (A1E DETECTED) | B | DELAYING |
| 64 | | | | A1K<B2K: INTERFERENCE OF ANOTHER VEHICLE IS DELAYED | B2 NOT DETECTED | B2E NOT DETECTED (A1E DETECTED) | B | DELAYING |
| 65 | | | | A1K≥B2K: INTERFERENCE OF ANOTHER VEHICLE IS ACCELERATED | B2 DETECTED | A1E<B2E: INTERFERENCE OF ANOTHER VEHICLE IS DELAYED | B | DELAYING |
| 66 | | | | A1K≥B2K: INTERFERENCE OF ANOTHER VEHICLE IS ACCELERATED | B2 NOT DETECTED | A1E<B2E: INTERFERENCE OF ANOTHER VEHICLE IS DELAYED | B | DELAYING |
| 67 | | | | A1K≥B2K: INTERFERENCE OF ANOTHER VEHICLE IS ACCELERATED | B2 DETECTED | A1E≥B2E: INTERFERENCE OF ANOTHER VEHICLE IS ACCELERATED | B | DELAYING |
| 68 | | | | A1K≥B2K: INTERFERENCE OF ANOTHER VEHICLE IS ACCELERATED | B2 NOT DETECTED | A1E≥B2E: INTERFERENCE OF ANOTHER VEHICLE IS ACCELERATED | B | DELAYING |
| 69 | | | | A1K≥B2K: INTERFERENCE OF ANOTHER VEHICLE IS ACCELERATED | B2 DETECTED | B2E NOT DETECTED (A1E DETECTED) | B | DELAYING |
| 70 | | | | A1K≥B2K: INTERFERENCE OF ANOTHER VEHICLE IS ACCELERATED | B2 NOT DETECTED | B2E NOT DETECTED (A1E DETECTED) | B | DELAYING |
| 71 | | | | B2K NOT DETECTED (A1K DETECTED) | B2 DETECTED | A1E<B2E: INTERFERENCE OF ANOTHER VEHICLE IS DELAYED | B | DELAYING |
| 72 | | | | B2K NOT DETECTED (A1K DETECTED) | B2 NOT DETECTED | A1E<B2E: INTERFERENCE OF ANOTHER VEHICLE IS DELAYED | B | DELAYING |
| 73 | | | | B2K NOT DETECTED (A1K DETECTED) | B2 DETECTED | A1E≥B2E: INTERFERENCE OF ANOTHER VEHICLE IS ACCELERATED | B | DELAYING |
| 74 | | | | B2K NOT DETECTED (A1K DETECTED) | B2 NOT DETECTED | A1E≥B2E: INTERFERENCE OF ANOTHER VEHICLE IS ACCELERATED | B | DELAYING |

FIG.34A

| No. | INTERFERENCE PATTERN SONAR 22a/22c (FREQUENCY MODULATION A) | | | SONAR 22b/22d (FREQUENCY MODULATION A) | | | WAVE TRANSMISSION CONDITION SONAR 22a/22c | |
|---|---|---|---|---|---|---|---|---|
| | SHORT-DISTANCE INTERFERENCE | OBSTACLE | LONG-DISTANCE INTERFERENCE | SHORT-DISTANCE INTERFERENCE | OBSTACLE | LONG-DISTANCE INTERFERENCE | FREQUENCY MODULATION | WAVE TRANSMISSION TIMING (ACCELERATING OR DELAYING) |
| 49 | A1K DETECTED | A1 NOT DETECTED | A1E NOT DETECTED | A1K<B2K: INTERFERENCE OF ANOTHER VEHICLE IS DELAYED | B2 DETECTED | B2E NOT DETECTED | B | DELAYING |
| 50 | | | | A1K≥B2K: INTERFERENCE OF ANOTHER VEHICLE IS ACCELERATED | B2 DETECTED | B2E NOT DETECTED | B | DELAYING |
| 51 | | | | A1K<B2K: INTERFERENCE OF ANOTHER VEHICLE IS DELAYED | B2 NOT DETECTED | B2E NOT DETECTED | B | DELAYING |
| 52 | | | | A1K≥B2K: INTERFERENCE OF ANOTHER VEHICLE IS ACCELERATED | B2 NOT DETECTED | B2E NOT DETECTED | B | DELAYING |
| 53 | | | | B2K NOT DETECTED (A1K DETECTED) | A1K>B2: COMING CLOSER | B2E NOT DETECTED | A | ACCELERATING |
| 54 | | | | B2K NOT DETECTED (A1K DETECTED) | A1K≤B2: GOING AWAY | B2E NOT DETECTED | B | DELAYING |
| 55 | | | | B2K NOT DETECTED (A1K DETECTED) | B2 NOT DETECTED | B2E NOT DETECTED | B | DELAYING |
| 56 | A1K NOT DETECTED | A1 NOT DETECTED | A1E DETECTED | B2K NOT DETECTED (A1K ALSO NOT DETECTED) | B2 DETECTED | A1E<B2E: INTERFERENCE OF ANOTHER VEHICLE IS DELAYED | B | DELAYING |
| 57 | | | | B2K NOT DETECTED (A1K ALSO NOT DETECTED) | B2 DETECTED | A1E≥B2E: INTERFERENCE OF ANOTHER VEHICLE IS ACCELERATED | B | DELAYING |
| 58 | | | | B2K NOT DETECTED (A1K ALSO NOT DETECTED) | B2 NOT DETECTED | A1E<B2E: INTERFERENCE OF ANOTHER VEHICLE IS DELAYED | B | DELAYING |
| 59 | | | | B2K NOT DETECTED (A1K ALSO NOT DETECTED) | B2 NOT DETECTED | A1E≥B2E: INTERFERENCE OF ANOTHER VEHICLE IS ACCELERATED | B | DELAYING |

FIG.34B

| No. | SONAR 22a/22c (FREQUENCY MODULATION A) SHORT-DISTANCE INTERFERENCE | OBSTACLE | LONG-DISTANCE INTERFERENCE | INTERFERENCE PATTERN SONAR 22b/22d (FREQUENCY MODULATION A) SHORT-DISTANCE INTERFERENCE | OBSTACLE | LONG-DISTANCE INTERFERENCE | WAVE TRANSMISSION CONDITION SONAR 22a/22c FREQUENCY MODULATION | WAVE TRANSMISSION TIMING (ACCELERATING OR DELAYING) |
|---|---|---|---|---|---|---|---|---|
| 60 | A2K DETECTED | A1 NOT DETECTED | A1E DETECTED | A1K<B2K: INTERFERENCE OF ANOTHER VEHICLE IS DELAYED | B2 DETECTED | A1E<B2E: INTERFERENCE OF ANOTHER VEHICLE IS DELAYED | B | DELAYING |
| 61 | | | | A1K<B2K: INTERFERENCE OF ANOTHER VEHICLE IS DELAYED | B2 NOT DETECTED | A1E<B2E: INTERFERENCE OF ANOTHER VEHICLE IS DELAYED | B | DELAYING |
| 62 | | | | A1K<B2K: INTERFERENCE OF ANOTHER VEHICLE IS DELAYED | B2 DETECTED | A1E≥B2E: INTERFERENCE OF ANOTHER VEHICLE IS ACCELERATED | B | DELAYING |
| 63 | | | | A1K<B2K: INTERFERENCE OF ANOTHER VEHICLE IS DELAYED | B2 NOT DETECTED | A1E≥B2E: INTERFERENCE OF ANOTHER VEHICLE IS ACCELERATED | B | DELAYING |
| 64 | | | | A1K<B2K: INTERFERENCE OF ANOTHER VEHICLE IS DELAYED | B2 DETECTED | B2E NOT DETECTED (A1E DETECTED) | B | DELAYING |
| 65 | | | | A1K<B2K: INTERFERENCE OF ANOTHER VEHICLE IS DELAYED | B2 NOT DETECTED | B2E NOT DETECTED (A1E DETECTED) | B | DELAYING |
| 66 | | | | A1K≥B2K: INTERFERENCE OF ANOTHER VEHICLE IS ACCELERATED | B2 DETECTED | A1E<B2E: INTERFERENCE OF ANOTHER VEHICLE IS DELAYED | B | DELAYING |
| 67 | | | | A1K≥B2K: INTERFERENCE OF ANOTHER VEHICLE IS ACCELERATED | B2 NOT DETECTED | A1E<B2E: INTERFERENCE OF ANOTHER VEHICLE IS DELAYED | B | DELAYING |
| 68 | | | | A1K≥B2K: INTERFERENCE OF ANOTHER VEHICLE IS ACCELERATED | B2 DETECTED | A1E≥B2E: INTERFERENCE OF ANOTHER VEHICLE IS ACCELERATED | B | DELAYING |
| 69 | | | | A1K≥B2K: INTERFERENCE OF ANOTHER VEHICLE IS ACCELERATED | B2 NOT DETECTED | A1E≥B2E: INTERFERENCE OF ANOTHER VEHICLE IS ACCELERATED | B | DELAYING |
| 70 | | | | A1K≥B2K: INTERFERENCE OF ANOTHER VEHICLE IS ACCELERATED | B2 DETECTED | B2E NOT DETECTED (A1E DETECTED) | B | DELAYING |
| 71 | | | | A1K≥B2K: INTERFERENCE OF ANOTHER VEHICLE IS ACCELERATED | B2 NOT DETECTED | B2E NOT DETECTED (A1E DETECTED) | B | DELAYING |
| 72 | | | | B2K NOT DETECTED (A1K DETECTED) | A1K>B2: COMING CLOSER | A1E<B2E: INTERFERENCE OF ANOTHER VEHICLE IS DELAYED | A | ACCELERATING |
| 73 | | | | B2K NOT DETECTED (A1K DETECTED) | A1K≤B2: GOING AWAY | A1E<B2E: INTERFERENCE OF ANOTHER VEHICLE IS DELAYED | B | DELAYING |
| 74 | | | | B2K NOT DETECTED (A1K DETECTED) | A1K>B2: COMING CLOSER | A1E≥B2E: INTERFERENCE OF ANOTHER VEHICLE IS ACCELERATED | A | ACCELERATING |
| 75 | | | | B2K NOT DETECTED (A1K DETECTED) | A1K≤B2: GOING AWAY | A1E≥B2E: INTERFERENCE OF ANOTHER VEHICLE IS ACCELERATED | B | DELAYING |

FIG.35A

| No. | INTERFERENCE PATTERN SONAR 22a/22c (FREQUENCY MODULATION A) SHORT-DISTANCE INTERFERENCE | OBSTACLE | LONG-DISTANCE INTERFERENCE | SONAR 22b/22d (FREQUENCY MODULATION A) SHORT-DISTANCE INTERFERENCE | OBSTACLE | LONG-DISTANCE INTERFERENCE | WAVE TRANSMISSION CONDITION SONAR 22a/22c FREQUENCY MODULATION | WAVE TRANSMISSION TIMING (ACCELERATING OR DELAYING) |
|---|---|---|---|---|---|---|---|---|
| 49 | A1K DETECTED | A1 NOT DETECTED | A1E NOT DETECTED | A1K<B2K: INTERFERENCE OF ANOTHER VEHICLE IS DELAYED | B2 DETECTED | B2E NOT DETECTED | A | ACCELERATING |
| 50 | | | | A1K≥B2K: INTERFERENCE OF ANOTHER VEHICLE IS ACCELERATED | B2 DETECTED | B2E NOT DETECTED | B | DELAYING |
| 51 | | | | A1K<B2K: INTERFERENCE OF ANOTHER VEHICLE IS DELAYED | B2 NOT DETECTED | B2E NOT DETECTED | A | ACCELERATING |
| 52 | | | | A1K≥B2K: INTERFERENCE OF ANOTHER VEHICLE IS ACCELERATED | B2 NOT DETECTED | B2E NOT DETECTED | B | DELAYING |
| 53 | | | | B2K NOT DETECTED (A1K DETECTED) | A1K>B2: COMING CLOSER | B2E NOT DETECTED | A | ACCELERATING |
| 54 | | | | B2K NOT DETECTED (A1K DETECTED) | A1K≤B2: GOING AWAY | B2E NOT DETECTED | B | DELAYING |
| 55 | | | | B2K NOT DETECTED (A1K DETECTED) | B2 NOT DETECTED | B2E NOT DETECTED | B | DELAYING |
| 56 | A1K NOT DETECTED | | A1E DETECTED | B2K NOT DETECTED (A1K ALSO NOT DETECTED) | B2 DETECTED | A1E<B2E: INTERFERENCE OF ANOTHER VEHICLE IS DELAYED | A | ACCELERATING |
| 57 | | | | B2K NOT DETECTED (A1K ALSO NOT DETECTED) | B2 DETECTED | A1E≥B2E: INTERFERENCE OF ANOTHER VEHICLE IS ACCELERATED | B | DELAYING |
| 58 | | | | B2K NOT DETECTED (A1K ALSO NOT DETECTED) | B2 NOT DETECTED | A1E<B2E: INTERFERENCE OF ANOTHER VEHICLE IS DELAYED | A | ACCELERATING |
| 59 | | | | B2K NOT DETECTED (A1K ALSO NOT DETECTED) | B2 NOT DETECTED | A1E≥B2E: INTERFERENCE OF ANOTHER VEHICLE IS ACCELERATED | B | DELAYING |

FIG.35B

| No. | INTERFERENCE PATTERN | | | | | | WAVE TRANSMISSION CONDITION | |
|---|---|---|---|---|---|---|---|---|
| | SONAR 22a/22c (FREQUENCY MODULATION A) | | | SONAR 22b/22d (FREQUENCY MODULATION A) | | | SONAR 22a/22c | |
| | SHORT-DISTANCE INTERFERENCE | OBSTACLE | LONG-DISTANCE INTERFERENCE | SHORT-DISTANCE INTERFERENCE | OBSTACLE | LONG-DISTANCE INTERFERENCE | FREQUENCY MODULATION | WAVE TRANSMISSION TIMING (ACCELERATING OR DELAYING) |
| 60 | A2K DETECTED | A1 NOT DETECTED | A1E DETECTED | A1K<B2K: INTERFERENCE OF ANOTHER VEHICLE IS DELAYED | B2 DETECTED | A1E<B2E: INTERFERENCE OF ANOTHER VEHICLE IS DELAYED | A | ACCELERATING |
| 61 | | | | A1K<B2K: INTERFERENCE OF ANOTHER VEHICLE IS DELAYED | B2 NOT DETECTED | A1E<B2E: INTERFERENCE OF ANOTHER VEHICLE IS DELAYED | A | ACCELERATING |
| 62 | | | | A1K<B2K: INTERFERENCE OF ANOTHER VEHICLE IS DELAYED | B2 DETECTED | A1E≥B2E: INTERFERENCE OF ANOTHER VEHICLE IS ACCELERATED | A | ACCELERATING |
| 63 | | | | A1K<B2K: INTERFERENCE OF ANOTHER VEHICLE IS DELAYED | B2 NOT DETECTED | A1E≥B2E: INTERFERENCE OF ANOTHER VEHICLE IS ACCELERATED | A | ACCELERATING |
| 64 | | | | A1K<B2K: INTERFERENCE OF ANOTHER VEHICLE IS DELAYED | B2 DETECTED | B2E NOT DETECTED (A1E DETECTED) | A | ACCELERATING |
| 65 | | | | A1K<B2K: INTERFERENCE OF ANOTHER VEHICLE IS DELAYED | B2 NOT DETECTED | B2E NOT DETECTED (A1E DETECTED) | A | ACCELERATING |
| 66 | | | | A1K≥B2K: INTERFERENCE OF ANOTHER VEHICLE IS ACCELERATED | B2 DETECTED | A1E<B2E: INTERFERENCE OF ANOTHER VEHICLE IS DELAYED | B | DELAYING |
| 67 | | | | A1K≥B2K: INTERFERENCE OF ANOTHER VEHICLE IS ACCELERATED | B2 NOT DETECTED | A1E<B2E: INTERFERENCE OF ANOTHER VEHICLE IS DELAYED | B | DELAYING |
| 68 | | | | A1K≥B2K: INTERFERENCE OF ANOTHER VEHICLE IS ACCELERATED | B2 DETECTED | A1E≥B2E: INTERFERENCE OF ANOTHER VEHICLE IS ACCELERATED | B | DELAYING |
| 69 | | | | A1K≥B2K: INTERFERENCE OF ANOTHER VEHICLE IS ACCELERATED | B2 NOT DETECTED | A1E≥B2E: INTERFERENCE OF ANOTHER VEHICLE IS ACCELERATED | B | DELAYING |
| 70 | | | | A1K≥B2K: INTERFERENCE OF ANOTHER VEHICLE IS ACCELERATED | B2 DETECTED | B2E NOT DETECTED (A1E DETECTED) | B | DELAYING |
| 71 | | | | A1K≥B2K: INTERFERENCE OF ANOTHER VEHICLE IS ACCELERATED | B2 NOT DETECTED | B2E NOT DETECTED (A1E DETECTED) | B | DELAYING |
| 72 | | | | B2K NOT DETECTED (A1K DETECTED) | A1K>B2: COMING CLOSER | A1E<B2E: INTERFERENCE OF ANOTHER VEHICLE IS DELAYED | A | ACCELERATING |
| 73 | | | | B2K NOT DETECTED (A1K DETECTED) | A1K≤B2: GOING AWAY | A1E<B2E: INTERFERENCE OF ANOTHER VEHICLE IS DELAYED | B | DELAYING |
| 74 | | | | B2K NOT DETECTED (A1K DETECTED) | A1K>B2: COMING CLOSER | A1E≥B2E: INTERFERENCE OF ANOTHER VEHICLE IS ACCELERATED | A | ACCELERATING |
| 75 | | | | B2K NOT DETECTED (A1K DETECTED) | A1K≤B2: GOING AWAY | A1E≥B2E: INTERFERENCE OF ANOTHER VEHICLE IS ACCELERATED | B | DELAYING |

OBSTACLE DETECTION DEVICE, OBSTACLE DETECTION METHOD, AND COMPUTER-READABLE MEDIUM

CROSS-REFERENCE TO RELATED APPLICATIONS

This application is a continuation of International Application No. PCT/JP2022/046099, filed on Dec. 14, 2022 which claims the benefit of priority of the prior Japanese Patent Application No. 2022-038513, filed on Mar. 11, 2022, the entire contents of which are incorporated herein by reference.

FIELD

The present disclosure relates to an obstacle detection device, an obstacle detection method, and a computer-readable medium.

BACKGROUND

An existing technique for detecting an object such as a preceding vehicle, an obstacle, or a pedestrian by a distance measuring sensor such as a transceiver mounted on a vehicle is known.

A related technique is disclosed in JP 2007-218690 A.

The present disclosure provides an obstacle detection device capable of reducing the possibility of erroneous detection of an obstacle due to an interference wave.

SUMMARY

An obstacle detection device according to the present disclosure includes a transmission circuit, a reception circuit, an object detection circuit, an interference detection circuit, and a determination circuit. The transmission circuit, in operation, transmits a transmitted wave signal subjected to frequency modulation. The reception circuit, in operation, receives a signal externally. The object detection circuit, in operation, detects an object existing in a wave transmission direction of the transmitted wave signal, based on a reflected wave of the transmitted wave signal received by the reception circuit. The interference detection circuit, in operation, detects, as interference, another transmitted wave signal transmitted from another transmission circuit different from the transmission circuit, based on the signal received by the reception circuit. The determination circuit, in operation, determines a frequency modulation pattern to be applied to the transmitted wave signal and a transmission timing of the transmitted wave signal, based on detection results of the object detection circuit and the interference detection circuit.

BRIEF DESCRIPTION OF THE DRAWINGS

FIG. 2 is a diagram illustrating an example of a configuration of a sonar according to the embodiment;

FIG. 9 is a diagram illustrating an example of a positional relationship between a vehicle and another vehicle according to the embodiment;

FIGS. 17A to 17C are diagrams illustrating an example of a data table according to the embodiment;

FIGS. 18A and 18B are diagrams illustrating an example of a data table according to the embodiment;

FIG. 22 is a diagram schematically illustrating an example of an interference pattern of a data table according to the embodiment;

FIG. 23 is a diagram schematically illustrating an example of an interference pattern of a data table according to the embodiment;

FIG. 24 is a diagram schematically illustrating an example of an interference pattern of a data table according to the embodiment;

FIG. 25 is a diagram schematically illustrating an example of an interference pattern of a data table according to the embodiment;

FIG. 26 is a diagram schematically illustrating an example of an interference pattern of the data table according to the embodiment;

FIG. 28 is a diagram schematically illustrating an example of an interference pattern of a data table according to the embodiment;

FIG. 29 is a diagram schematically illustrating an example of an interference pattern of a data table according to the embodiment;

FIGS. 33A and 33B are diagrams illustrating an example of a data table according to a third modification;

FIGS. 34A and 34B are diagrams illustrating an example of a data table according to the third modification; and FIGS. 35A and 35B are diagrams illustrating an example of a data table according to the third modification.

DETAILED DESCRIPTION

There is known a technique of performing various types of control for improving running safety of a vehicle, for example, an operation of an automatic brake, notification to a driver, and the like based on an object detection result by a distance measuring sensor.

As a distance measuring sensor, a sonar that detects an object by transmitting an ultrasonic wave and receiving a reflected wave reflected by the object around a vehicle is known.

Meanwhile, when a vehicle equipped with another sonar exists around the vehicle equipped with the sonar, if both vehicles unconditionally transmit ultrasonic waves of the same frequency, it is likely that the sonar erroneously detects the object due to the influence of the transmission of the ultrasonic waves from the other vehicles.

In the related art, when an interference wave is detected, erroneous detection is prevented by changing at least one of initial time, a phase, and a cycle of a modulation signal.

However, when vehicles equipped with control devices that execute the same sonar control face each other at the time of backward movement of the vehicle for the purpose of parking or the like, modulation is performed in the same manner, interference of ultrasonic waves occurs in each vehicle, it is difficult to correctly measure a distance value for parking, and erroneous detection may occur.

Hereinafter, an embodiment of an obstacle detection device according to the present disclosure is described with reference to the drawings.

Figure 1:
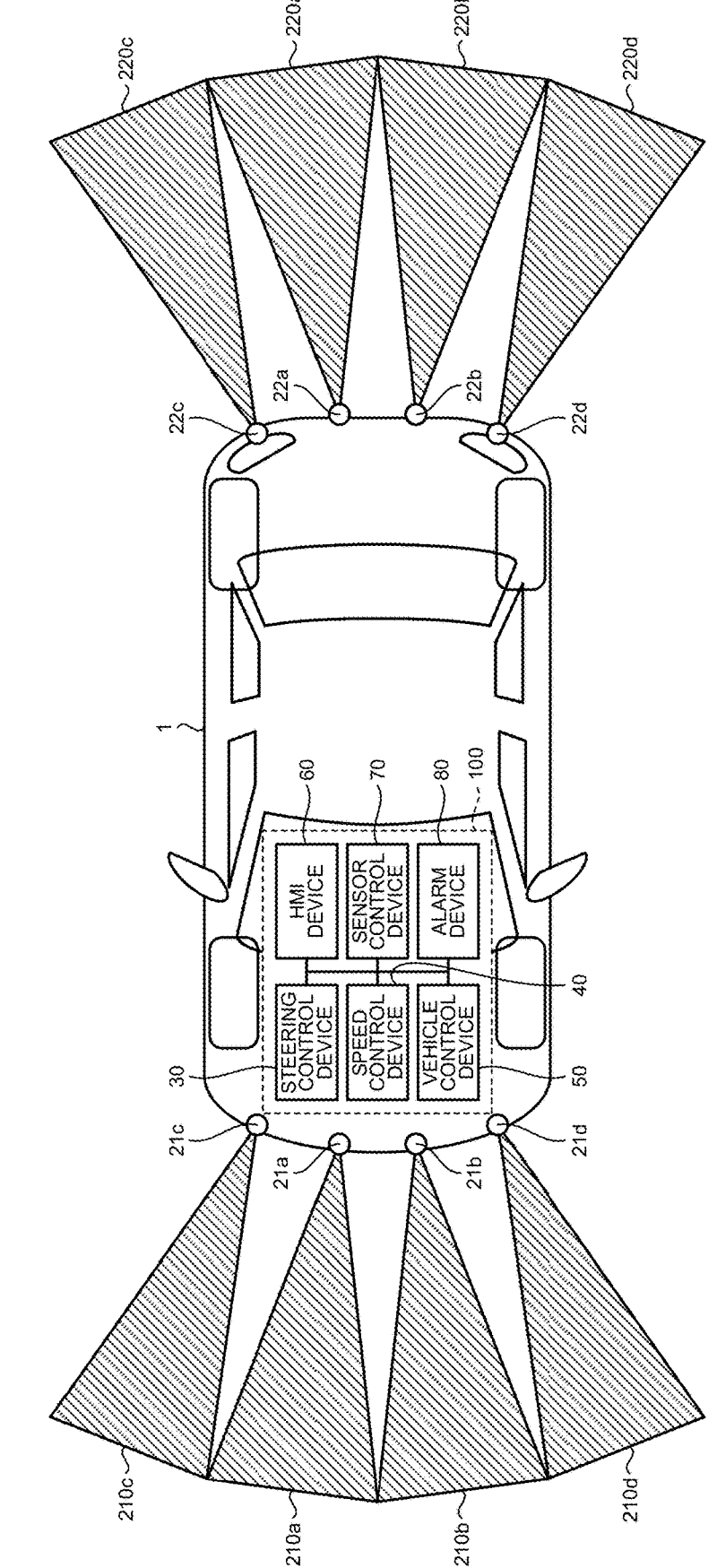
FIG. 1 is a diagram illustrating an example of a configuration of a vehicle on which an in-vehicle system according to an embodiment is mounted.

As illustrated in FIG. 1, a vehicle 1 includes a steering control device 30, a speed control device 40, a vehicle control device 50, a human machine interface (HMI) device 60, a sensor control device 70, and an alarm device 80.

In the present embodiment, an in-vehicle system 100 includes the steering control device 30, the speed control device 40, the vehicle control device 50, the HMI device 60, the sensor control device 70, and the alarm device 80. Note that another device may be further mounted on the vehicle 1. Although the steering control device 30, the speed control device 40, the vehicle control device 50, the HMI device 60, the sensor control device 70, and the alarm device 80 are illustrated as separate devices in FIG. 1, some or all of these devices may be integrated.

The vehicle 1 also includes a first front center sonar 21*a*, a second front center sonar 21*b*, a first front corner sonar 21*c*, a second front corner sonar 21*d*, a first rear center sonar 22*a*, a second rear center sonar 22*b*, a first rear corner sonar 22*c*, and a second rear corner sonar 22*d*.

In the following description, the first front center sonar 21*a*, the second front center sonar 21*b*, the first front corner sonar 21*c*, the second front corner sonar 21*d*, the first rear center sonar 22*a*, the second rear center sonar 22*b*, the first rear corner sonar 22*c*, and the second rear corner sonar 22*d* are also simply referred to as the sonar 21*a*, the sonar 21*b*, the sonar 21*c*, the sonar 21*d*, the sonar 22*a*, the sonar 22*b*, the sonar 22*c*, and the sonar 22*d*.

The sonar 21*a*, the sonar 21*b*, the sonar 21*c*, the sonar 21*d*, the sonar 22*a*, the sonar 22*b*, the sonar 22*c*, and the sonar 22*d* are examples of transmission units and reception units. Among the sonar 21*a*, the sonar 21*b*, the sonar 21*c*, the sonar 21*d*, the sonar 22*a*, the sonar 22*b*, the sonar 22*c*, and the sonar 22*d*, the sonar 21*a*, the sonar 21*b*, the sonar 21*c*, and the sonar 21*d* are provided at the front end portion of the vehicle 1. Also, the sonar 22*a*, the sonar 22*b*, the sonar 22*c*, and the sonar 22*d* are provided at the rear end portion of the vehicle 1.

Hereinafter, when the sonar 21*a*, the sonar 21*b*, the sonar 21*c*, the sonar 21*d*, the sonar 22*a*, the sonar 22*b*, the sonar 22*c*, and the sonar 22*d* are not distinguished from the sonar 22*a*, the sonar 22*b*, the sonar 22*c*, and the sonar 22*d*, the sonars are also referred to as the sonars 21 and the sonars 22. In addition, when the sonar 21*a*, the sonar 21*b*, the sonar 21*c*, and the sonar 21*d* are collectively referred, the sonars may be referred to as the front sonars 21. In addition, when the sonar 22*a*, the sonar 22*b*, the sonar 22*c*, and the sonar 22*d* are collectively referred, the sonars may be referred to as the rear sonars 22.

The sonars 21 and the sonars 22 are arranged at positions advantageous for detection or distance measurement of surrounding objects on the vehicle 1. For example, the plurality of sonars 21 and sonars 22 are arranged on bumpers at a front end portion and a rear end portion of the vehicle 1 at a distance and detect objects in front of and behind the vehicle 1.

The sonars 21 and the sonars 22 are provided on the vehicle 1. The sonars 21 and the sonars 22 transmit ultrasonic waves subjected to frequency modulation. The ultrasonic wave is an example of a transmitted wave signal. In addition, the sonars 21 and the sonars 22 receive signals externally. Here, the signal includes a reflected wave of an ultrasonic wave. The sonar 21 and the sonar 22 detect an object around the vehicle 1 and obtain distance information to the detected object by transmitting an ultrasonic wave and measuring the time until the reflected wave reflected by the object around the vehicle 1 is received.

Note that, in the present embodiment, the term "object" or "obstacle" includes a pedestrian and another vehicle. In addition, an object that does not become an obstacle for the vehicle 1 to run, for example, unevenness of a road surface, or the like is not included in the obstacle.

More specifically, the sonar 21*a* and the sonar 21*b* are provided in the center of the front end portion of the vehicle 1. In addition, in the front end portion of the vehicle 1, the sonar 21*c* and the sonar 21*d* are provided near corners outside the sonar 21*a* and the sonar 21*b*.

In addition, the sonar 22*a* and the sonar 22*b* are provided in the center of the rear end portion of the vehicle 1. In addition, in the rear end portion of the vehicle 1, the sonar 22*c* and the sonar 22*d* are provided near corners outside the sonar 22*a* and the sonar 22*b*.

In FIG. 1, a range in which the sonar 21*a* can detect an object is defined as a detection range 210*a*, a range in which the sonar 21*b* can detect an object is defined as a detection range 210*b*, a range in which the sonar 21*c* can detect an object is defined as a detection range 210*c*, and a range in which the sonar 21*d* can detect an object is defined as a detection range 210*d*. When the individual detection ranges 210*a* to 210*d* are not distinguished from each other, the ranges are also simply referred to as the detection ranges 210.

In addition, a range in which the sonar 22*a* can detect an object is defined as a detection range 220*c*, a range in which the sonar 22*b* can detect an object is defined as a detection range 220*b*, a range in which the sonar 22*c* can detect an object is defined as a detection range 220*c*, and a range in which the sonar 22*d* can detect an object is defined as a detection range 220*d*. When the individual detection ranges 220*a* to 210*d* are not distinguished from each other, the ranges are also simply referred to as the detection ranges 220.

Although the detection ranges 210 and the detection ranges 220 are illustrated separately in FIG. 1, the adjacent detection ranges 210 and the adjacent detection ranges 220 may overlap each other in practice.

When the sonars 21*a*, the sonars 21*b*, the sonars 22*a*, and the sonars 22*b* are not distinguished, the sonars are also referred to as the center sonars 21*a*, 21*b*, 22*a*, and 22*b*. In addition, when the sonars 21*c*, the sonars 21*d*, the sonars 22*c*, and the sonars 22*d* are not distinguished, the sonars are also referred to as the corner sonars 21*c*, 21*d*, 22*c*, and 22*d*.

Note that, in the vehicle 1, the corner sonars 21*c*, 21*d*, 22*c*, and 22*d* may be omitted.

Note that, in the present embodiment, a specific description is given mainly by exemplifying a case where the moving direction of the vehicle 1 is the rear, but for example, when the moving direction of the vehicle 1 is the front, the function exemplified using the rear sonar 22 may be applied to the front sonar 21.

When the vehicle 1 moves straight rearward, an obstacle positioned in the moving direction of the vehicle 1 is detected by the inner sonars 22*a* and 22*b*. In addition, when the vehicle 1 turns left or right toward the rear, an object positioned ahead of the left or right turn is detected by the sonar 22*c* or the sonar 22*d*.

Furthermore, when an obstacle enters the right rear of the vehicle 1 from the right side of the vehicle 1, the sonar 22*c* or the second rear center sonar 22*a* first detects the obstacle. Also, when an obstacle enters the left rear of the vehicle 1 from the left side of the vehicle 1, the sonar 22*d* or the sonar 22*b* first detects the obstacle.

In addition, the installation location and the number of the sonars 21 and the sonars 22 are not limited to the example illustrated in FIG. 1. Note that, in addition to the sonar 21 and the sonar 22, the vehicle 1 may include, as sensors, an imaging device such as a camera, a radar, an antenna capable of receiving a global positioning system (GPS) signal, and a GPS device (not illustrated) that specifies GPS coordinates indicating the position of the vehicle 1 based on the received GPS signal.

Figure 2:
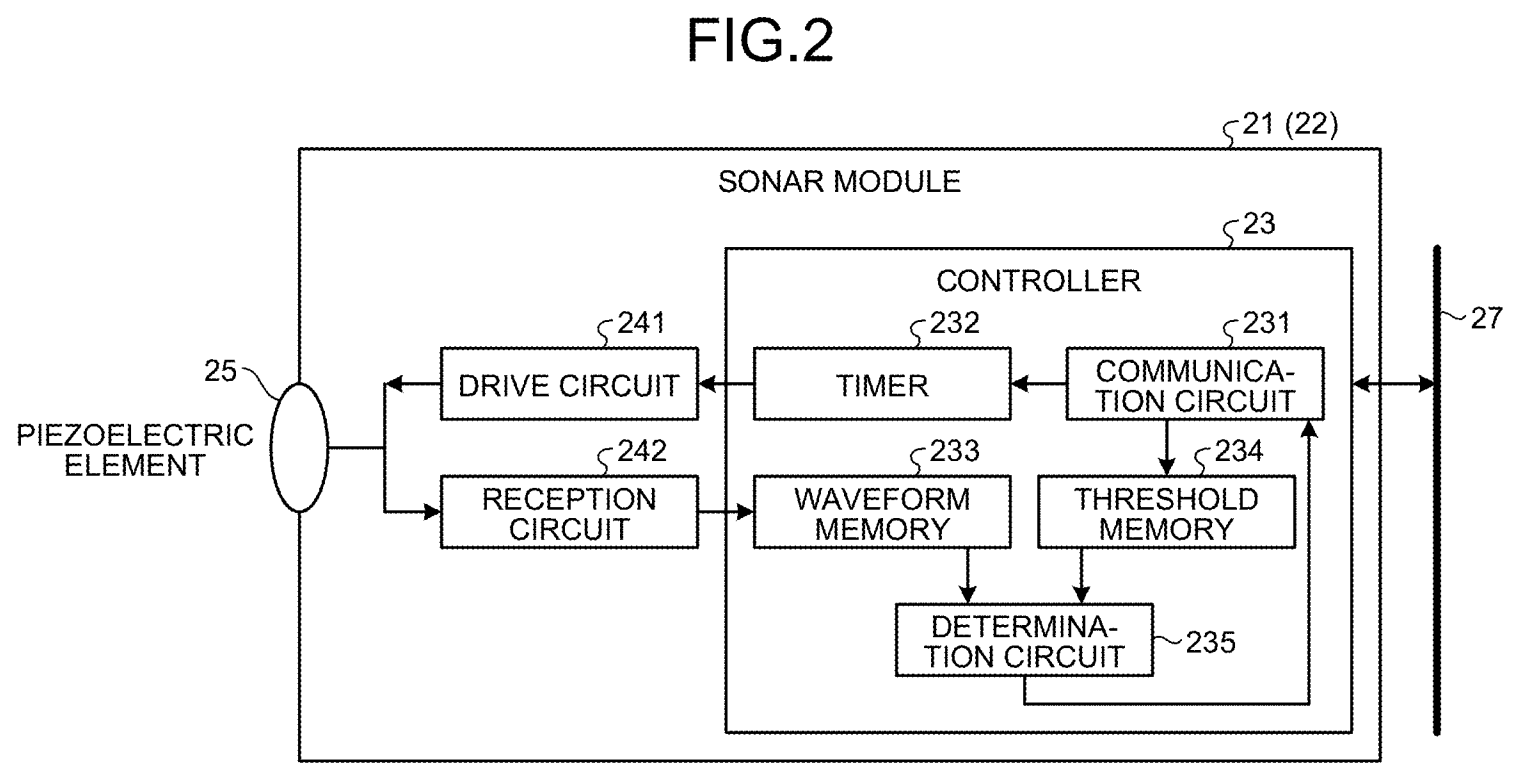

Here, details of the sonar 21 and the sonar 22 are described with reference to FIG. 2. Each of the sonar 21 and the sonar 22 is also referred to as a sonar module. The sonar module includes a controller 23, a drive circuit 241, a reception circuit 242, and a piezoelectric element 25.

First, the drive circuit 241, the reception circuit 242, and the piezoelectric element 25 are described. The sonar module transmits an ultrasonic wave by applying a voltage to the piezoelectric element 25. The controller 23 controls the drive circuit 241, for example, to apply a voltage of 50 KHz to the piezoelectric element 25 so that the piezoelectric element 25 transmits ultrasonic waves of the same frequency. The ultrasonic waves to be transmitted are pulsed. The pulsed ultrasonic wave is reflected when being hit onto a road surface or an obstacle, and a part thereof returns to the sonar 21 and the sonar 22.

Further, the piezoelectric element 25 converts the sound pressure of the returned reflected wave into a voltage. The reception circuit 242 amplifies and rectifies the voltage converted from the sound pressure by the piezoelectric element 25 and converts the voltage into sound wave reception intensity. A waveform indicating the temporal change of the converted sound wave reception intensity is referred to as an echo waveform.

Since the received signal and the amplified received signal are AC and the sound wave reception intensity is obtained by rectifying the amplified received signal, there is a difference between AC and DC. However, since both are obtained by processing the received signal, the signals are not distinguished by AC or DC and may be collectively referred to as received signals. The reception circuit 242 includes an amplifier circuit (not illustrated) that amplifies the voltage converted from the sound pressure by the piezoelectric element 25.

In addition, the sonar module transmits an ultrasonic wave by frequency modulation A or frequency modulation B different from frequency modulation A under the control of the sensor control device 70. The frequency modulation A and the frequency modulation B are examples of frequency modulation patterns.

Here, the frequency modulation A and the frequency modulation B are described with reference to FIGS. 3 to 6.

Figure 3:
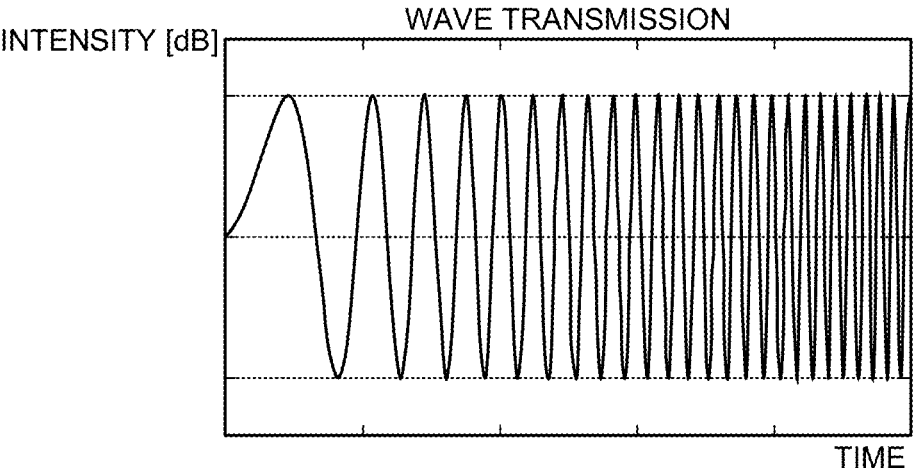
FIG. 3 is a diagram illustrating an example of a waveform of an ultrasonic wave transmitted by the sonar according to the embodiment in a first pattern.
Figure 4:
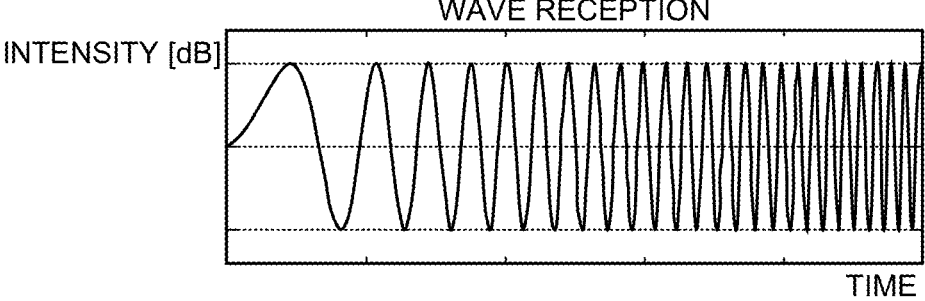
FIG. 4 is a diagram illustrating an example of a waveform of an ultrasonic wave received by the sonar according to the embodiment in the first pattern.

As illustrated in FIG. 3, when the frequency modulation A is used as the frequency modulation pattern, the sonar module transmits an ultrasonic wave by changing the frequency of the ultrasonic wave from a low frequency to a high frequency. The frequency modulation A is an example of a first pattern or a second pattern. Also, when the sonar module receives the reflected wave of the ultrasonic wave transmitted by using the frequency modulation A, the ultrasonic wave is attenuated. Therefore, as illustrated in FIG. 4, the sonar module receives the ultrasonic wave having the amplitude decreased compared with the amplitude at the time of wave transmission.

Figure 5:
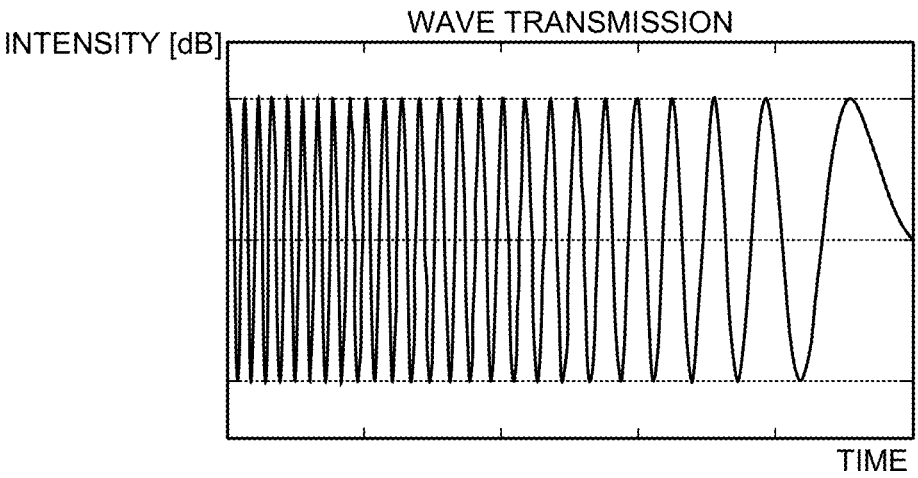
FIG. 5 is a diagram illustrating an example of a waveform of an ultrasonic wave transmitted by the sonar according to the embodiment in a second pattern.
Figure 6:
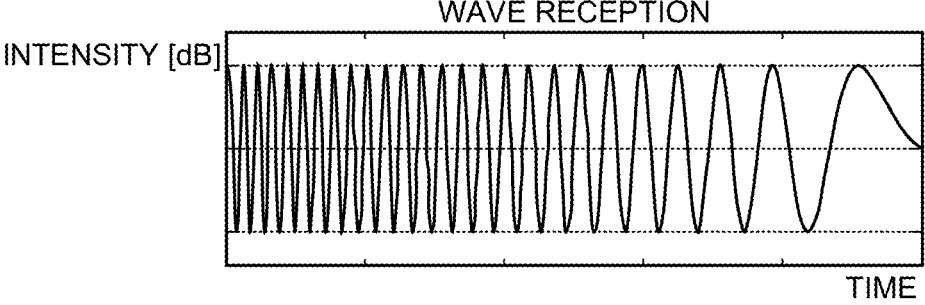
FIG. 6 is a diagram illustrating an example of a waveform of an ultrasonic wave received by the sonar according to the embodiment in the second pattern.

As illustrated in FIG. 5, when the frequency modulation B is used as the frequency modulation pattern, the sonar module transmits an ultrasonic wave by changing the frequency of the ultrasonic wave from a high frequency to a low frequency. The frequency modulation B is an example of the first pattern or the second pattern. Also, when the sonar module receives the reflected wave of the ultrasonic wave transmitted by using the frequency modulation A, the ultrasonic wave is attenuated. Therefore, as illustrated in FIG. 6, the sonar module receives the ultrasonic wave having the amplitude decreased compared with the amplitude at the time of wave transmission.

In the present embodiment, the frequency modulation A and the frequency modulation B are used as the frequency modulation pattern, but the frequency modulation pattern is not limited thereto. For example, either the frequency modulation A or the frequency modulation B may be set to a constant frequency. In addition, the frequency modulation may be performed in a pattern different from the frequency modulation A and the frequency modulation B.

Referring back to FIG. 2, the controller 23 is described. The controller 23 integrally controls the sonar module. The controller 23 includes a communication circuit 231, a timer 232, a waveform memory 233, a threshold memory 234, and a determination circuit 235. The controller 23 is connected to the sensor control device 70 via a transmission path 27. Note that the controller 23 may be connected to the vehicle control device 50 or the like via the transmission path 27.

The communication circuit 231 controls communication between the controller 23 and other devices. For example, the communication circuit 231 transmits and receives data to and from the sensor control device 70 via the transmission path 27. The communication circuit 231 receives a sonar control signal from the sensor control device 70. In addition, the communication circuit 231 transmits detection information indicating whether a reflected wave having an intensity exceeding the threshold is received, distance information indicating the distance from the vehicle 1 to the target, and the like to the sensor control device 70.

The timer 232 measures time. For example, the sonar control signal includes delay time when an ultrasonic wave is transmitted. The timer 232 starts measuring time from a time point when the communication circuit 231 receives the sonar control signal and transmits a drive signal for driving the drive circuit 241 after the delay time elapses. As a result, the sonar module can transmit the ultrasonic wave at the transmission timing determined by the sonar control signal.

The waveform memory 233 stores an echo waveform. The threshold memory 234 stores a short-distance interference detection threshold 810, an obstacle detection threshold 811, and a long-distance interference detection threshold 812 (see FIGS. 12 and 14). The short-distance interference detection threshold 810 is an example of a second threshold. Also, the obstacle detection threshold 811 is an example of a first threshold. Further, the long-distance interference detection threshold 812 is an example of a third threshold. The short-distance interference detection threshold 810, the obstacle detection threshold 811, and the long-distance interference detection threshold 812 are described below.

The determination circuit 235 compares the amplified received signal with the short-distance interference detection threshold 810, the obstacle detection threshold 811, and the long-distance interference detection threshold 812 stored in the threshold memory 234. More precisely, the amplified received signal is rectified to obtain the sound wave reception intensity, and the sound wave reception intensity is compared with each detection threshold. Note that, in the following description, in order to avoid complexity, the comparison may be expressed to compare the received signal with a threshold.

The determination circuit 235 calculates distance information indicating a distance from the vehicle 1 to a target (position where short-distance interference occurs, position of obstacle, and position where long-distance interference occurs) based on a comparison result between the received signal and each detection threshold. The determination circuit 235 sends the calculated distance information to the communication circuit 231. The communication circuit 231 transmits the distance information sent from the determination circuit 235 to the sensor control device 70 via the transmission path 27.

Referring back to FIG. 1, the description is continued. The steering control device 30 controls a steering angle of the vehicle 1. The steering control device 30 is also referred to as a steering angle control device. The steering control device 30 is disposed, for example, at a position advantageous for steering assistance of power steering of the vehicle 1.

The speed control device 40 controls acceleration and braking of the vehicle 1. The speed control device 40 is disposed, for example, at a position advantageous for controlling the engine or the motor and the brake.

The vehicle control device 50 is a device that controls various behaviors of the vehicle 1, and is disposed, for example, near the steering control device 30 and the speed control device 40.

The HMI device 60 may include a display (not illustrated) capable of displaying information, a touch panel or a switch capable of receiving an operation by the user, and the like. Note that the display and the touch panel may be configured as an integrated device. The display is also referred to as a display unit. The touch panel and the switch are also referred to as operation units. The display unit and the operation unit included in the HMI device 60 are arranged around the driver's seat.

The alarm device 80 notifies the driver of a warning of other vehicles and obstacles detected by the vehicle control device 50 and the sensor control device 70. The alarm device 80 may be included in the HMI device 60.

The sensor control device 70 controls the sonar module. The sensor control device 70 and the sonar module are examples of the obstacle detection device in the present embodiment. Also, the obstacle detection device may include the entire in-vehicle system 100 or any one of the steering control device 30, the speed control device 40, the vehicle control device 50, the HMI device 60, and the alarm device 80 included in the in-vehicle system 100.

The steering control device 30, the speed control device 40, the vehicle control device 50, the HMI device 60, and the sensor control device 70 are connected by wire, for example, through a local area network such as a controller area network (CAN). Also, the sonar 21, the sonar 22, and an imaging device 16 may be connected to a local area network or may be connected to the sensor control device 70 or the vehicle control device 50 by dedicated wiring.

Figure 7:
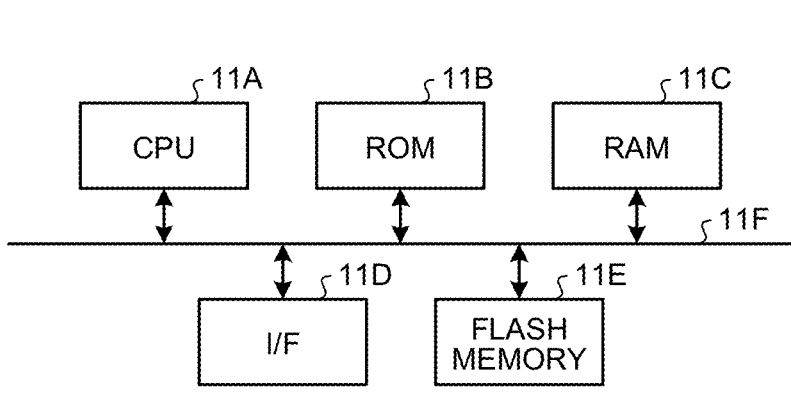
FIG. 7 is a diagram illustrating an example of a hardware configuration of a sensor control device according to the embodiment.

Hereinafter, a hardware configuration of the sensor control device 70 is described. As illustrated in FIG. 7, the sensor control device 70 has a hardware configuration using a normal computer in which a central processing unit (CPU) 11A, a read only memory (ROM) 11B, a random access memory (RAM) 11C, an interface (I/F) 11D, a flash memory 11E, and the like are connected to each other via a bus 11F.

The CPU 11A is an arithmetic device that controls the entire sensor control device 70. Note that the CPU 11A is an example of a processor, and another processor or a processing circuit may be provided instead of the CPU 11A. The ROM 11B stores programs and the like for realizing various processes by the CPU 11A. The RAM 11C is, for example, a main storage device of the sensor control device 70 and stores data used for various processes by the CPU 11A.

The I/F 11D is an interface for transmitting and receiving data. In addition, the I/F 11D may transmit and receive information to and from another device mounted on the vehicle 1 via a CAN or the like in the vehicle 1. In addition, the flash memory 11E is an example of a writable nonvolatile storage medium. The ROM 11B, the RAM 11C, and the flash memory 11E are also referred to as storage units. Note that the sensor control device 70 may include another storage device such as a hard disk drive (HDD) instead of the flash memory 11E or in addition to the flash memory 11E.

The hardware configurations of the steering control device 30, the speed control device 40, the vehicle control device 50, and the HMI device 60 also include, for example, a processing circuit such as a CPU, a ROM, a RAM, an I/F, and a flash memory.

Figure 8:
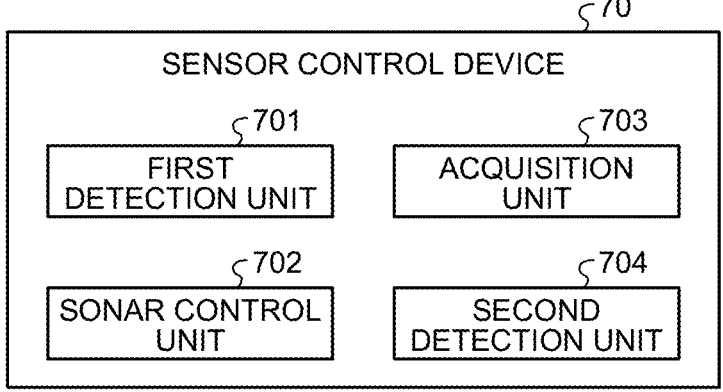
FIG. 8 is a block diagram illustrating an example of functions provided by the sensor control device according to the embodiment.

As illustrated in FIG. 8, the sensor control device 70 includes a first detection unit 701, a sonar control unit 702, an acquisition unit 703, and a second detection unit 704. Note that the function of the sensor control device 70 is not limited thereto.

The first detection unit 701 detects an action serving as a trigger for operating the sonar module. For example, the first detection unit 701 detects the start of backward movement of the vehicle. In this case, the first detection unit 701 detects an electric signal (hereinafter, also referred to as +B) output from the battery when the driver of the vehicle 1 sets the gear to reverse as a signal serving as a trigger for operating the sonar 22.

The sonar control unit 702 generates a sonar control signal for controlling the sonar module. The sonar module generates an ultrasonic wave signal according to the sonar control signal.

In addition, the sonar control unit 702 determines the frequency modulation pattern to be applied to the ultrasonic wave and the wave transmission timing of the ultrasonic wave based on the detection result of the second detection unit 704. The sonar control unit 702 is an example of a determination unit. For example, the sonar control unit 702 determines a frequency modulation pattern and a wave transmission timing for transmitting an ultrasonic wave based on a detection result of the second detection unit 704 and generates a sonar control signal according to the determination.

The acquisition unit 703 acquires detection information and distance information from the sonar module. Specifically, the acquisition unit 703 acquires detection information and distance information of the sonar module received via the I/F 11D.

The second detection unit 704 detects an object existing in a wave transmission direction of an ultrasonic wave based on a reflected wave of the ultrasonic wave received by the sonar module. The second detection unit in this case is an example of the object detection unit.

In addition, based on the ultrasonic wave received by the sonar module, the second detection unit 704 detects another ultrasonic wave transmitted from a transmission unit different from the sonar module of the vehicle 1 that transmits the ultrasonic wave as interference. The second detection unit 704 in this case is an example of the interference detection unit. Here, in the present specification, the interference refers to a phenomenon in which ultrasonic waves overlap and intensify or weaken each other.

Specifically, the second detection unit 704 detects the existence or absence of short-distance interference, the existence or absence of an obstacle, and the existence or absence of long-distance interference based on the detection information of the sonar module and the distance information acquired by the acquisition unit 703.

Hereinafter, processes executed by the sensor control device 70 are described with specific examples with reference to FIGS. 9 to 33. In the following description, a scene in which a vehicle 1A and a vehicle 1B face each other backward as illustrated in FIG. 9 is described as an example.

Figure 10:
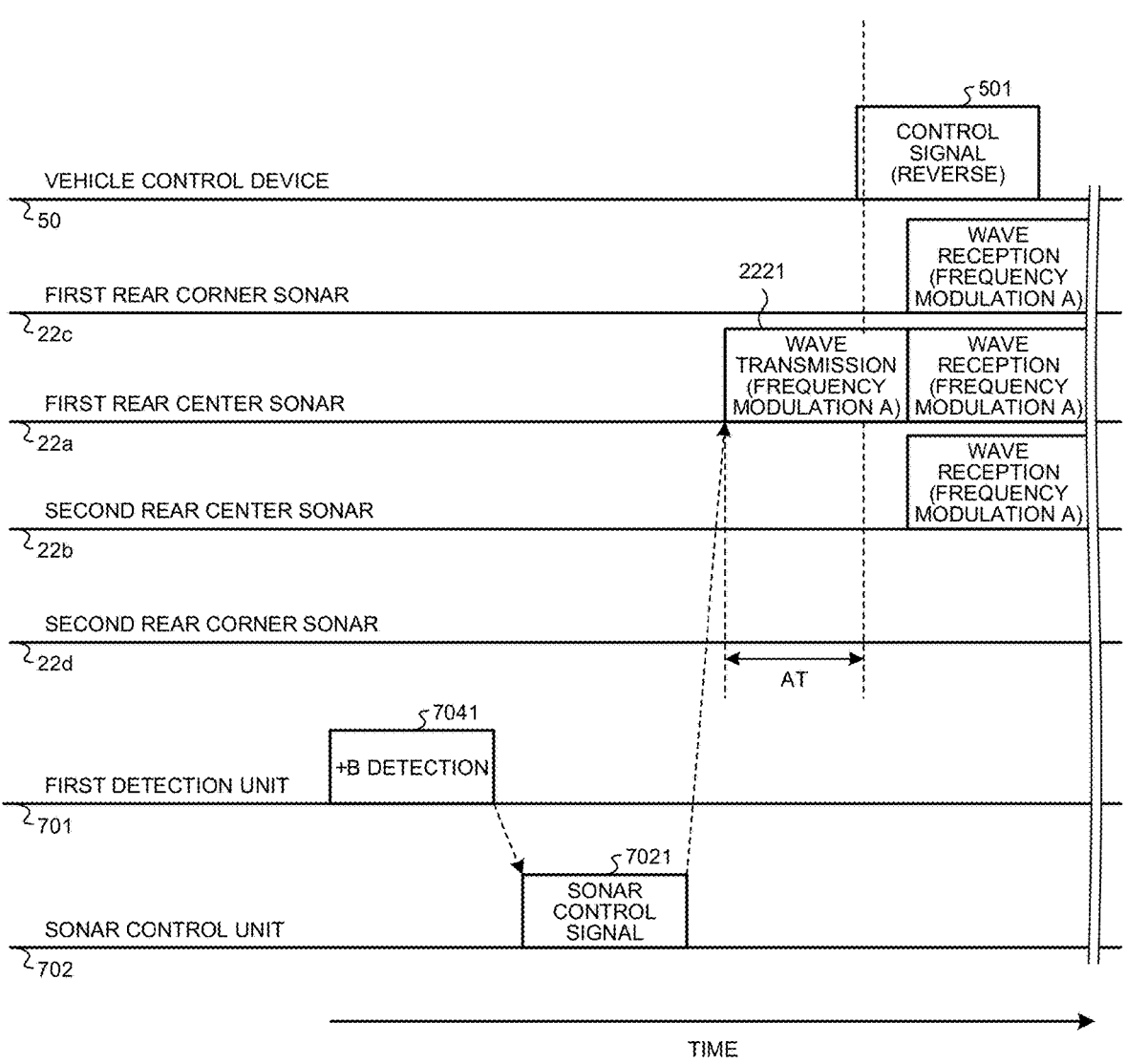
FIG. 10 is a diagram illustrating an example of flows of processes of respective units of the vehicle according to the embodiment.

A flow of processes of respective units of the vehicle 1A according to the embodiment is described with reference to FIG. 10. First, as a premise, it is assumed that the driver of the vehicle 1A performs an operation of setting the gear to reverse. Accordingly, the battery outputs+B. The first detection unit 701 detects+B and detects the start of backward movement of the vehicle 1A (process 7011).

The sonar control unit 702 generates a sonar control signal that controls the sonar 22 to transmit ultrasonic waves according to a predetermined frequency modulation pattern and a predetermined transmission timing (process 7021).

Specifically, the sonar control unit 702 sets the frequency modulation pattern to the frequency modulation A and generates a sonar control signal according to a predetermined delay time. In the present embodiment, the predetermined frequency modulation pattern is the frequency modulation A in the process 7021, but the predetermined frequency modulation pattern may be the frequency modulation B.

The sonar control unit 702 outputs the generated sonar control signal to the sonar 22a and the sonar 22c via the I/F 11D. Here, after a certain period elapses from the wave transmission of the ultrasonic wave by the sonar 22a, the sonar control unit 702 generates a sonar control signal so as to transmit the ultrasonic wave to the sonar 22c.

The sonar 22a and the sonar 22c receive the sonar control signal via the communication circuit 231. Then, the sonar 22a transmits an ultrasonic wave based on the received sonar control signal (process 2221). Specifically, the sonar 22a transmits an ultrasonic wave in a frequency modulation pattern of the frequency modulation A at normal delay time.

Here, after the sonar 22a transmits an ultrasonic wave, the vehicle control device 50 transmits a control signal (hereinafter, also referred to as a reverse signal) for backward movement of a vehicle 1A (process 501). In vehicles using the technology in the related art, a configuration in which a sonar transmits an ultrasonic wave in accordance with detection of a reverse signal is often adopted.

In contrast, in the present embodiment, the sonar 22a is configured to transmit an ultrasonic wave in accordance with the detection of +B. Therefore, the sonar 22a can transmit the ultrasonic wave earlier by the time indicated by an arrow AT in FIG. 10 than a case where the sonar transmits the ultrasonic wave in accordance with the detection of the reverse signal. As a result, the obstacle can be detected more quickly.

Here, a flow of processes of respective units of the vehicle 1A according to the embodiment is described with reference to FIG. 11. The horizontal axis in FIG. 11 indicates a time axis. Also in the following drawings, when arrows indicating time are described, the horizontal axis indicates a time axis. After the wave transmission of the ultrasonic wave by the sonar 22a (process 2221), the sonar 22a performs a process of receiving a reflected wave of the transmitted ultrasonic wave (process 2222). In addition, the sonar 22c performs a process of receiving the reflected wave of the ultrasonic wave transmitted by the sonar 22a in the process 2221 (process 2211). In addition, the sonar 22b performs a process of receiving the reflected wave of the ultrasonic wave transmitted by the sonar 22a in the process 2221 (process 2231).

In addition, after a certain period of time elapses from the wave transmission of the ultrasonic wave by the sonar 22a (process 2221), the sonar 22c transmits an ultrasonic wave based on the received sonar control signal (process 2212). After the wave transmission of the ultrasonic wave by the sonar 22c, the sonar 22c performs a process of receiving a reflected wave of the ultrasonic wave transmitted in the process 2212 (process 2213).

The determination circuits 235 of the sonar 22a, the sonar 22c, and the sonar 22b compare the received signals with each of the short-distance interference detection threshold 810, the obstacle detection threshold 811, and the long-distance interference detection threshold 812 and calculate distance information.

The communication circuits 231 of the sonar 22a, the sonar 22c, and the sonar 22b transmit the distance information to the sensor control device 70. The sensor control device 70 receives the distance information via the I/F 11D, and the second detection unit 704 detects the existence or absence of an obstacle based on the corresponding distance information (process 7041).

In the present embodiment, in order to avoid erroneous detection, the second detection unit 704 detects that there is an obstacle when the sonar module continuously receives the transmitted reflected wave a plurality of times (for example, three times). In the present embodiment, a case where the reflected wave is continuously received three times is a condition for obstacle detection.

Here, a distance information calculation process of the determination circuit 235 of the sonar 22 and an obstacle detection process of the second detection unit 704 of the sensor control device 70 are described with reference to FIG. 12. Note that, in the present embodiment, the received signal refers to a signal obtained by rectifying a received ultrasonic wave signal.

Figure 12:
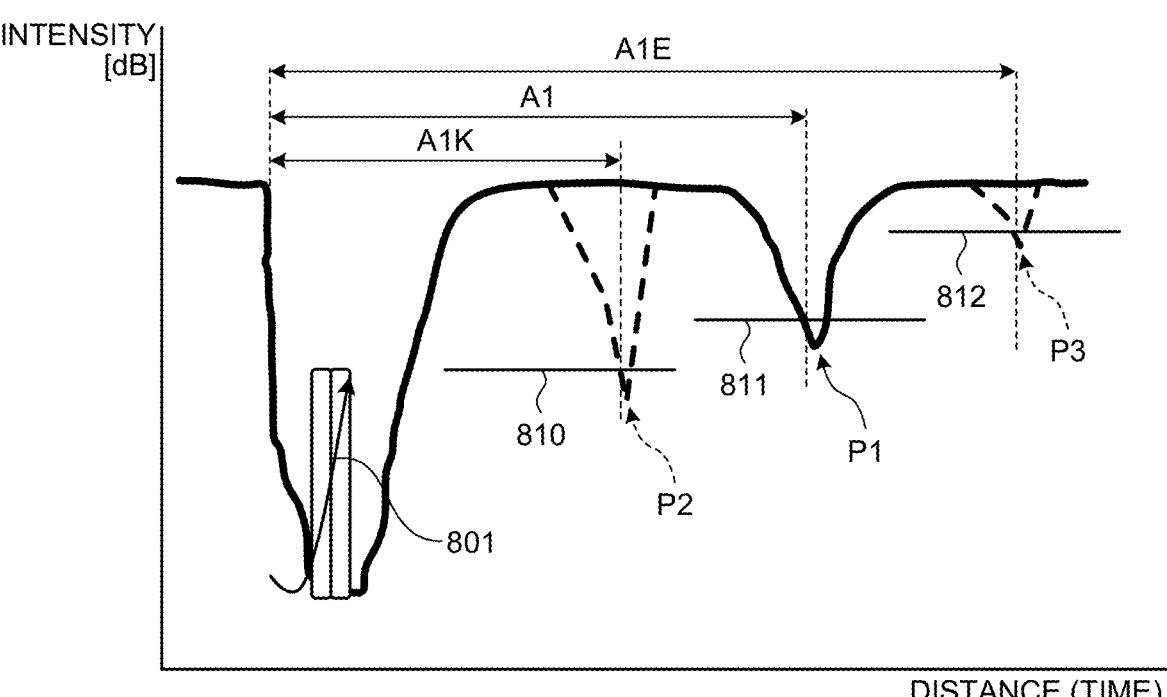
FIG. 12 is an explanatory diagram illustrating an example of a received signal according to the embodiment.

FIG. 12 illustrates a received signal obtained by rectifying the reflected wave of the sonar 22a received in the process 2222, a received signal obtained by rectifying the reflected wave of the sonar 22c received in the process 2211, and a relationship of the short-distance interference detection threshold 810, the obstacle detection threshold 811, and the long-distance interference detection threshold 812 with frequency modulation A801 which is the frequency modulation pattern at the time of wave transmission.

A solid line waveform in FIG. 12 indicates an example of a received signal when an obstacle exists. Specifically, the received signal illustrated in FIG. 12 includes a peak P1 of the received wave indicating the existence of the obstacle.

Furthermore, a dotted waveform in FIG. 12 illustrates an example of a received signal when the short-distance interference and the long-distance interference occur due to the influence of an ultrasonic wave generated from another vehicle. In addition to the existence of an obstacle, when short-distance interference occurs, two peaks P2 and P1 of the received waves exist in the received signal. Also, in addition to the existence of an obstacle, when long-distance interference occurs, two peaks P1 and P3 of the received waves exist in the received signal.

Also, in addition to the existence of an obstacle, when short-distance interference and long-distance interference occur, three peaks P2, P1, and P3 of the received waves exist in the received signal.

For example, in the situation illustrated in FIG. 9, when interference occurs at a position closer to the vehicle 1A than the position where the vehicle 1B exists, the sonar 22 receives an interference wave such as an ultrasonic wave generated by the sonar 22 of the vehicle 1B or a reflected wave of the ultrasonic wave before receiving the reflected wave reflected by the vehicle 1B. Therefore, P2 indicating the short-distance interference by the vehicle 1B mainly appears before the peak P1 indicating the reflected wave reflected by the vehicle 1B.

Also, in this case, since interference occurs at a position close to the vehicle 1A, the amplitude of the peak P2 becomes larger than the amplitude of the peak P1 indicating the reflected wave reflected by the vehicle 1B. Then, as illustrated in FIG. 12, since the signal intensity at the peak position decreases as the amplitude increases, the signal intensity satisfies the peak P1>the peak P2.

Note that the short-distance interference detection threshold 810 is a threshold of signal intensity for identifying whether the interference is short-distance interference. Specifically, based on the relationship of the peak P1>the peak P2, the short-distance interference detection threshold 810 is set to a value smaller than the obstacle detection threshold 811.

Furthermore, for example, in the situation of FIG. 9, when interference occurs at a position farther than the position where the vehicle 1B exists, the sonar 22 receives an interference wave or the like occurring by multiple reflection after receiving a reflected wave reflected by the vehicle 1B. Therefore, P3 indicating the long-distance interference by multiple reflections mainly exists after the peak P1 indicating the reflected wave reflected by the vehicle 1B.

Also, in this case, since interference occurs at a position far from the vehicle 1A, the amplitude of the peak P3 becomes smaller than the amplitude of the peak P1 indicating the reflected wave reflected by the vehicle 1B. Then, as illustrated in FIG. 12, since the signal intensity at the peak position decreases as the amplitude increases, the signal intensity satisfies the peak P1<the peak P3.

Note that the long-distance interference detection threshold 812 is a threshold of signal intensity for identifying whether the interference is long-distance interference. Specifically, based on the relationship of the peak P1<the peak P3, the long-distance interference detection threshold 812 is set to a value larger than the obstacle detection threshold 811.

Next, the calculation process of distance information by the determination circuit 235 is described. First, the determination circuit 235 compares the received signal with the obstacle detection threshold 811 to determine the existence or absence of a peak falling below the obstacle detection threshold 811. If there is a peak falling below the obstacle detection threshold 811, the determination circuit 235 determines the number of peaks falling below the obstacle detection threshold 811.

When there is one peak falling below the obstacle detection threshold 811, the determination circuit 235 determines that peak P1 or P2 exists. In this case, the determination circuit 235 determines the existence or absence of a peak falling below the short-distance interference detection threshold 810.

When there is one peak falling below the obstacle detection threshold 811, and the peak falls below the short-distance interference detection threshold 810, the determination circuit 235 determines that the peak P2 exists and calculates a distance value A1K illustrated in FIG. 12 as the distance information.

Meanwhile, when there is one peak falling below the obstacle detection threshold 811, and the peak is equal to or larger than the short-distance interference detection threshold 810, the determination circuit 235 determines that the peak P1 exists. In this case, the determination circuit 235 determines whether there is a peak falling below the long-distance interference detection threshold 812 other than the peak P1.

When there is one peak falling below the obstacle detection threshold 811, and there is a peak falling below the long-distance interference detection threshold 812 other than the peak, the determination circuit 235 determines that the peaks P1 and P3 exist and calculates two distance values A1 and A1E illustrated in FIG. 12 as the distance information.

Meanwhile, when there is one peak falling below the obstacle detection threshold 811, and there is not a peak falling below the long-distance interference detection threshold 812 other than the peak, the determination circuit 235 determines that the peak P1 exists and calculates the distance value A1 illustrated in FIG. 12 as the distance information.

Also, when there are two peaks falling below the obstacle detection threshold 811, the determination circuit 235 compares the received signal with the short-distance interference detection threshold 810 and determines the existence or absence of a peak falling below the short-distance interference detection threshold 810.

Note that the sonar performs distance detection by time of flight (ToF). In addition, since the wave height of the reflected wave attenuates according to the distance, the setting of each threshold may be determined according to the distance to the object.

When there are two peaks falling below the obstacle detection threshold 811, and at least one peak among the two peaks falls below the short-distance interference detection threshold 810, the determination circuit 235 determines that the peaks P2 and P1 exist. At this time, the determination circuit 235 sets a peak having the largest amplitude as P2 and a peak having the second largest amplitude as P1 and calculates two distance values A1K and A1 illustrated in FIG. 12 as distance information.

Meanwhile, when there are two peaks falling below the obstacle detection threshold 811, and both the peaks are equal to or larger than the short-distance interference detection threshold 810, the determination circuit 235 determines that the peaks P1 and P3 exist. At this time, the determination circuit 235 sets a peak having the largest amplitude as P1 and a peak having the second largest amplitude as P3 and calculates two distance values A1 and A1E illustrated in FIG. 12 as distance information.

Also, when three or more peaks falling below the obstacle detection threshold 811 exist, the determination circuit 235 determines the existence or absence of a peak falling below the short-distance interference detection threshold 810.

When there are three or more peaks falling below the obstacle detection threshold 811, and at least one peak among the three peaks falls below the short-distance interference detection threshold 810, the determination circuit 235 determines that the peaks P2, P1, and P3 exist. At this time, the determination circuit 235 sets a peak having the largest amplitude as P2, a peak having the second largest amplitude as P1, and a peak having the third largest amplitude as P3 and calculates three distance values A1k, A1, and ALE illustrated in FIG. 12 as distance information.

Note that the determination circuit 235 may not detect a peak existing at time later than the peak P3 as a peak.

Meanwhile, when there are three or more peaks falling below the obstacle detection threshold 811, and all of the three peaks are equal to or larger than the short-distance interference detection threshold 810, the determination circuit 235 determines that the peaks P1 and P3 exist. At this time, the determination circuit 235 sets a peak having the largest amplitude as P1 and a peak having the second largest amplitude as P3 and calculates two distance values A1 and A1E illustrated in FIG. 12 as distance information.

Note that the determination circuit 235 may not detect a peak existing at time later than the peak P3 as a peak.

Also, when there is not a peak falling below the obstacle detection threshold 811, the determination circuit 235 determines the existence or absence of a peak falling below the long-distance interference detection threshold 812. When a peak falling below the obstacle detection threshold 811 does not exist, and the amplitude of the portion having the largest amplitude of the received signal falls below the long-distance interference detection threshold 812, the determination circuit 235 determines that the peak P3 exists. The determination circuit 235 sets the corresponding portion as the peak P3 and calculates the distance value A1E illustrated in FIG. 12 as distance information.

Meanwhile, when a peak falling below the obstacle detection threshold 811 does not exist, and the amplitude of the portion having the largest amplitude in the received signal is equal to or larger than the long-distance interference detection threshold 812, the determination circuit 235 sets information indicating that all the distance values A1K, A1, and ALE are not calculated as the distance information.

The distance information calculated by the determination circuit 235 is sent to the communication circuit 231. The communication circuit 231 transmits the distance information sent by the determination circuit 235 to the sensor control device 70. Then, the transmitted distance information is acquired by the acquisition unit 703 of the sensor control device 70.

Note that although FIG. 12 illustrates the received signal obtained by rectifying the reflected wave of the sonar 22*a* received in the process 2222 and the received signal obtained by rectifying the reflected wave of the sonar 22*c* received in the process 2211. However, the same applies to the received signal obtained by rectifying the reflected wave of the second center sonar 22*b* received in the process 2231 as in FIG. 12.

Next, the obstacle detection process by the second detection unit 704 is described. In the example of the process 7041 of FIG. 11, the second detection unit 704 detects the existence or absence of the obstacle based on the distance information calculated from the received signal obtained by rectifying the reflected waves received in the process 2222, the process 2211, and the process 2231.

Specifically, when the distance value A1 is calculated from all of the received signals received in the process 2222, the process 2211, and the process 2231, the second detection unit 704 detects that the obstacle exists around the vehicle 1A. Meanwhile, in other cases, the second detection unit 704 detects that an obstacle does not exist around the vehicle 1A.

Note that when the difference between the distance values A1 respectively calculated based on the received signals obtained by rectifying the reflected wave received in the process 2222, the process 2211, and the process 2231 exceeds a predetermined threshold, even if the distance values A1 are calculated from all the received signals received in the process 2222, the process 2211, and the process 2231, the second detection unit 704 may detect that an obstacle does not exist around the vehicle 1A.

Referring back to FIG. 11, the description is continued. The sonar control unit 702 generates a sonar control signal based on the detection result of the second detection unit 704 in the process 7041 (process 7022). Specifically, when the second detection unit 704 detects that an obstacle does not exist, the sonar control unit 702 sets the frequency modulation pattern to the frequency modulation A and generates a sonar control signal for controlling the sonar 22 to transmit an ultrasonic wave according to predetermined delay time.

Meanwhile, when the existence of the obstacle is detected by the second detection unit 704, the sonar control unit 702 determines the frequency modulation pattern to be the frequency modulation A and generates a sonar control signal according to predetermined delay time. In the present embodiment, the frequency modulation pattern when an obstacle is detected is set to the frequency modulation A in the process 7022, but the frequency modulation pattern when an obstacle is detected may be the frequency modulation B.

Figure 11:
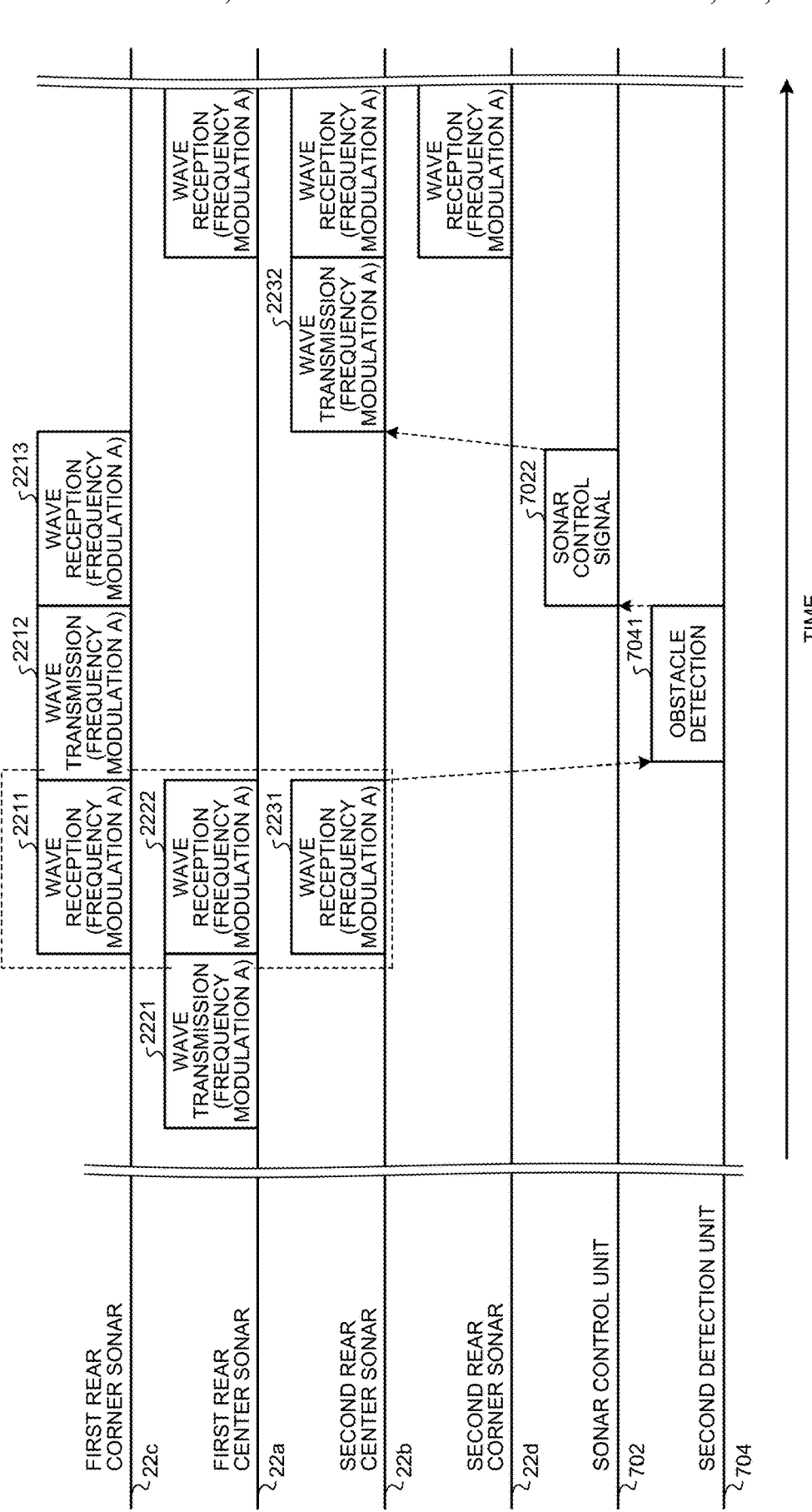
FIG. 11 is a diagram illustrating an example of flows of processes of respective units of the vehicle according to the embodiment.

Here, in the example of FIG. 11, it is assumed that an obstacle is detected by the second detection unit 704 in the process 7041, the frequency modulation pattern is set to the frequency modulation A in the process 7022, and a sonar control signal for controlling the sonar 22 to transmit an ultrasonic wave according to predetermined delay time is generated.

In addition, in the process 7022 of FIG. 11, the sonar control unit 702 transmits the generated sonar control signal to the sonar 22b and the sonar 22d via the I/F 11D. Here, after a certain period of time elapses from the wave transmission of the ultrasonic wave of the first time by the sonar 22b, the sonar control unit 702 generates a sonar control signal such that the ultrasonic wave of the first time is transmitted to the sonar 22d.

The sonar 22b and the sonar 22d receive the sonar control signal via the communication circuit 231. Then, the sonar 22b transmits the ultrasonic wave of the first time based on the received sonar control signal (process 2232). Specifically, the sonar 22b transmits the ultrasonic wave of the first time in a frequency modulation pattern of the frequency modulation A at normal delay time.

Figure 13:
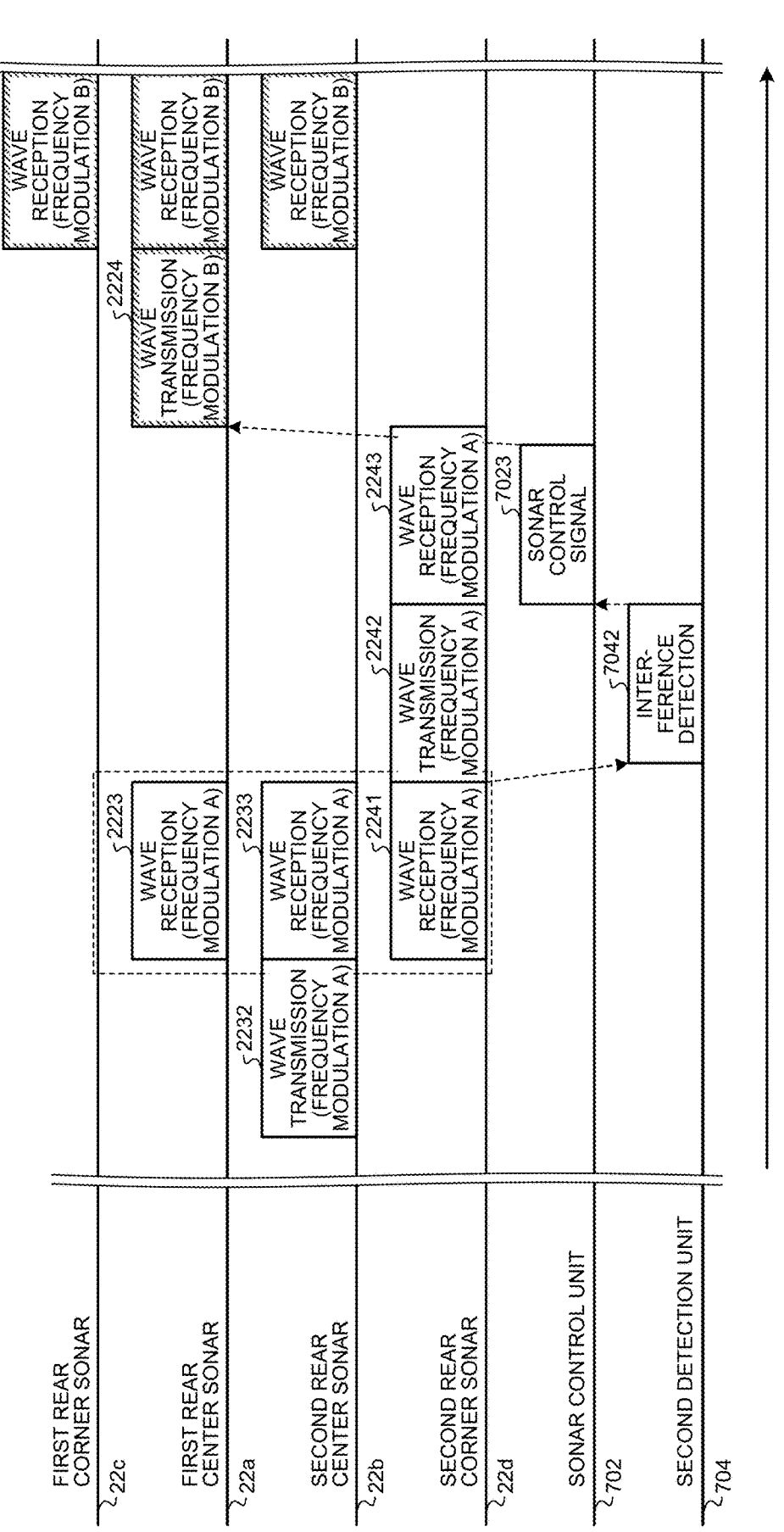
FIG. 13 is a diagram illustrating an example of flows of processes of respective units of the vehicle according to the embodiment.

Here, a flow of processes of respective units of the vehicle 1A according to the embodiment is described with reference to FIG. 13. After the wave transmission of the ultrasonic wave by the sonar 22b, the sonar 22b performs a process of receiving a reflected wave of the transmitted ultrasonic wave of the first time (process 2233). In addition, the sonar 22d performs a process of receiving the reflected wave of the ultrasonic wave of the first time transmitted by the sonar 22b (process 2241).

In addition, the sonar 22a performs a process of receiving the reflected wave of the ultrasonic wave of the first time transmitted by the sonar 22b (process 2223).

In addition, after a certain period of time elapses from the wave transmission of the ultrasonic wave of the first time by the sonar 22b, the sonar 22d transmits the ultrasonic wave of the first time according to the received sonar control signal (process 2242). After the wave transmission of the ultrasonic wave by the sonar 22d, the sonar 22d performs a process of receiving a reflected wave of the transmitted ultrasonic wave of the first time (process 2243).

The determination circuits 235 of the sonar 22a, the sonar 22c, and the sonar 22b compare the received signals with each of the short-distance interference detection threshold 810, the obstacle detection threshold 811, and the long-distance interference detection threshold 812 and calculate distance information.

The communication circuits 231 of the sonar 22a, the sonar 22c, and the sonar 22b transmit the distance information to the sensor control device 70. The sensor control device 70 receives the distance information via the I/F 11D, and the second detection unit 704 detects interference based on the corresponding distance information (process 7042).

Here, a distance information calculation process of the determination circuit 235 of the sonar 22 and an interference detect process of the second detection unit 704 of the sensor control device 70 are described with reference to FIG. 14.

Figure 14:
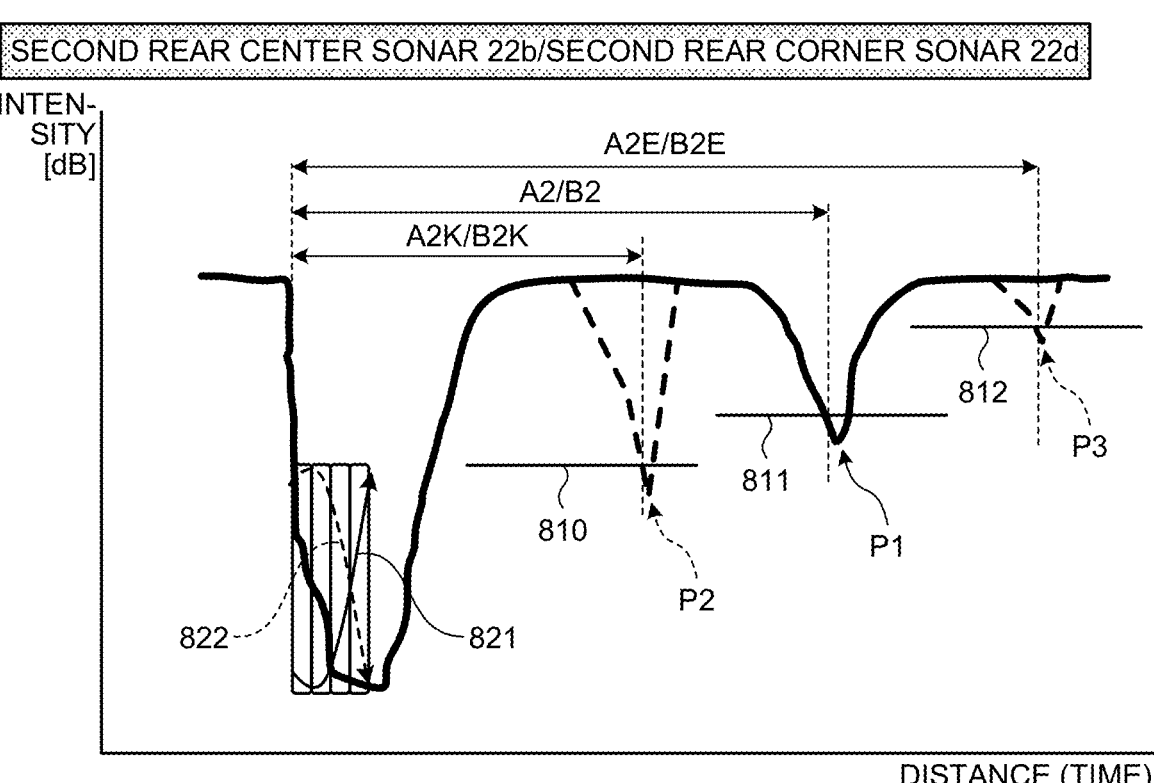
FIG. 14 is an explanatory diagram illustrating an example of a received signal according to the embodiment.

FIG. 14 illustrates a received signal obtained by rectifying the reflected wave of the sonar 22b received in the process 2233, a received signal obtained by rectifying the reflected wave of the sonar 22d received in the process 2241, and a relationship of the short-distance interference detection threshold 810, the obstacle detection threshold 811, and the long-distance interference detection threshold 812 with frequency modulation A821 or frequency modulation B822 which is the frequency modulation pattern at the time of wave transmission.

The process of the determination circuit 235 is substantially the same as the case of FIG. 12, but after the processes of the process 2233, the process 2241, and the process 2223, the determination circuit 235 calculates a distance value A2 or B2 instead of the distance value A1, a distance value A2K or B2K instead of A1k, and a distance value A2E or B2E instead of the distance value A1E.

Note that when the sonar 22b and the sonar 22d transmit a wave in the frequency modulation A, the determination circuit 235 calculates A2, A2K, and A2E. Note that when the sonar 22b and the sonar 22d transmit a wave in the frequency modulation B, the determination circuit 235 calculates B2, B2K, and B2E.

Next, the interference detection process by the second detection unit 704 is described. In the example of the process 7042 of FIG. 13, the second detection unit 704 detects the existence or absence of the short-distance interference, the existence or absence of the obstacle, and the existence or absence of the long-distance interference based on the distance information calculated from the received signal obtained by rectifying the reflected waves received in the process 2233, the process 2241, and the process 2223.

Specifically, when the distance value A2K or B2K is calculated from all of the received signals obtained by rectifying the reflected wave received in the process 2233, the process 2241, and the process 2223, the second detection unit 704 detects that the short-distance interference exists in the vehicle 1A. Meanwhile, in other cases, the second detection unit 704 detects that short-distance interference does not exist in the vehicle 1A.

In addition, when the distance value A2 or B2 is calculated from all of the received signals obtained by rectifying the reflected wave received in the process 2233, the process 2241, and the process 2223, the second detection unit 704 detects that the obstacle exists around the vehicle 1A. Meanwhile, in other cases, the second detection unit 704 detects that an obstacle does not exist around the vehicle 1A.

In addition, when the distance value A2E or B2E is calculated from all of the received signals obtained by rectifying the reflected wave received in the process 2233, the process 2241, and the process 2223, the second detection unit 704 detects that the long-distance interference exists in the vehicle 1A. Meanwhile, in other cases, the second detection unit 704 detects that long-distance interference does not exist in the vehicle 1A.

Also, based on the distance values A1, A1K, ALE, A2 (or B2), A2K (or B2K), and A2E (or B2E), the second detection unit 704 detects the interference pattern used to determine the frequency modulation pattern (the frequency modulation A or the frequency modulation B) and the transmission timing (no delay time or extension of the delay time) of the ultrasonic wave to be transmitted next time.

Figure 15:
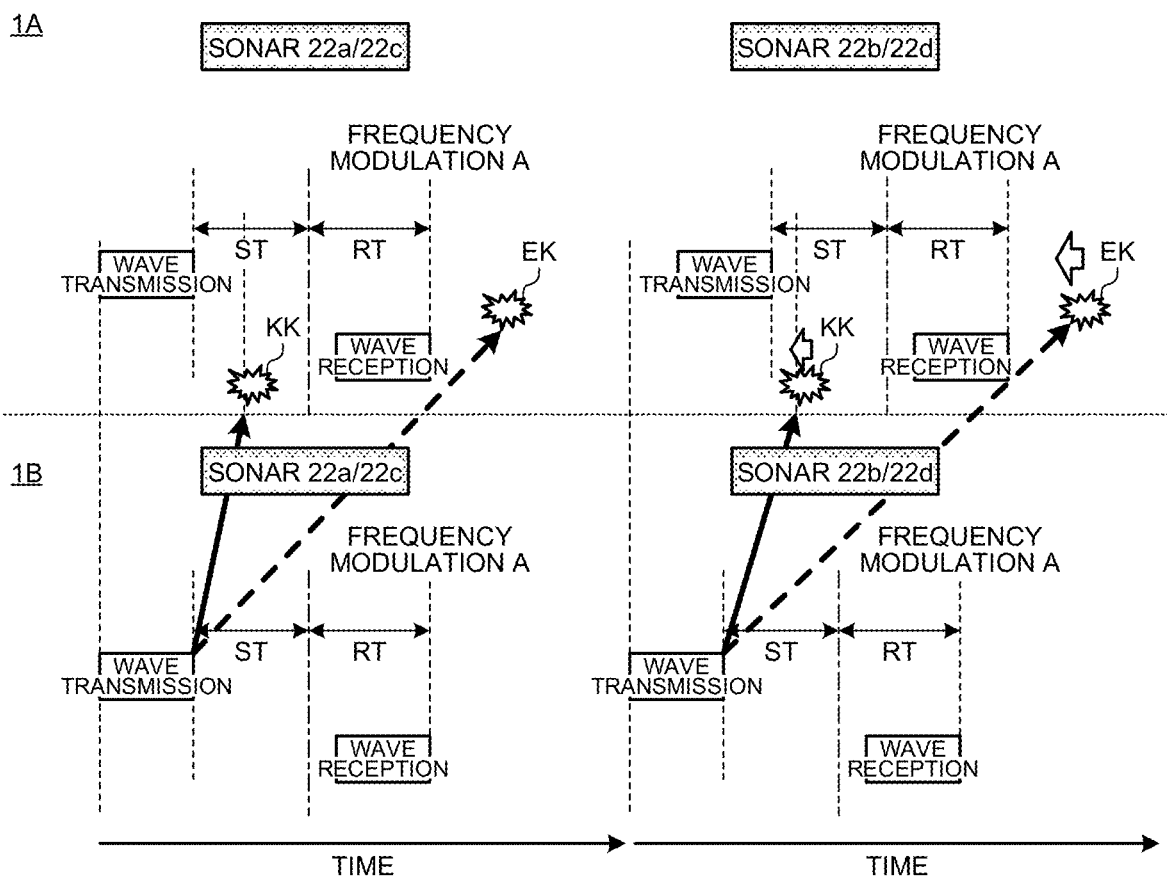
FIG. 15 is a diagram illustrating an example of an interference relationship between a vehicle 1A and a vehicle 1B according to the embodiment.

Here, the interference pattern detection process by the second detection unit 704 is described with reference to FIGS. 15 to 32. FIG. 15 illustrates a change in the positional relationship of interference between the vehicle 1A and the vehicle 1B when the vehicle 1A illustrated in FIG. 9 moves backward in the direction in which the vehicle 1B exists (the negative direction of the X-axis in FIG. 9), and the vehicle 1B moves backward in the direction in which the vehicle 1A exists (the positive direction of the X-axis in FIG. 9).

As illustrated in FIG. 15, when the vehicle 1A starts to move backward in the direction of the vehicle 1B, the vehicle 1B starts to move backward in the direction of the vehicle 1A, and the sonar 22a of the vehicle 1A transmits an ultrasonic wave, the corresponding ultrasonic wave reaches the rear end portion of the vehicle 1B after wave transmission time ST elapses.

Then, the reflected wave reflected on the rear end portion of the vehicle 1B is received by the sonar 22a and the sonar 22c of the vehicle 1A after reflection time RT further elapses from the time point. Therefore, the distance value A1, for example, the distance value to the vehicle 1B is calculated by the determination circuits 235 of the sonar 22a and the sonar 22c of the vehicle 1A.

The sonar 22a and the sonar 22c of the vehicle 1A receive the ultrasonic wave transmitted from the vehicle 1B before the wave transmission time ST elapses. Therefore, short-distance interference KK occurs. Therefore, the distance value A1K, for example, the distance value related to the short-distance interference KK is calculated by the determination circuits 235 of the sonar 22a and the sonar 22c of the vehicle 1A.

Thereafter, when the sonar 22b of the vehicle 1A further transmits an ultrasonic wave, the ultrasonic wave reaches the rear end portion of the vehicle 1B after the wave transmission time ST elapses. Then, the reflected wave is received by the sonar 22b and the sonar 22d after the reflection time RT further elapses from the time point. Therefore, the distance value A2, for example, the distance value to the vehicle 1B is calculated by the determination circuits 235 of the sonar 22b and the sonar 22d of the vehicle 1A.

The sonar 22b and the sonar 22d of the vehicle 1A receive the ultrasonic wave transmitted from the vehicle 1B before the wave transmission time ST elapses. Therefore, the short-distance interference KK occurs. Therefore, the distance value A2K, for example, the distance value related to the short-distance interference KK is calculated by the determination circuits 235 of the sonar 22b and the sonar 22d of the vehicle 1A.

In addition, since the vehicle 1A moves backward in the direction of the vehicle 1B, and the vehicle 1B moves backward in the direction of the vehicle 1A, the distance between the vehicle 1A and the vehicle 1B at the time point when the sonar 22b of the vehicle 1A transmits the ultrasonic wave is shorter than the distance at the time point when the sonar 22a of the vehicle 1A transmits the ultrasonic wave. Therefore, the distance value A2 becomes smaller than A1, and the distance value A2K becomes smaller than the distance value A1K.

Therefore, with a lapse of time, the vehicle 1B comes closer to the vehicle 1A, and a position where the short-distance interference KK occurs (hereinafter, it is also referred to as an interference position) also comes closer to the vehicle 1A.

Note that, also when long-distance interference EK occurs due to multiple reflection or the like, the interference position of the long-distance interference EK also comes closer to the vehicle 1A with the lapse of time, similarly to the case of the short-distance interference KK described above.

Figure 16:
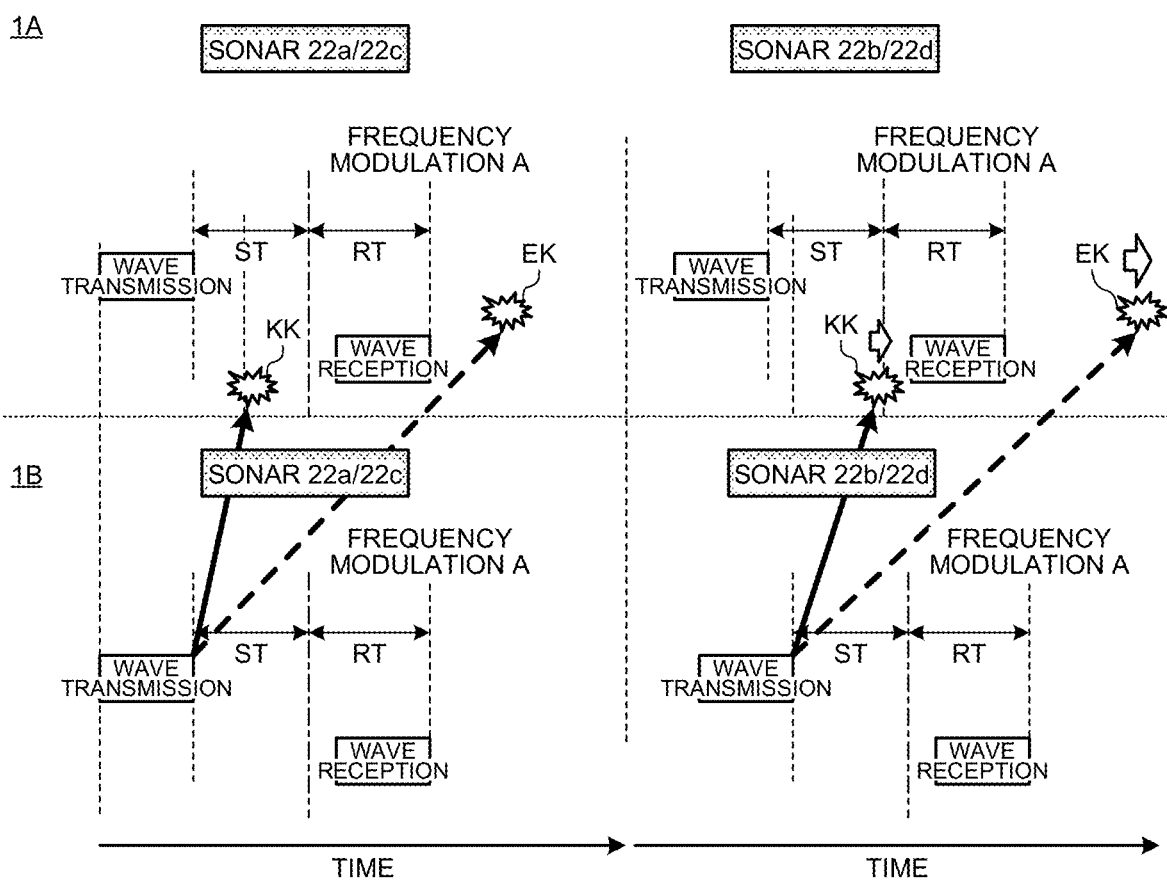
FIG. 16 is a diagram illustrating an example of an interference relationship between the vehicle 1A and the vehicle 1B according to the embodiment.
Figure 19:
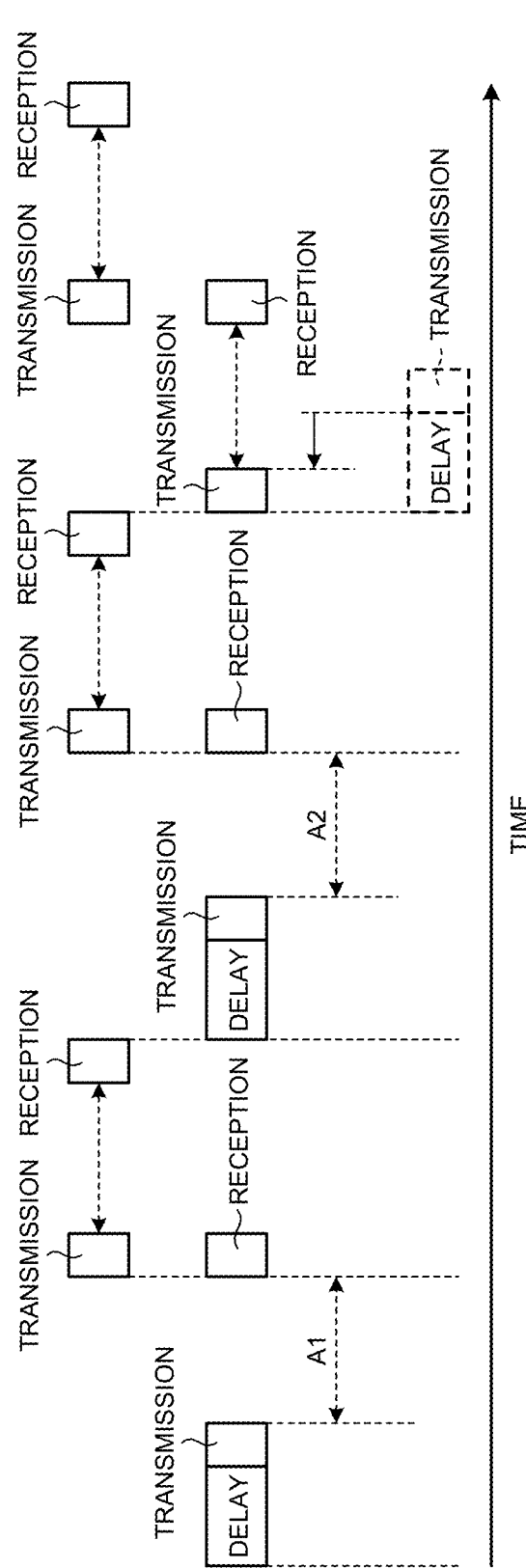
FIG. 19 is a diagram schematically illustrating an example of an interference pattern of a data table according to the embodiment.

FIG. 16 illustrates a change in the positional relationship of interference between the vehicle 1A and the vehicle 1B when the vehicle 1A illustrated in FIG. 9 moves in the direction opposite to the direction in which the vehicle 1B exists (the positive direction of the X-axis in FIG. 9), and the vehicle 1B moves in the direction opposite to the direction in which the vehicle 1A exists (the negative direction of the X-axis in FIG. 9).

In FIG. 16, since the vehicle 1A moves in the direction opposite to the vehicle 1B, and the vehicle 1B moves in the direction opposite to the vehicle 1A, the distance between the vehicle 1A and the vehicle 1B at the time point when the sonar 22b of the vehicle 1A transmits the ultrasonic wave is longer than the distance at the time point when the sonar 22a of the vehicle 1A transmits the ultrasonic wave. Therefore, the distance value A2 becomes larger than A1, and the distance value A2K becomes larger than the distance value A1K.

Therefore, with a lapse of time, the vehicle 1B goes away from the vehicle IA, and the interference position of the short-distance interference also goes away from the vehicle 1A.

Note that, also when the long-distance interference EK occurs, the interference position of the long-distance interference EK also goes away from the vehicle 1A with the lapse of time, similarly to the case of the short-distance interference KK described above.

In this manner, the relationships described with reference to FIGS. 15 and 16 are established between the vehicle 1A and the obstacle, between the vehicle 1A and the interference position of the short-distance interference KK, and between the vehicle 1A and the interference position of the long-distance interference. From the above description, the second detection unit 704 compares the distance value A1 with the distance value A2 (or B2), compares the distance value A1K with the distance value A2K (or B2K), and compares the distance value ALE with the distance value A2E (or B2E), thereby detecting the interference pattern indicating the relationships between the position of the vehicle 1A and the interference position of the short-distance interference, and between the position of the obstacle and the interference position of the long-distance interference.

In the present embodiment, values acquired from the sonar 22a are used for the distance values A1, A1K, and A1E used for detecting the interference pattern, but an average value or a median value of values acquired from the sonar 22c, values acquired from the sonar 22b, and values acquired from the sonar 22a may be used.

In addition, values acquired from the sonar 22b are used for the distance values A2 (or B2), A1K, A2K (or B2K), A1K, and A2K (or B2K), but an average value or a median value of values acquired from the sonar 22d, values acquired from the sonar 22a, and values acquired from the sonar 22a may be used.

In addition, the sonar control unit 702 generates a sonar control signal based on the interference pattern detected by the second detection unit 704.

Hereinafter, the detection process of the interference pattern by the second detection unit 704 and the determination processes (hereinafter, it is also referred to as wave transmission condition of an ultrasonic wave) of the type of frequency modulation (the frequency modulation A or the frequency modulation B) of the ultrasonic wave to be transmitted next time and the wave transmission timing (to be accelerated or delayed) of the ultrasonic wave by the sonar control unit 702 are described.

In the present embodiment, the second detection unit 704 detects the interference pattern based on a data table that is stored in the flash memory 11E or the like and is for detecting the interference pattern and determining a wave transmission condition of an ultrasonic wave to be transmitted next time. Further, the sonar control unit 702 determines the wave transmission condition of the ultrasonic wave to be transmitted next time based on the data table.

"No." in the data tables of FIGS. 17A to 18B indicates a number for identifying an interference pattern. "SONAR 22a/22c (FREQUENCY MODULATION A or FREQUENCY MODULATION B)" in "INTERFERENCE PATTERN" indicates a wave transmission source of the ultrasonic wave of the first time and a frequency modulation pattern used for wave transmission of the ultrasonic wave. In addition, "SONAR 22b/22d (FREQUENCY MODULATION A or FREQUENCY MODULATION B)" in "INTERFERENCE PATTERN" indicates a wave transmission source of the ultrasonic wave of the second time and a frequency modulation pattern used for wave transmission of the ultrasonic wave.

In addition, "SONAR 22a/22c" in "WAVE TRANSMISSION CONDITION" indicates a wave transmission source of an ultrasonic wave of the third time. In addition, "FREQUENCY MODULATION" in "WAVE TRANSMISSION CONDITION" indicates a frequency modulation pattern used for wave transmission of an ultrasonic wave of the third time. In addition, "WAVE TRANSMISSION TIMING" in "WAVE TRANSMISSION CONDITION" indicates whether the wave transmission of the ultrasonic wave of the third time is accelerated or delayed.

Note that, in the present embodiment, "ACCELERATING WAVE TRANSMISSION TIMING" means that sonar 21 or the sonar 22 transmits an ultrasonic wave without predetermined normal delay time. Note that "DELAYING WAVE TRANSMISSION TIMING" means that the sonar 21 or the sonar 22 transmits an ultrasonic wave by extending predetermined normal delay time by predetermined time.

In addition, "SHORT-DISTANCE INTERFERENCE" in "SONAR 22a/22c (FREQUENCY MODULATION A)" in "INTERFERENCE PATTERN" indicates whether the distance value A1K is measured (whether short-distance interference is detected). In addition, "OBSTACLE" in "SONAR 22a/22c (FREQUENCY MODULATION A)" in "INTERFERENCE PATTERN" indicates whether the distance value A1 is measured (whether an obstacle is detected). In addition, "LONG-DISTANCE INTERFERENCE" in "SONAR 22a/22c (FREQUENCY MODULATION A)" in "INTERFERENCE PATTERN" indicates whether the distance value A1E is measured (whether long-distance interference is detected).

In addition, "SHORT-DISTANCE INTERFERENCE" in "SONAR 22b/22d (FREQUENCY MODULATION A)" in "INTERFERENCE PATTERN" indicates a relationship between the distance value A1K and the distance value A2K (or B2K). In addition, "OBSTACLE" in "SONAR 22b/22d (FREQUENCY MODULATION A)" in "INTERFERENCE PATTERN" indicates a relationship between the distance value A1 and the distance value A2 (or B2). In addition, "LONG-DISTANCE INTERFERENCE" in "SONAR 22b/22d (FREQUENCY MODULATION A)" in "INTERFERENCE PATTERN" indicates a relationship between the distance value A1E and the distance value A2E (or B2E).

Here, FIGS. 17A to 17C are an excerpt of a portion indicating an interference pattern when the distance value A1 is measured in the data table according to the present embodiment. In addition, FIGS. 18A and 18B are an excerpt of a portion indicating an interference pattern when the distance value A1 is not measured in the data table according to the present embodiment.

The second detection unit 704 refers to the data table and specifies the interference pattern from the distance values A1, A1K, A1E, A2 (or B2), A2K (or B2K), and A2E (or B2E) acquired as the distance information by the acquisition unit 703. For example, when the acquisition unit 703 acquires the distance value A1 and the distance value A2 and does not acquire other distance values, and the distance value A1>the distance value A2, the second detection unit 704 refers to the data table and specifies that the interference pattern is "No. 1".

In addition, in this case, the sonar control unit 702 refers to the data table and determines frequency modulation of "FREQUENCY MODULATION A" and transmission timing of "ACCELERATING", which are wave transmission conditions corresponding to the interference pattern "No. 1", as the wave transmission conditions.

Here, the reason that the data table is set as illustrated in FIGS. 17A to 18B is described with reference to FIGS. 19 to 29. In FIGS. 19 to 29, it is assumed that the obstacle is another vehicle.

"SONAR 22a/SONAR 22c: FIRST TIME" in FIG. 19 indicates wave transmission and wave reception of the ultrasonic wave of the first time by the sonar 22a/the sonar 22c. In addition, "SONAR 22b/SONAR 22d: FIRST TIME" indicates wave transmission and wave reception of the ultrasonic wave of the first time by the sonar 22b/the sonar 22d. In addition, "SONAR 22a/SONAR 22c: SECOND TIME" in FIG. 19 indicates wave transmission and wave reception of the ultrasonic wave of the second time by the sonar 22a/the sonar 22c under the wave transmission condition determined based on the wave reception result of the ultrasonic wave transmitted the first time.

Note that, for comparison with the determined wave transmission conditions, examples of a case where the wave transmission and wave reception of the ultrasonic wave of the second time are performed with predetermined delay time are indicated by dotted lines "DELAY" and "TRANSMISSION".

The interference pattern "No. 1" is a situation in which the distance value A1 is measured by the wave transmission of the ultrasonic wave of the first time, the distance value A2 is measured by the wave transmission of the ultrasonic wave of the second time, and the distance value A1>the distance value A2. This indicates that another vehicle comes closer to the vehicle 1. In addition, since the distance value A1K and the distance value A1E are not measured, it is understood that neither short-distance interference nor long-distance interference occurs.

In this case, since another vehicle comes closer to the vehicle 1, it is likely that the vehicle 1 collides with another vehicle, and it is required to quickly detect another vehicle. Therefore, the sensor control device 70 accelerates the wave transmission timing of the ultrasonic wave. This makes it possible to quickly detect an obstacle. Therefore, the sensor control device 70 can reduce the possibility of collision between the vehicle 1 and another vehicle by detecting another vehicle at an early stage and notifying the driver of a warning.

Therefore, in the interference pattern "No. 1", the wave transmission timing is accelerated. In the present embodiment, the frequency modulation pattern is set to the frequency modulation A when the wave transmission timing is accelerated, and the frequency modulation pattern is set to the frequency modulation B when the wave transmission timing is delayed. Therefore, the frequency modulation pattern in this case is set to the frequency modulation A.

Figure 20:
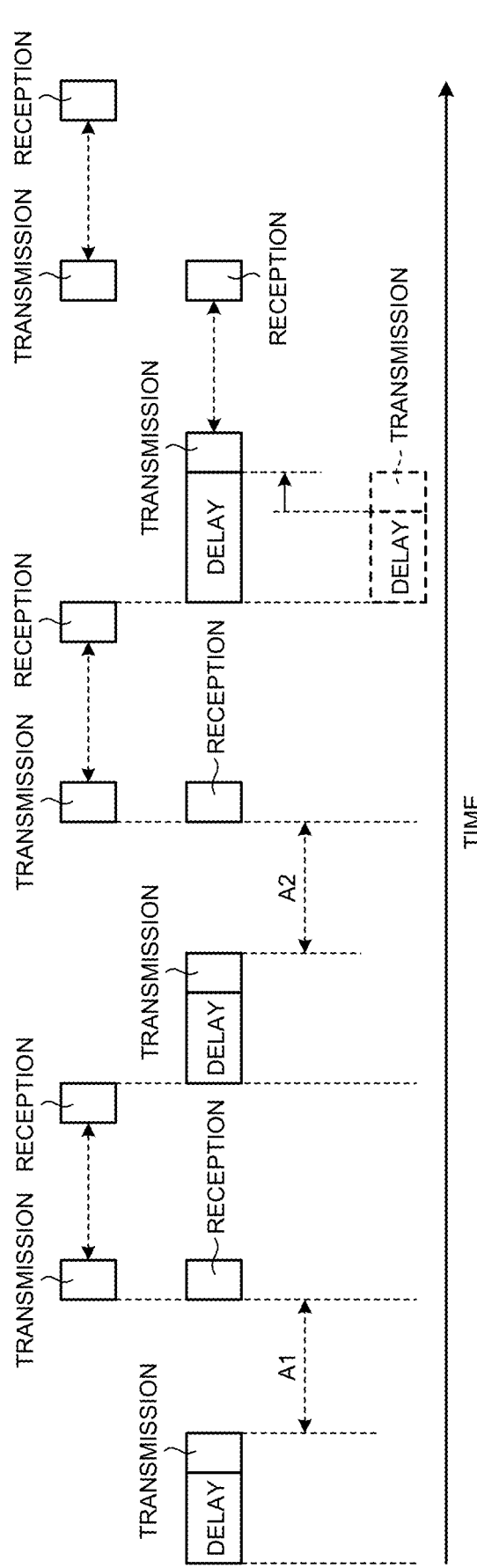
FIG. 20 is a diagram schematically illustrating an example of an interference pattern of a data table according to the embodiment.

The interference pattern "No. 2" illustrated in FIG. 20 is a situation in which the distance value A1 is measured by the wave transmission of the ultrasonic wave of the first time, the distance value A2 is measured by the wave transmission of the ultrasonic wave of the second time, and the distance value A1≤the distance value A2. This indicates that another vehicle goes away from the vehicle 1. In addition, since the distance value A1K and the distance value AIE are not measured, it is understood that neither short-distance interference nor long-distance interference occurs.

In this case, since another vehicle goes away from the vehicle 1, the possibility that the vehicle 1 collides with the other vehicle is low. Therefore, the sensor control device 70 delays the wave transmission timing of the ultrasonic wave. This makes it possible to detect an obstacle located farther away. Therefore, the sensor control device 70 can detect another vehicle even when the other vehicle moves farther away. Therefore, in the interference pattern "No. 2", the wave transmission timing is delayed.

Figure 21:
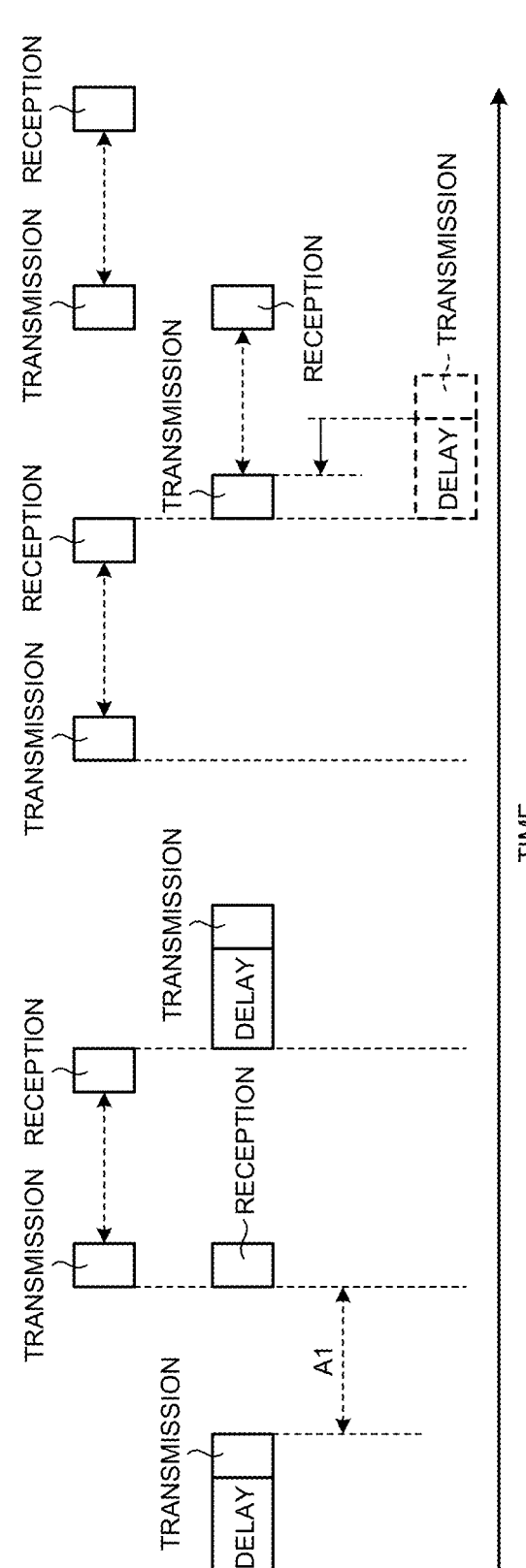
FIG. 21 is a diagram schematically illustrating an example of an interference pattern of a data table according to the embodiment.

The interference pattern "No. 3" illustrated in FIG. 21 is a situation in which the distance value A1 is measured by the wave transmission of the ultrasonic wave of the first time, and no distance value is measured by the wave transmission of the ultrasonic wave of the second time. This indicates that no other vehicle is detected by the wave transmission of the ultrasonic wave of the second time. In addition, since the distance value A1K and the distance value AIE are not measured, it is understood that neither short-distance interference KK nor long-distance interference EK occurs.

In this case, since no other vehicle is detected, the wave transmission timing may be accelerated or delayed. However, in order to determine how to set the wave transmission timing when the distance value A2 is not measured, the data table of FIGS. 17A to 17C defines that the wave transmission timing is accelerated when the distance value A2 is not measured. Therefore, in the interference pattern "No. 3", the wave transmission timing is accelerated.

Figure 22:
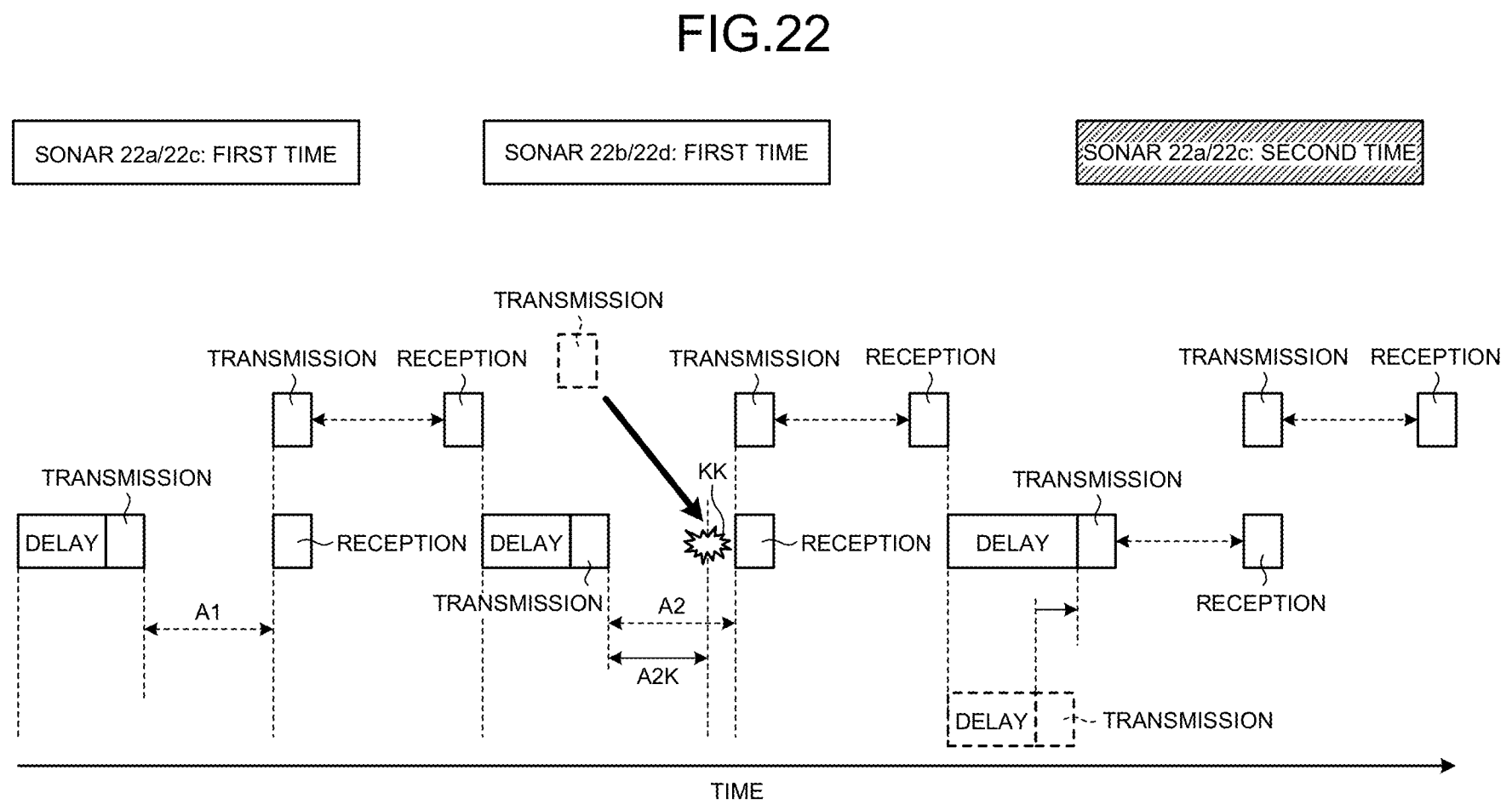

The interference pattern "No. 4" illustrated in FIG. 22 is a situation in which the distance value A1 is measured by the wave transmission of the ultrasonic wave of the first time, the distance value A2K and the distance value A2 are measured by the wave transmission of the ultrasonic wave of the second time, and the distance value A1>the distance value A2. This indicates that the short-distance interference KK occurs, and another vehicle comes closer to the vehicle 1.

In this case, since the short-distance interference KK occurs, it is possible to lengthen the time until the ultrasonic wave reaches the interference position of the short-distance interference KK by transmitting the ultrasonic wave later. As a result, it is possible to reduce the possibility of occurrence of interference caused by ultrasonic waves transmitted by another vehicle. Therefore, in the interference pattern "No. 4", the wave transmission timing is delayed.

Figure 23:
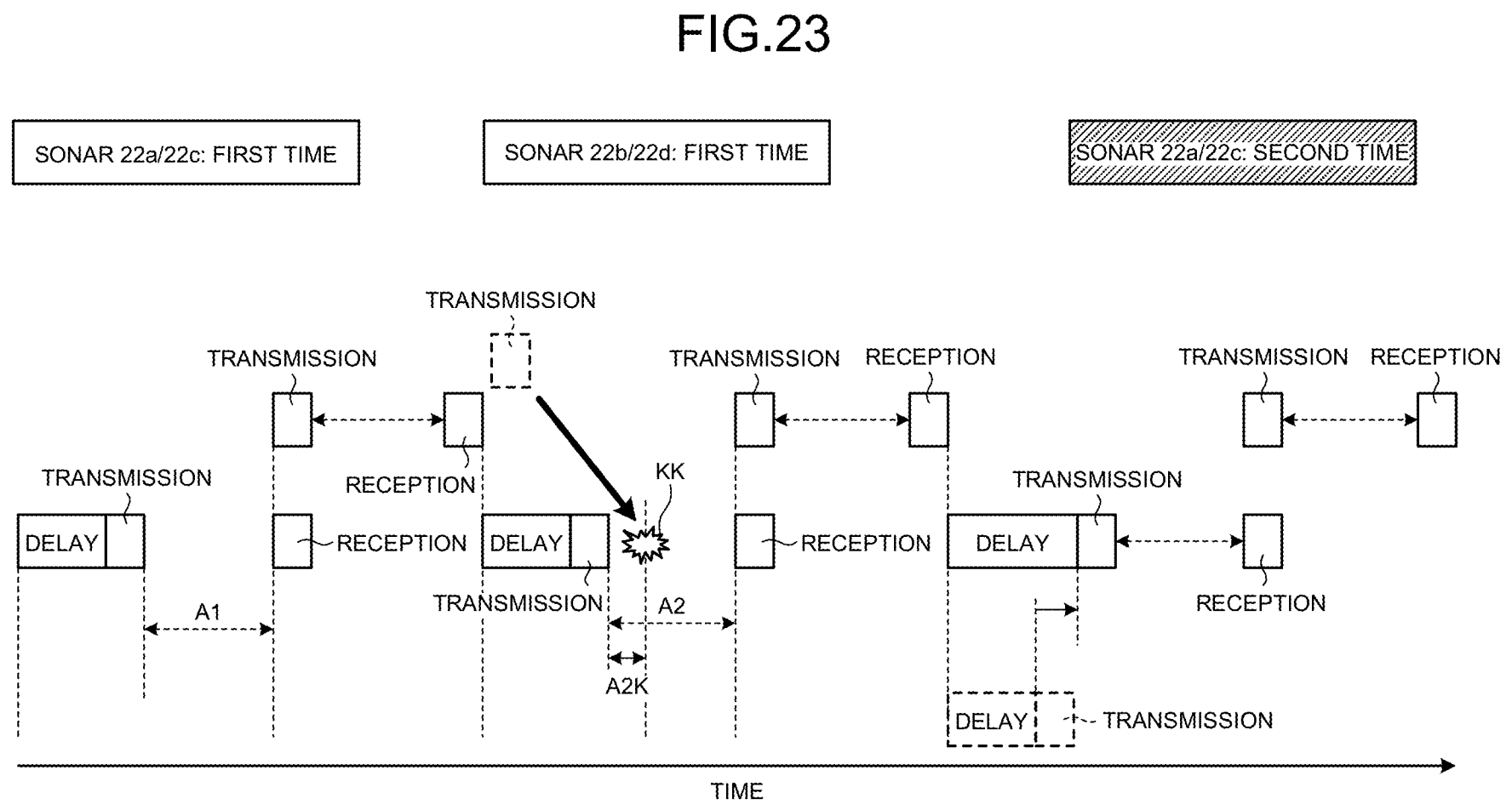

The interference pattern "No. 5" illustrated in FIG. 23 is a situation in which the distance value A1 is measured by the wave transmission of the ultrasonic wave of the first time, the distance value A2K and the distance value A2 are measured by the wave transmission of the ultrasonic wave of the second time, and the distance value A1≤the distance value A2. This indicates that the short-distance interference KK occurs, and another vehicle goes away from the vehicle 1.

In this case, since the short-distance interference KK occurs, the wave transmission timing is delayed in the interference pattern "No. 5" similarly to the interference pattern "No. 4".

Figure 24:
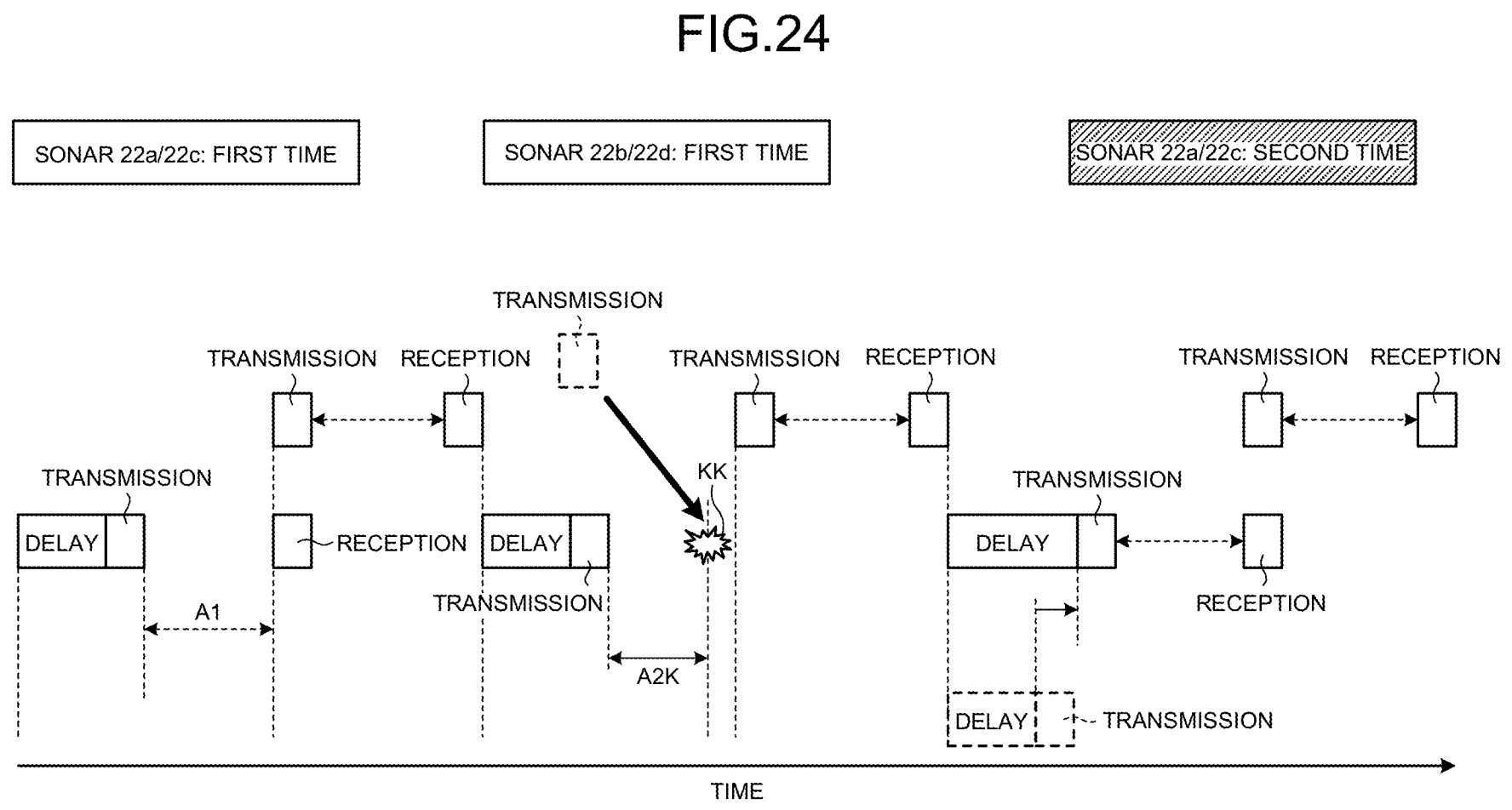

The interference pattern "No. 6" illustrated in FIG. 24 is a situation in which the distance value A1 is measured by the wave transmission of the ultrasonic wave of the first time, the distance value A2K is measured by the wave transmission of the ultrasonic wave of the second time, and distance value A2 is not measured. This indicates that the short-distance interference KK occurs, and no other vehicle is detected by the wave transmission of the ultrasonic wave of the second time.

In this case, since the short-distance interference KK occurs, the wave transmission timing is delayed in the interference pattern "No. 6" similarly to the interference pattern "No. 4".

Figure 25:
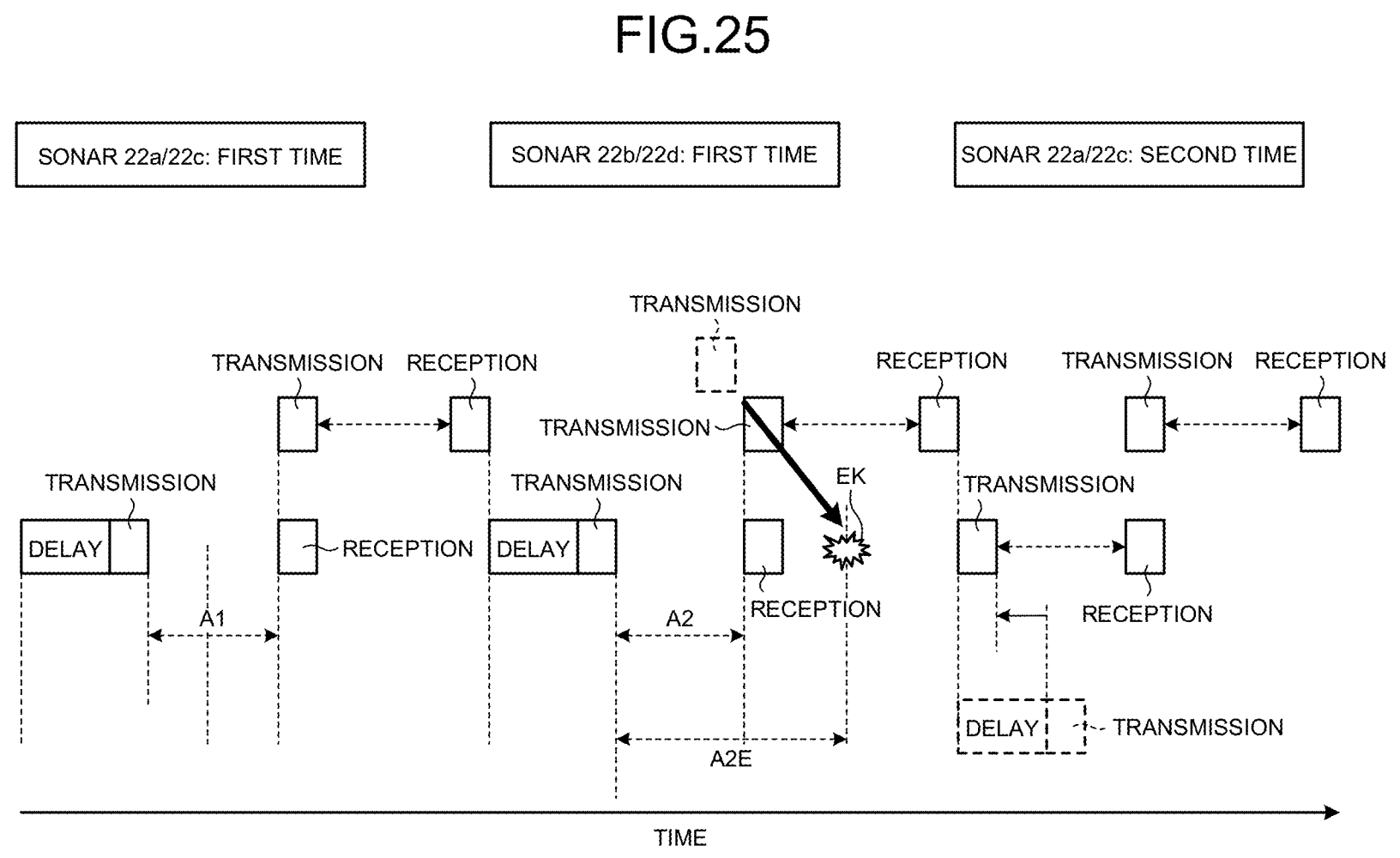

The interference pattern "No. 7" illustrated in FIG. 25 is a situation in which the distance value A1 is measured by the wave transmission of the ultrasonic wave of the first time, the distance value A2 and the distance value A2E are measured by the wave transmission of the ultrasonic wave of the second time, and the distance value A1>the distance value A2. This indicates that the long-distance interference EK occurs, and another vehicle comes closer to the vehicle 1.

In this case, though the long-distance interference EK occurs, the influence of the long-distance interference is small, and the other vehicle comes closer to the vehicle 1. Therefore, the wave transmission timing is accelerated in the interference pattern "No. 7" similarly to the interference pattern "No. 1".

Figure 26:
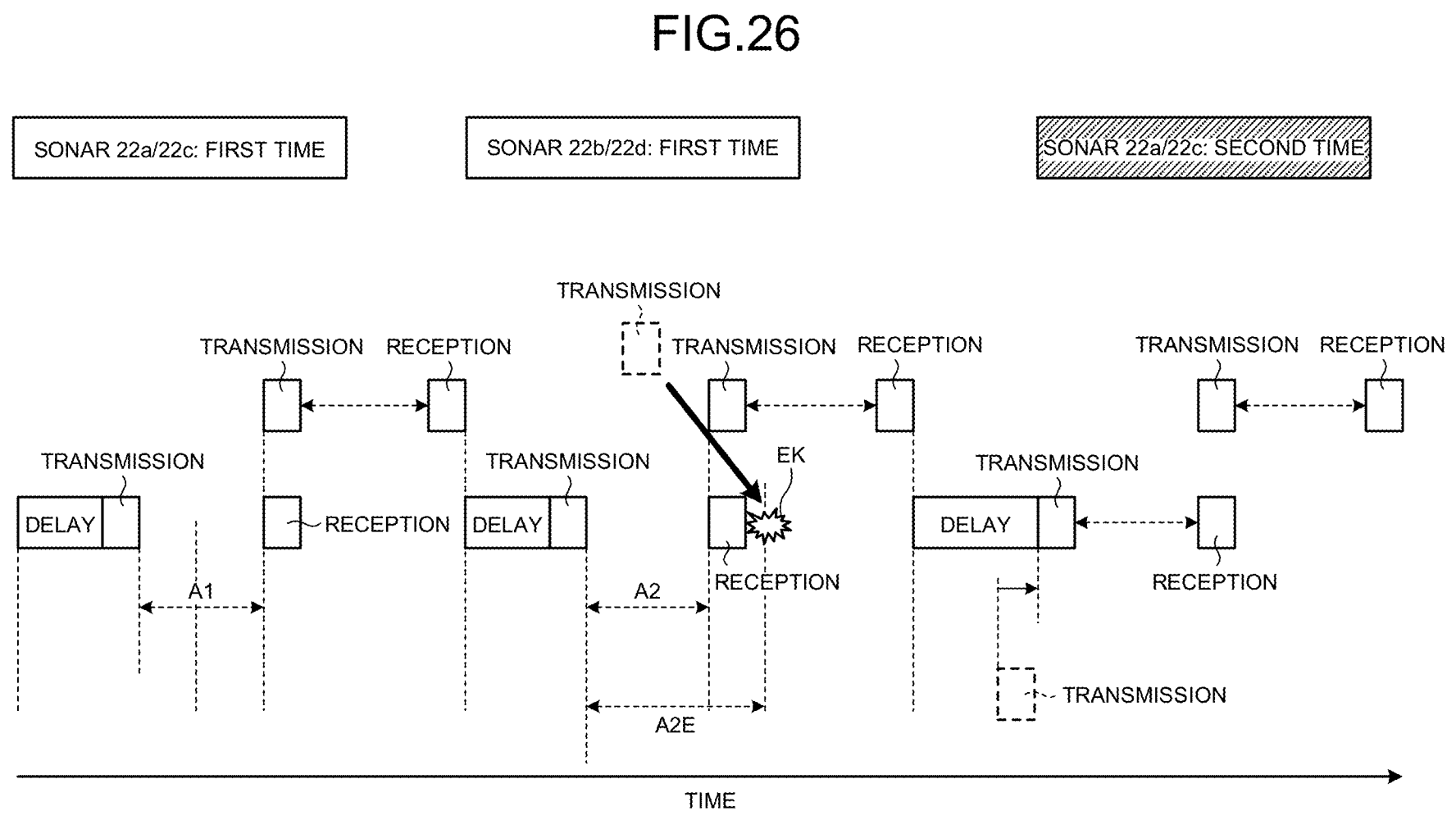

The interference pattern "No. 8" illustrated in FIG. 26 is a situation in which the distance value A1 is measured by the wave transmission of the ultrasonic wave of the first time, the distance value A2 and the distance value A2E are measured by the wave transmission of the ultrasonic wave of the second time, and the distance value A1≤the distance value A2. This indicates that the long-distance interference EK occurs, and another vehicle goes away from the vehicle 1.

In this case, though the long-distance interference EK occurs, the influence of the long-distance interference is small, and the other vehicle goes away from the vehicle 1. Therefore, the wave transmission timing is delayed in the interference pattern "No. 8" similarly to the interference pattern "No. 2".

Figure 27:
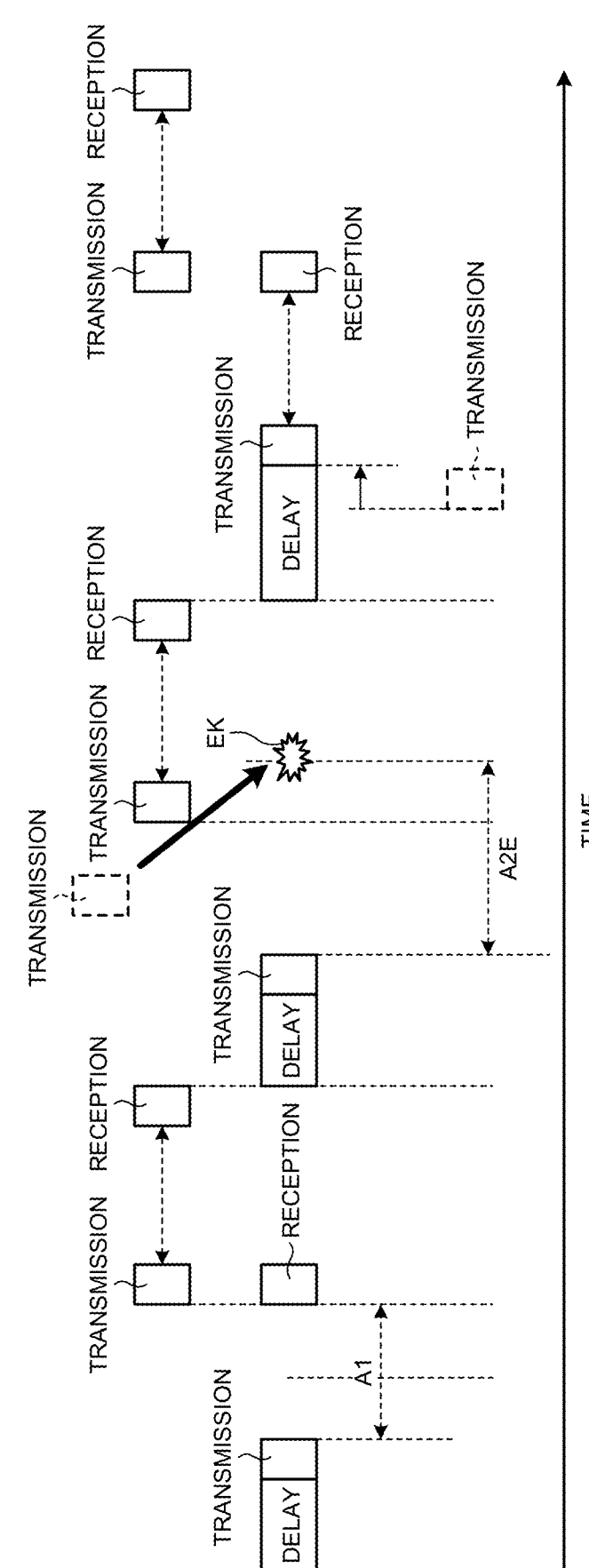
FIG. 27 is a diagram schematically illustrating an example of an interference pattern of a data table according to the embodiment.

The interference pattern "No. 9" illustrated in FIG. 27 is a situation in which the distance value A1 is measured by the wave transmission of the ultrasonic wave of the first time, the distance value A2E is measured by the wave transmission of the ultrasonic wave of the second time, and the distance value A2 is not measured. This indicates that the long-distance interference EK occurs, and no other vehicle is detected by the wave transmission of the ultrasonic wave of the second time.

In this case, the long-distance interference EK occurs, the short-distance interference KK is not detected, and no other vehicle is detected in the wave transmission of the ultrasonic wave of the second time. Therefore, by transmitting the wave transmission of the ultrasonic wave later, even if the interference position of the detected long-distance interference EK goes away, the corresponding long-distance interference EK can be detected. Therefore, in the interference pattern "No. 9", the wave transmission timing is delayed.

Further, in the interference patterns "No. 10", "No. 11", and "No. 12", the influence of the long-distance interference EK is small, and the wave transmission conditions are determined according to the same determination as in the interference patterns "No. 4", "No. 5", and "No. 6", respectively. Therefore, illustration and description thereof are omitted.

Since the influence of the short-distance interference KK is large, when both the distance value A1K and the distance value A2K are calculated as in the interference patterns "No. 13" to "No. 18", the wave transmission condition is determined based on the relationship between the distance value A1K and the distance value A2K.

Here, when the distance value A1K<the distance value A2K is satisfied as in the interference patterns "No. 13" to "No. 15", the interference of the other vehicle is delayed, and thus it is possible to reduce the possibility of the occurrence of the interference due to the ultrasonic wave transmitted by the other vehicle by accelerating the wave transmission timing. Therefore, when the distance value A1K<the distance value A2K is satisfied, the wave transmission timing is accelerated.

Meanwhile, when the distance value A1k≥the distance value A2K is satisfied as in the interference patterns "No. 16" to "No. 18", the interference of the other vehicle is accelerated, and thus it is possible to reduce the possibility of the occurrence of the interference due to the ultrasonic wave transmitted by the other vehicle by delaying the wave transmission timing. Therefore, when the distance value A1K≥the distance value A2K is satisfied, the wave transmission timing is delayed.

Also, when the distance value A1K and the distance value A2K are not measured, and the distance value A1, the distance value A2, the distance value ALE, and the distance value A2E are measured as in the interference patterns "No. 19", "No. 20", "No. 22", and "No. 23", since the influence of the long-distance interference EK is small, the wave transmission condition is determined based on the relationship between the distance value A1 and the distance value A2.

Therefore, since it is determined that the interference patterns "No. 19" and "No. 22" are similar to the interference pattern "No. 1", the wave transmission timing is accelerated in the interference patterns "No. 19" and "No. 22".

Therefore, since it is determined that the interference patterns "No. 20" and "No. 23" are similar to the interference pattern "No. 2", the wave transmission timing is delayed in the interference patterns "No. 19" and "No. 22".

In addition, the interference patterns "No. 21" and "No. 24" indicate a situation where the distance value ALE and the distance value A2E are measured. In this case, the wave transmission condition is determined based on the relationship between the distance value ALE and the distance value A2E.

Here, when the distance value ALE<the distance value A2E is satisfied as in the interference pattern "No. 21", the interference of the other vehicle is delayed, and thus it is possible to reduce the possibility of the occurrence of the interference due to the ultrasonic wave transmitted by the other vehicle by accelerating the wave transmission timing. Therefore, when a distance value other than the distance value AIE and the distance value A2E is not measured, and the distance value A1E<the distance value A2E is satisfied, the wave transmission timing is accelerated.

Meanwhile, when the distance value A1E≥the distance value A2E is satisfied as in the interference pattern "No. 24", the interference of the other vehicle is accelerated, and thus it is possible to reduce the possibility of the occurrence of the interference due to the ultrasonic wave transmitted by the other vehicle by delaying the wave transmission timing. Therefore, when a distance value other than the distance value AIE and the distance value A2E is not measured, and the distance value A1E≥the distance value A2E is satisfied, the wave transmission timing is delayed.

Further, in the interference patterns "No. 25" to "No. 30", since both the distance value A1K and the distance value A2K are calculated, the wave transmission condition is determined based on the relationship between the distance value A1K and the distance value A2K as in the interference patterns "No. 13" to "No. 18".

Therefore, in the interference patterns "No. 25" to "No. 27", since the distance value A1K<the distance value A2K, the wave transmission timing is accelerated. Also, in the interference patterns "No. 28" to "No. 30", since the distance value A1K≥the distance value A2K, the wave transmission timing is delayed.

Also, since it is determined that the interference patterns "No. 31" to "No. 33" are similar to the interference patterns "No. 22" to "No. 24", the wave transmission timing is accelerated in the interference pattern "No. 31" as in the interference pattern "No. 22". Also, in the interference patterns "No. 32" and "No. 33", the wave transmission timing is delayed as in the interference patterns "No. 23" and "No. 24".

Also, since it is determined that the interference patterns "No. 34" to "No. 36" are similar to the interference patterns "No. 19" to "No. 21", the wave transmission timing is accelerated in the interference patterns "No. 34" and "No. 36" as in the interference patterns "No. 19" and "No. 21". Also, in the interference pattern "No. 35", the wave transmission timing is delayed as in the interference pattern "No. 20".

Also, in the interference patterns "No. 37" to "No. 48", since both the distance value A1K and the distance value A2K are calculated, the wave transmission condition is determined based on the relationship between the distance value A1K and the distance value A2K.

Therefore, in the interference patterns "No. 37" to "No. 42", since the distance value A1K<the distance value A2K, the wave transmission timing is accelerated. Also, in the interference patterns "No. 43" to "No. 48", since the distance value A1K≥the distance value A2K, the wave transmission timing is delayed.

The interference pattern when another vehicle is detected by the wave transmission of the ultrasonic wave of the first time illustrated in FIGS. 17A to 17C is described above. Hereinafter, the interference pattern when another vehicle is not detected by the wave transmission of the ultrasonic wave of the first time illustrated in FIGS. 18A and 18B is described.

Figure 28:
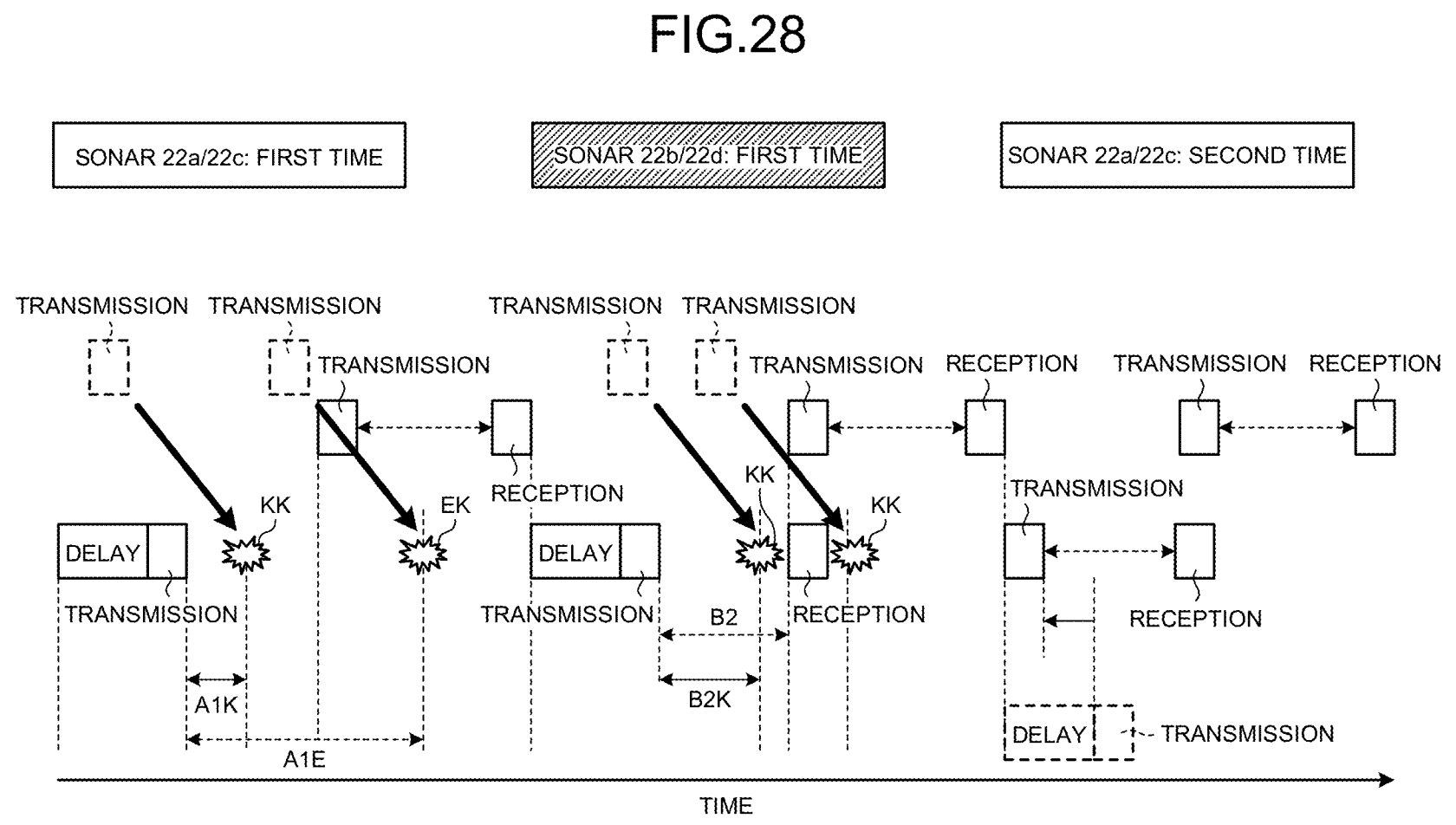

The interference pattern "No. 49" illustrated in FIG. 28 is a situation in which the distance value A1K is measured by the wave transmission of the ultrasonic wave of the first time, and the distance value B2K and the distance value B2 are measured by the wave transmission of the ultrasonic wave of the second time, and the distance value A1K<the distance value B2K. This indicates that the interference of the other vehicle is delayed, and another vehicle is not detected in the wave transmission of the ultrasonic wave of the first time, but another vehicle is detected in the wave transmission of the ultrasonic wave of the second time.

In this case, since the interference of another vehicle is delayed, the possibility of the occurrence of the interference due to the ultrasonic wave transmitted by the other vehicle can be reduced by accelerating the wave transmission timing. Therefore, in the interference pattern "No. 49", the wave transmission timing is accelerated.

Note that, since the influence of the short-distance interference KK is large, when both the distance value A1K and the distance value B2K are calculated as in the interference pattern "No. 49", the wave transmission condition is determined based on the relationship between the distance value A1K and the distance value B2K.

Figure 29:
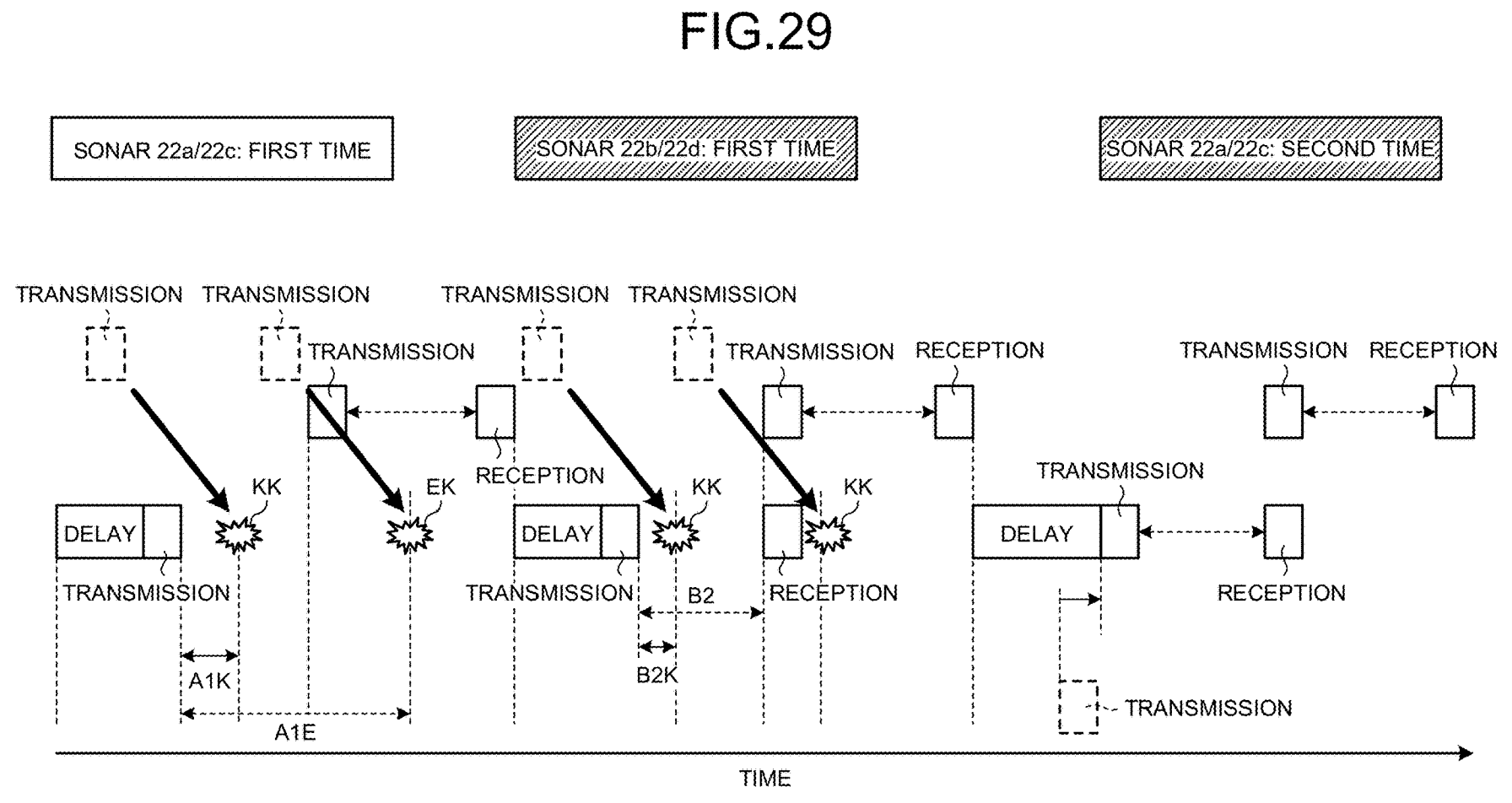

The interference pattern "No. 50" illustrated in FIG. 29 is a situation in which the distance value A1K is measured by the wave transmission of the ultrasonic wave of the first time, and the distance value B2K and the distance value B2 are measured by the wave transmission of the ultrasonic wave of the second time, and the distance value A1K≥the distance value B2K. This indicates that the interference of the other vehicle is accelerated, and another vehicle is not detected in the wave transmission of the ultrasonic wave of the first time, but another vehicle is detected in the wave transmission of the ultrasonic wave of the second time.

In this case, since the interference of another vehicle is accelerated, the possibility of the occurrence of the interference due to the ultrasonic wave transmitted by the other vehicle can be reduced by delaying the wave transmission timing. Therefore, in the interference pattern "No. 50", the wave transmission timing is delayed.

Also, since it is determined that the interference pattern "No. 51" is similar to the interference pattern "No. 49", the wave transmission timing is accelerated in the interference pattern "No. 51" as in the interference pattern "No. 49".

Also, since it is determined that the interference pattern "No. 52" is similar to the interference pattern "No. 50", the wave transmission timing is delayed in the interference pattern "No. 52" as in the interference pattern "No. 50".

Further, as in the interference patterns "No. 53" and "No. 54", in a case where neither the distance value B2K nor the distance value B2E is measured, and the distance value A1K is measured, when the ultrasonic wave is transmitted in the frequency modulation A, the short-distance interference KK is detected, and thus the frequency modulation pattern is set to the frequency modulation B in the interference patterns "No. 53" and "No. 54". Therefore, the wave transmission timing in this case is delayed.

Further, when the distance value B2K is not measured, and the distance value ALE and the distance value B2E are measured as in the interference patterns "No. 55" and "No. 58", the long-distance interference EK occurs, and thus the wave transmission condition is determined based on the relationship between the distance value ALE and the distance value B2E.

Here, when the distance value A1E<the distance value B2E is satisfied as in the interference patterns "No. 55" and "No. 57", the interference of another vehicle is delayed. Therefore, the wave transmission timing is accelerated, and thus it is possible to reduce the possibility of the occurrence of the interference due to the ultrasonic wave transmitted by another vehicle. Therefore, when the distance value A1E<the distance value B2E is satisfied, the wave transmission timing is accelerated.

Meanwhile, when the distance value A1E≥the distance value A2E is satisfied as in the interference patterns "No. 56" and "No. 58", the interference of another vehicle is accelerated. Therefore, the wave transmission timing is delayed, and thus it is possible to reduce the possibility of the occurrence of the interference due to the ultrasonic wave transmitted by the other vehicle. Therefore, when the distance value A1E≥the distance value B2E is satisfied, the wave transmission timing is delayed.

Further, in the interference patterns "No. 59" to "No. 70", since both the distance value A1K and the distance value B2K are calculated, the wave transmission condition is determined based on the relationship between the distance value A1K and the distance value B2K as in the interference patterns "No. 49" and "No. 50".

Therefore, in the interference patterns "No. 59" to "No. 64", since the distance value A1K<the distance value A2K, the wave transmission timing is accelerated. Also, in the interference patterns "No. 65" to "No. 70", since the distance value A1K≥the distance value B2K, the wave transmission timing is delayed.

Also, since it is determined that the interference patterns "No. 71" to "No. 74" are similar to the interference patterns "No. 55" to "No. 58", the wave transmission timing is accelerated in the interference patterns "No. 71" and "No. 72" as in the interference patterns "No. 55" and "No. 57". Also, in the interference patterns "No. 73" and "No. 74", the wave transmission timing is delayed as in the interference patterns "No. 56" and "No. 58".

Referring back to FIG. 13, the description is continued. After the interference pattern is detected by the second detection unit 704 in the process 7042, the sonar control unit 702 determines the frequency modulation pattern of the ultrasonic wave transmitted by the sonar 22a for the second time and the wave transmission timing of the ultrasonic wave based on the interference pattern.

Specifically, the sonar control unit 702 determines whether to transmit an ultrasonic wave in the frequency modulation A or transmit an ultrasonic wave in the frequency modulation B. Also, when determining to transmit the ultrasonic wave by the frequency modulation A, the sonar control unit 702 determines to transmit the ultrasonic wave without delay time. Also, when determining to transmit the ultrasonic wave by the frequency modulation B, the sonar control unit 702 determines to transmit the ultrasonic wave by extending the delay time.

Then, the sonar control unit 702 generates a sonar control signal for controlling the sonar 22 so as to transmit the ultrasonic wave according to the determined type of frequency modulation and determined delay time (process 7023). In the example of FIG. 13, it is assumed that the sonar control unit 702 generates a sonar control signal for controlling the sonar 22 so as to transmit the ultrasonic wave in the frequency modulation B and by extending the delay time.

The sonar control unit 702 transmits the sonar control signal generated via the I/F 11D to the sonar 22a and the sonar 22c. Here, after a certain period elapses from the wave transmission of the ultrasonic wave by the sonar 22a, the sonar control unit 702 generates a sonar control signal so as to transmit the ultrasonic wave to the sonar 22c.

The sonar 22a and the sonar 22c receive the sonar control signal via the communication circuit 231. Then, the sonar 22a transmits the ultrasonic wave of the second time according to the received sonar control signal (process 2224). Specifically, the sonar 22a transmits an ultrasonic wave in a frequency modulation pattern of the frequency modulation B by extending the delay time.

Figure 30:
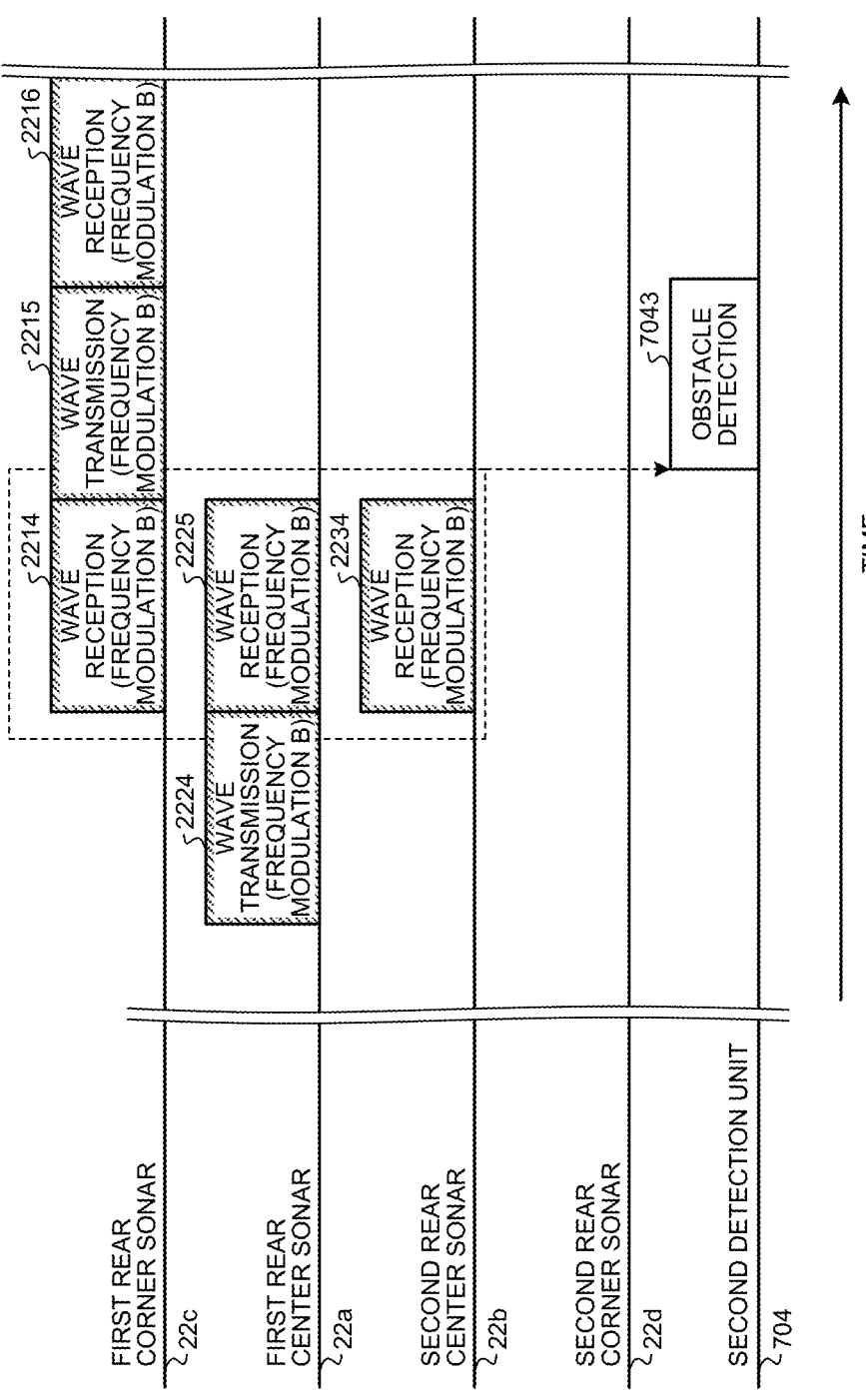
FIG. 30 is a diagram illustrating an example of flows of processes of respective units of the vehicle according to the embodiment.

Here, a flow of processes of respective units of the vehicle 1A is described with reference to FIG. 30. After the wave transmission of the ultrasonic wave of the second time by the sonar 22a, the sonar 22a performs a process of receiving a reflected wave of the transmitted ultrasonic wave of the second time (process 2225). In addition, the sonar 22c performs a process of receiving the reflected wave of the ultrasonic wave of the second time transmitted by the sonar 22a (process 2214).

In addition, the sonar 22b receives the reflected wave of the ultrasonic wave of the second time transmitted by the sonar 22a (process 2234).

In addition, after a certain period of time elapses from the wave transmission of the ultrasonic wave of the second time by the sonar 22a, the sonar 22c transmits the ultrasonic wave according to the received sonar control signal (process 2215). After the wave transmission of the ultrasonic wave of the second time by the sonar 22*c*, the sonar 22*c* performs a process of receiving a reflected wave of the transmitted ultrasonic wave of the second time (process 2216).

The determination circuits 235 of the sonar 22*a*, the sonar 22*c*, and the sonar 22*b* compare the received signals with each of the short-distance interference detection threshold 810, the obstacle detection threshold 811, and the long-distance interference detection threshold 812 and calculate distance information.

The communication circuits 231 of the sonar 22*a*, the sonar 22*c*, and the sonar 22*b* transmit the distance information to the sensor control device 70. The sensor control device 70 receives the distance information via the I/F 11D, and the second detection unit 704 detects the existence or absence of an obstacle based on the corresponding distance information (process 7043).

Note that processes similar to the process 7022 to the process 7043 are executed after the process 7043. Then, the second detection unit 704 detects the existence or absence of the obstacle after wave reception of the reflected wave of the ultrasonic wave of the third time transmitted by the sonar 22*d* and confirms the detection result of the existence or absence of the obstacle.

When confirming that the obstacle is detected, the second detection unit 704 transmits information indicating that the obstacle is detected to the vehicle control device 50 or the like via the I/F 11D. As a result, the vehicle control device 50 can notify the driver of a warning that an obstacle is detected.

Next, a flow of processes executed by the sensor control device 70 according to the present embodiment is described.

Figure 31A:
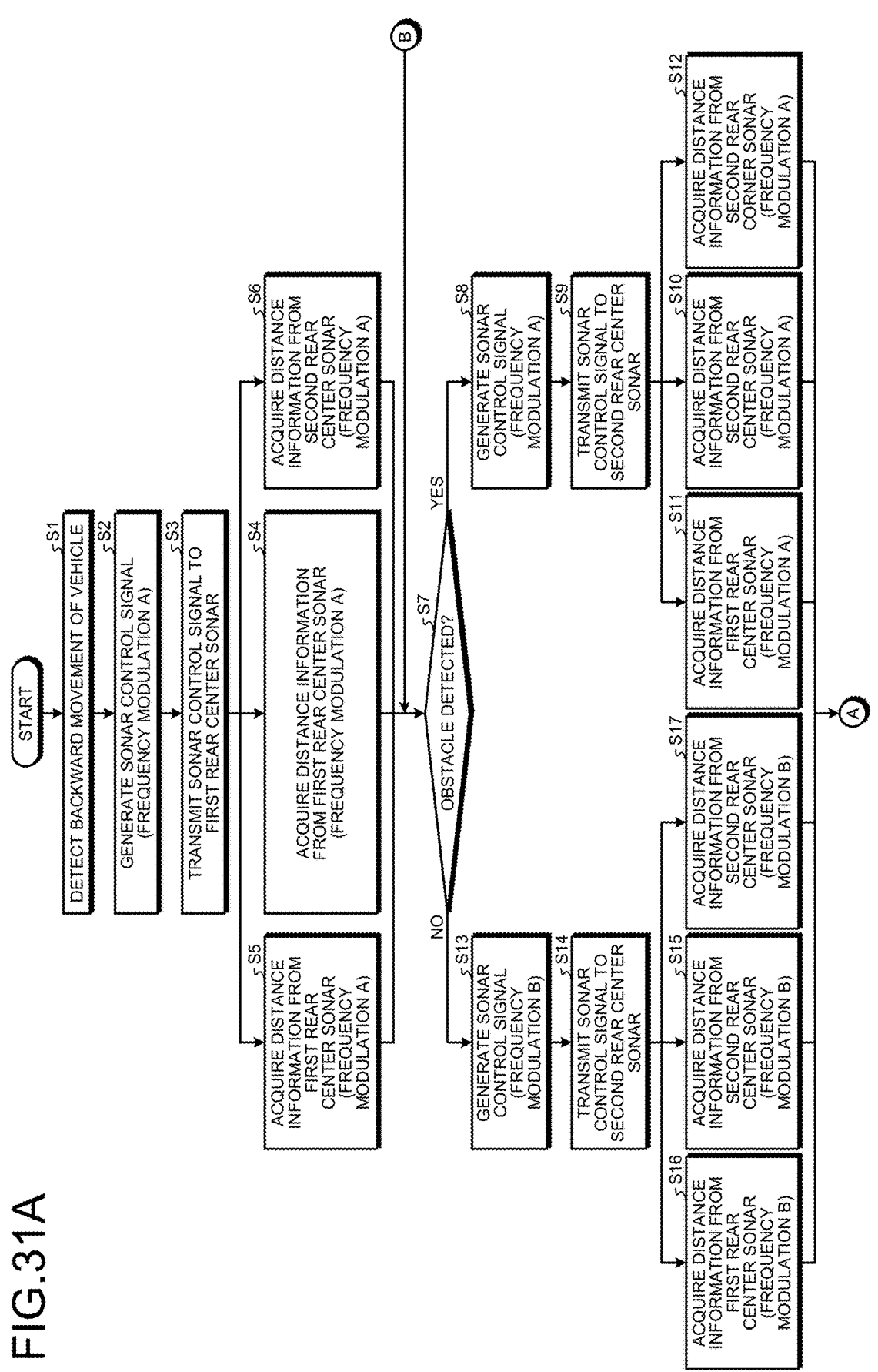
FIGS. 31A and 31B are flowcharts illustrating an example of a process executed by the sensor control device according to the embodiment.
Figure 31B:
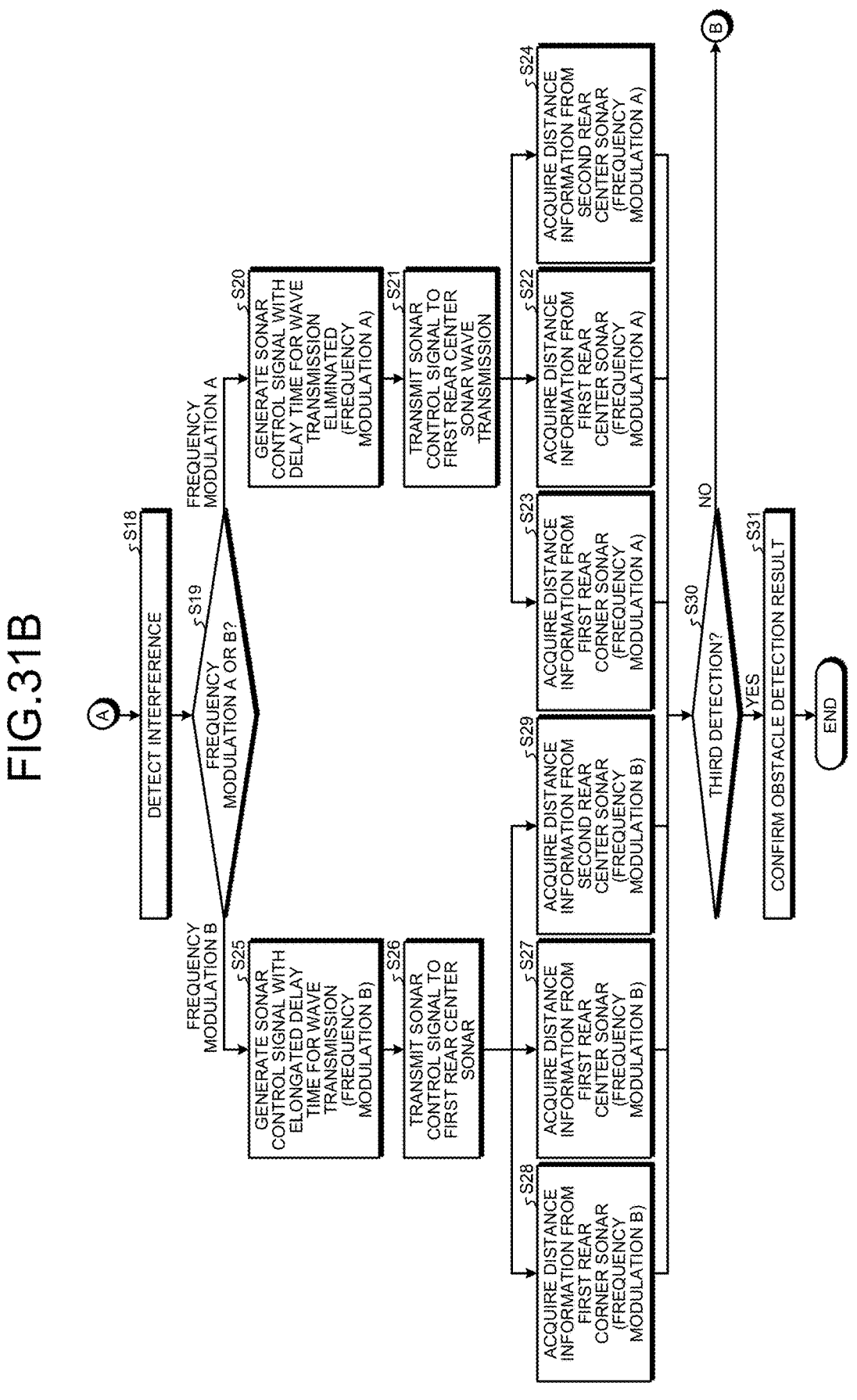

Processes executed by the sensor control device 70 are described with reference to FIGS. 31A and 31B.

First, the first detection unit 701 detects the backward movement of the vehicle 1 (Step S1). Specifically, the first detection unit 701 detects the backward movement of the vehicle 1 by detecting +B output from the battery when the driver of the vehicle 1 performs an operation of setting the gear to reverse.

Next, the sonar control unit 702 generates a sonar control signal (Step S2). In the present embodiment, the sonar control unit 702 generates a sonar control signal for transmitting, to the sonar 22, an ultrasonic wave in the frequency modulation A that is a predetermined frequency modulation pattern with predetermined normal delay time.

Next, the sonar control unit 702 transmits the generated sonar control signal to the sonar 22*a* (Step S3). Specifically, the sonar control unit 702 transmits the sonar control signal generated via the I/F 11D to the sonar 22*a*.

Here, the sonar control signal generated by the sonar control unit 702 is received by the communication circuit 231 of the sonar 22*a*. Then, the sonar 22*a* transmits an ultrasonic wave in the frequency modulation A with normal delay time according to the received sonar control signal.

Also, the ultrasonic wave transmitted by the sonar 22*a* is received by the sonar 22*a*, the sonar 22*c*, and the sonar 22*b*. Then, the determination circuits 235 of the sonar 22*a*, the sonar 22*c*, and the sonar 22*b* calculate distance information. The calculated distance information is transmitted to the sensor control device 70 via the communication circuit 231.

Next, the acquisition unit 703 acquires distance information from the sonar 22*a* (Step S4). Specifically, the acquisition unit 703 acquires distance information received from the sonar 22*a* via the I/F 11D. Similarly, the acquisition unit 703 also acquires distance information from the sonar 22*c*

(Step S5). Similarly, the acquisition unit 703 further acquires distance information from the sonar 22*b* (Step S6).

Next, the second detection unit 704 detects existence or absence of an obstacle based on the distance information calculated by the sonar 22*a*, the sonar 22*c*, and the sonar 22*b* (Step S7). Specifically, when the distance values A1 are calculated in all of the sonar 22*a*, the sonar 22*c*, and the sonar 22*b*, the second detection unit 704 detects that there is an obstacle. Meanwhile, in other cases, the second detection unit 704 detects that there is no obstacle.

When it is detected that there is an obstacle (Step S7: Yes), the sonar control unit 702 generates a sonar control signal for transmitting an ultrasonic wave to the sonar 22 in the frequency modulation A with normal delay time (Step S8). Next, the sonar control unit 702 transmits the generated sonar control signal to the sonar 22*b* (Step S9).

Then, the sonar 22*b* transmits the ultrasonic wave in the frequency modulation A with normal delay time according to the received sonar control signal. Since the subsequent processes of the sonar 22 are similar to the processes after Step S3, the description thereof is omitted.

Next, the acquisition unit 703 acquires distance information from the sonar 22*b* (Step S10). In addition, the acquisition unit 703 acquires distance information from the sonar 22*a* (Step S11). Further, the acquisition unit 703 acquires the distance information from the sonar 22*d* and proceeds to the process of Step S18 (Step S12).

Meanwhile, when it is detected that there is no obstacle in Step S7 (Step S7: No), the sonar control unit 702 generates a sonar control signal for transmitting an ultrasonic wave to the sonar 22 in the frequency modulation B with normal delay time (Step S13). Next, the sonar control unit 702 transmits the generated sonar control signal to the sonar 22*b* (Step S14).

Then, the sonar 22*b* transmits the ultrasonic wave in the frequency modulation B with normal delay time according to the received sonar control signal. Since the subsequent processes of the sonar 22 are similar to the processes after Step S3, the description thereof is omitted.

Next, the acquisition unit 703 acquires distance information from the sonar 22*b* (Step S15). In addition, the acquisition unit 703 acquires distance information from the sonar 22*a* (Step S16). Further, the acquisition unit 703 acquires the distance information from the sonar 22*d* and proceeds to the process of Step S18 (Step S17).

After the process of Step S12 or Step S17, the second detection unit 704 detects the interference pattern based on the distance information calculated by the sonar 22*a*, the sonar 22*c*, and the sonar 22*b* (Step S18).

Specifically, the second detection unit 704 compares the distance values A1, A1K, and ALE acquired as the distance information in Steps S4 to S6 with the distance values A2 (or B2), A2K (or B2K), and A2E (or B2E) calculated as the distance information in Steps S7 to S9 or Steps S15 to S17 and detects the interference pattern.

Next, the sonar control unit 702 determines the frequency modulation pattern of the ultrasonic wave to be transmitted the next time, to be the frequency modulation A or the frequency modulation B based on the interference pattern detected by the second detection unit 704 (Step S19).

When determining to be the frequency modulation A (Step S19: frequency modulation A), the sonar control unit 702 determines no delay time for wave transmission of the ultrasonic wave to be transmitted next time and generates a sonar control signal according to the determination (Step S20). Next, the sonar control unit 702 transmits the generated sonar control signal to the sonar 22*a* (Step S21).

Then, the sonar 22a transmits an ultrasonic wave in the frequency modulation A without delay time according to the received sonar control signal. Since the subsequent processes of the sonar 22 are similar to the processes after Step S3, the description thereof is omitted.

Next, the acquisition unit 703 acquires distance information from the sonar 22a (Step S22). In addition, the acquisition unit 703 acquires distance information from the sonar 22c (Step S23). Further, the acquisition unit 703 acquires the distance information from the sonar 22b and proceeds to the process of Step S30 (Step S24).

Meanwhile, when it is determined that the frequency modulation pattern is the frequency modulation B in Step S19 (Step S19: frequency modulation B), the sonar control unit 702 determines to set the delay time for wave transmission of the ultrasonic wave to be transmitted next time to be longer than the normal delay time and generates a sonar control signal according to the determination (Step S25). Next, the sonar control unit 702 transmits the generated sonar control signal to the sonar 22a (Step S26).

Then, the sonar 22a transmits an ultrasonic wave in the frequency modulation B with the delay time increased according to the received sonar control signal. Since the subsequent processes of the sonar 22 are similar to the processes after Step S3, the description thereof is omitted.

Next, the acquisition unit 703 acquires distance information from the sonar 22a (Step S27). In addition, the acquisition unit 703 acquires distance information from the sonar 22c (Step S28). Further, the acquisition unit 703 acquires the distance information from the sonar 22b and proceeds to the process of Step S30 (Step S29).

After the processes in Step S24 or Step S29, the second detection unit 704 checks whether the detection of the existence or absence of the obstacle to be performed from now on is the third time (Step S30). When the detection of the existence or absence of the obstacle is the first time or the second time (Step S30: No), the process proceeds to Step S7.

Meanwhile, when the detection of the existence or absence of the obstacle is the third time (Step S30: Yes), the second detection unit 704 confirms the detection result of the existence or absence of the obstacle based on the distance information calculated by the sonar 22a, the sonar 22c, and the sonar 22b and ends the process (Step S31). Note that the specific detection process is similar to that in Step S7, and thus description thereof will be omitted.

As described above, the sensor control device 70 according to the present embodiment generates the control signal for controlling the sonar 22 in accordance with the detection of the start of backward movement of the vehicle and transmits, to the sonar 22, the ultrasonic wave of the first time in the predetermined frequency modulation pattern with the predetermined transmission timing. Furthermore, the sensor control device 70 acquires, from the sonar 22, distance information calculated based on the received signal received after the ultrasonic wave transmission of the first time, detects the existence or absence of the obstacle based on the distance information, and determines the frequency modulation pattern of the ultrasonic wave of the second time based on the detection result. At this time, the sensor control device 70 determines the frequency modulation pattern to be the frequency modulation A when there is an obstacle and determines the frequency modulation pattern to be the frequency modulation B when there is no obstacle. The sensor control device 70 generates a control signal for controlling the sonar 22 based on the determined frequency modulation pattern and transmits, to the sonar 22, the ultrasonic wave of the second time in the determined frequency modulation pattern with the predetermined transmission timing. Furthermore, the sensor control device 70 acquires, from the sonar 22, distance information calculated based on the received signal received after the ultrasonic wave transmission of the second time, detects the interference pattern including the existence or absence of the obstacle based on the distance information, and determines the frequency modulation pattern and the transmission timing of the ultrasonic wave of the third time based on the detection result. At this time, the sensor control device 70 determines the frequency modulation pattern as in the second time. In addition, the sensor control device 70 delays the transmission timing when the distance to the interference position becomes shorter and accelerates the transmission timing when the distance to the interference position becomes longer. The sensor control device 70 generates a control signal for controlling the sonar 22 based on the determined frequency modulation pattern and transmission timing and transmits, to the sonar 22, the ultrasonic wave of the third time in the determined frequency modulation pattern with the predetermined transmission timing. Furthermore, the sensor control device 70 acquires, from the sonar 22, distance information calculated based on the received signal received after the ultrasonic wave transmission of the third time and confirms the existence or absence of the obstacle based on the distance information.

As a result, the frequency modulation pattern and the transmission timing to be transmitted can be changed by the interference pattern of the vehicle 1, and thus interference from other vehicles, interference due to multiple reflection, and the like can be prevented. For example, by detecting a change in the interference position, the transmission timing can be delayed when the interference position comes closer to the vehicle 1 with the lapse of time, or the transmission timing can be accelerated when the interference position goes away from the vehicle 1 with the lapse of time. As described above, by shifting the transmission timing, interference can be made less likely to occur even when another vehicle generates ultrasonic waves of the same frequency. The possibility of erroneous detection of an obstacle due to an interference wave can be reduced, for example, by the sensor control device 70 according to the present embodiment.

In addition, the sensor control device 70 detects the existence or absence of an obstacle, the existence or absence of short-distance interference, and the existence or absence of long-distance interference as the interference pattern. Therefore, the sensor control device 70 can determine the transmission timing according to various interference situations such as whether an obstacle is detected around the vehicle 1, whether interference occurs near the vehicle 1, whether interference occurs at a far position, and whether interference occurs in both the short-distance and the long-distance. The possibility of erroneous detection of an obstacle due to an interference wave can be reduced, for example, by the sensor control device 70 according to the present embodiment.

In addition, the sensor control device 70 detects whether the obstacle comes closer to the vehicle, whether the interference position of the short-distance interference comes closer to the vehicle 1, and whether the interference position of the long-distance interference comes closer to the vehicle 1 based on temporal changes in the distance value between the vehicle 1 and the obstacle, the distance value between the vehicle 1 and the interference position of the short-distance interference, and the distance value between the vehicle 1 and the interference position of the long-distance interference. As a result, the sensor control device 70 can determine the transmission timing of the ultrasonic wave according to whether the interference position comes closer or goes away. The possibility of erroneous detection of an obstacle due to an interference wave can be reduced, for example, by the sensor control device 70 according to the present embodiment.

Note that the above-described embodiment can be appropriately modified for implementation by changing a part of the configuration or function of each device of the vehicle 1. Therefore, in the following, some modifications according to the above-described embodiment are described as other embodiments. In the following description, points different from the above-described embodiment are mainly described, and detailed description of points common to the contents already described will be omitted. In addition, the modifications described below may be implemented individually or may be implemented in appropriate combination.

First Modification

In the above-described embodiment, a mode in which the sensor control device 70 has the respective functions of the first detection unit 701, the sonar control unit 702, the acquisition unit 703, and the second detection unit 704 is described. However, a part or all of these functions may be included in the controller 23 of the sonar 21 or the sonar 22.

In the present modification, the sonar control unit 702 generates a drive signal for controlling the drive circuit 241. The drive circuit 241 applies a voltage to the piezoelectric element 25 according to the drive signal generated by the sonar control unit 702. As a result, the sonar 21 or the sonar 22 can transmit an ultrasonic wave with the frequency modulation pattern and the transmission timing determined by the sonar control unit 702. In addition, the acquisition unit 703 acquires the distance information calculated by the determination circuit 235.

According to the present modification, the processing load of the sensor control device 70 can be reduced.

Second Modification

In the above-described embodiment, a mode in which the wave transmission and reception of ultrasonic waves by the sonar 22a and the sonar 22c and the wave transmission and reception of ultrasonic waves by the sonar 22b and the sonar 22d are set as one set of processes (one process), corresponding process is repeated three times, the obstacle detection process is performed after the process of the third time, and the corresponding detection result is confirmed as the detection result of the existence or absence of the obstacle is described. However, the process of confirming the detection result of the existence or absence of the obstacle is not limited thereto.

For example, the obstacle detection process may be performed after the wave transmission of the second time by the sonar 22a and the sonar 22c, and the corresponding detection result may be confirmed as the detection result of the existence or absence of the obstacle. In addition, for example, by setting three times of processes as one set of processes, repeating the one set of processes twice, and performing the obstacle detection process after the set of processes of the second time, the corresponding detection result may be confirmed as the detection result of the existence or absence of the obstacle.

Figure 32:
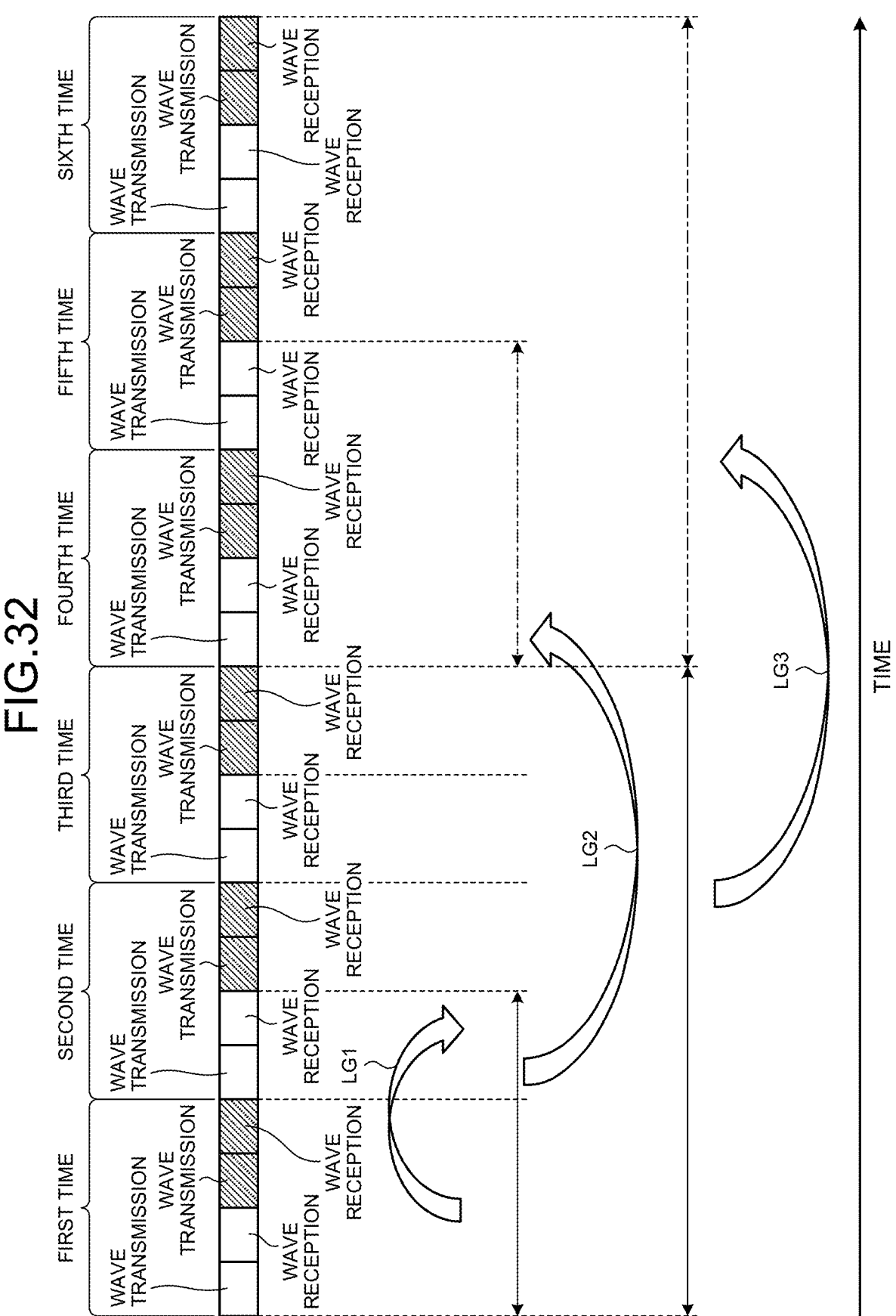
FIG. 32 is a diagram illustrating an example of a flow of a process executed by a sensor control device according to a second modification.

An arrow LG1 in FIG. 32 indicates a process of setting the process of repeating the wave transmission and reception of the ultrasonic wave by the sonar module twice as one set of processes (one process), performing the obstacle detection process after the wave transmission and reception of the ultrasonic wave by the sonar module after the first process, and confirming the detection of the existence or absence of the obstacle.

In addition, an arrow LG2 indicates a process of repeating the process of the arrow LG1 twice and confirming the detection of the existence or absence of the obstacle. In addition, an arrow LG3 indicates a process of repeating the process of the arrow LG2 twice and confirming the detection of the existence or absence of the obstacle.

Note that the user may be allowed to select any process of the arrow LG1, the arrow LG2, and the arrow LG3. As a result, it is possible to perform a process according to the user's needs, such as selecting the process of the arrow LG1 when the user desires to reduce the processing load of the sensor control device 70 and selecting the process of the arrow LG3 when the user desires to detect an obstacle more accurately.

Third Modification

In the above-described embodiment, a mode in which the interference pattern detection process and the determination process of the wave transmission condition of the ultrasonic wave condition to be transmitted next time are performed by using the data tables illustrated in FIGS. 17A to 18B is described. However, the above process is not limited thereto. For example, the sonar control unit 702 and the second detection unit 704 may perform the above processes by using a data table determined by a logic different from the data table illustrated in FIGS. 17A to 18B.

FIGS. 33A and 33B are an excerpt of a portion indicating an interference pattern when the distance value A1 is not measured in the data table according to the third modification.

As illustrated in FIGS. 33A and 33B, in this data table, when the distance value of A1 is not measured in the wave transmission of the ultrasonic wave of the first time by the sonar 22a and the sonar 22c, the frequency modulation pattern of the ultrasonic wave transmitted by the sonar 22a and the sonar 22c next time is set to the frequency modulation B.

FIGS. 34A and 34B are an excerpt of a portion indicating an interference pattern when the distance value A1 is not measured in the data table according to the third modification, which is different from FIGS. 33A and 33B.

In a case where the data table of FIGS. 34A and 34B is used for the interference pattern detection process, when the distance value of B2K is not measured, and the distance value AIK and the distance value B2 are measured, the second detection unit 704 compares the distance value A1K with the distance value B2 to detect the interference pattern. In addition, the sonar control unit 702 determines the wave transmission condition by prioritizing the comparison result between the distance value A1K and the distance value B2 over the comparison result between the distance value ALE and the distance value B2E.

In addition, the distance value A1K>the distance value B2 indicates that another vehicle comes closer to the vehicle 1, and the distance value A1K≤the distance value B2 indicates that another vehicle goes away from the vehicle 1. In this case, the possibility of the occurrence of the interference can be reduced by accelerating the wave transmission timing of the ultrasonic wave. Therefore, in the data table of FIGS. 34A and 34B, when the distance value A1K>B2, the wave transmission timing of the ultrasonic wave is accelerated.

FIGS. 35A and 35B are an excerpt of a portion indicating an interference pattern when the distance value A1 is not measured in the data table according to the third modification, which is different from FIGS. 33A to 34B.

In a case where the data table of FIGS. 35A and 35B is used for the interference pattern detection process, when the distance value of B2K is not measured, and the distance value AIK and the distance value B2 are measured, the second detection unit 704 compares the distance value A1K with the distance value B2 to detect the interference pattern. In addition, the sonar control unit 702 determines the wave transmission condition by prioritizing the comparison result between the distance value A1K and the distance value B2 over the comparison result between the distance value ALE and the distance value B2E.

In the data table of FIGS. 35A and 35B, as in the data table of FIGS. 34A and 34B, when the distance value A1K>B2, the wave transmission timing of the ultrasonic wave is accelerated. Also, in the data table of FIGS. 35A and 35B, for the interference patterns other than the case where the distance value A1K>B2, the wave transmission conditions are determined based on substantially the same criteria as the data table of FIGS. 18A and 18B.

According to the above-described configuration of the present embodiment, the possibility of erroneous detection of an obstacle due to an interference wave can be reduced.

Some embodiments of the present disclosure are described, but these embodiments are presented as examples and are not intended to limit the scope of the disclosure. These embodiments can be implemented in various other forms, and various omissions, substitutions, and changes can be made without departing from the gist of the disclosure. If these embodiments and modifications thereof are included in the scope and gist of the disclosure, the embodiments and modifications are included in the disclosure described in the claims and the equivalent scope thereof in the same manner.

In addition, the denotation of the " . . . portion" in the above-described embodiment may be replaced with another denotation such as " . . . circuitry", " . . . assembly", " . . . device", " . . . unit", or " . . . module".

In each of the above embodiments, the present disclosure is described as an example of a configuration using hardware, but the present disclosure can also be realized by software in cooperation with hardware.

Also, each functional block used in the description of each above-described embodiment above is typically realized as an LSI which is an integrated circuit. The integrated circuit may control each functional block used in the description of the above embodiment and include an input terminal and an output terminal. These functional blocks may be individually integrated into one chip or may be integrated into one chip so as to include a part or all of the functional blocks. Although the LSI is used herein, the LSI may be referred to as an IC, a system LSI, a super LSI, or an ultra LSI depending on the degree of integration.

In addition, the circuit integration method is not limited to LSI and may be realized by using a dedicated circuit or a general-purpose processor and a memory. A field programmable gate array (FPGA) that can be programmed after manufacturing of the LSI or a reconfigurable processor in which connections or settings of circuit cells inside the LSI can be reconfigured may be used.

Further, when a circuit integration technology replacing the LSI appears due to the progress of the semiconductor technology or another derived technology, the functional blocks may be integrated using the technology. Application of biotechnology and the like is possible.

The obstacle detection device according to the present disclosure can reduce the possibility of erroneous detection of an obstacle due to an interference wave.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

What is claimed is:

1. An obstacle detection device comprising:
a transmission circuit, which, in operation, transmits a transmitted wave signal subjected to frequency modulation;
a reception circuit, which, in operation, receives a signal externally;
an object detection circuit, which, in operation, detects an object existing in a wave transmission direction of the transmitted wave signal, based on a reflected wave of the transmitted wave signal received by the reception circuit;
an interference detection circuit, which, in operation, detects, as interference, another transmitted wave signal transmitted from another transmission circuit different from the transmission circuit, based on the signal received by the reception circuit; and
a determination circuit, which, in operation, determines a frequency modulation pattern to be applied to the transmitted wave signal and a transmission timing of the transmitted wave signal, based on detection results of the object detection circuit and the interference detection circuit, wherein
the transmission circuit repeatedly transmits the transmitted wave signal,
the object detection circuit detects a change in a distance from the transmission circuit to the object based on the reflected wave repeatedly received by the reception circuit, and
the interference detection circuit detects a change in an interference position indicating a position from the transmission circuit to the interference, based on the signal repeatedly received by the reception circuit.

2. The obstacle detection device according to claim 1, wherein the determination circuit determines the frequency modulation pattern to be a first pattern, when the object is detected, and determines the frequency modulation pattern to be a second pattern different from the first pattern, when the object is not detected.

3. The obstacle detection device according to claim 1, wherein the determination circuit delays the transmission timing when it is detected that the interference position comes closer to the transmission circuit, and accelerates the transmission timing when it is detected that the interference position goes away from the transmission circuit.

4. The obstacle detection device according to claim 1, wherein the object detection circuit detects the object based on a change amount of signal intensity of the reflected wave and a first threshold corresponding to the change amount of the signal intensity of the reflected wave.

5. The obstacle detection device according to claim 4, wherein the interference detection circuit detects short-distance interference indicating the interference occurring near the transmission circuit and long-distance interference indicating the interference occurring far from the transmission circuit.

6. The obstacle detection device according to claim 5, wherein the interference detection circuit detects the short-distance interference based on the change amount of the signal intensity of the signal and a second threshold corresponding to the change amount of the signal intensity of the signal, and a third threshold for detecting the long-distance interference based on the change amount of the signal intensity of the signal and the third threshold corresponding to the change amount of the signal intensity of the signal is different from the second threshold.

7. The obstacle detection device according to claim 6, wherein the second threshold is a value larger than the first threshold, and the third threshold is a value smaller than the first threshold.

8. An obstacle detection method by an obstacle detection device including a transmission circuit, which, in operation, transmits a transmitted wave signal subjected to frequency modulation and a reception circuit, which, in operation, receives a signal externally, the method comprising:

detecting an object existing in a wave transmission direction of the transmitted wave signal, based on a reflected wave of the transmitted wave signal received by the reception circuit;

detecting, as interference, another transmitted wave signal transmitted from another transmission circuit different from the transmission circuit, based on the signal received by the reception circuit; and determining a frequency modulation pattern to be applied to the transmitted wave signal and a transmission timing of the transmitted wave signal, based on a detection result of the object and a detection result of the interference, wherein the transmission circuit repeatedly transmits the transmitted wave signal, a change in a distance from the transmission circuit to the object is detected based on the reflected wave repeatedly received by the reception circuit, and a change in an interference position indicating a position from the transmission circuit to the interference is detected based on the signal repeatedly received by the reception circuit.

9. The obstacle detection method according to claim 8, wherein the frequency modulation pattern is determined to be a first pattern, when the object is detected, and the frequency modulation pattern is determined to be a second pattern different from the first pattern, when the object is not detected.

10. The obstacle detection method according to claim 8, wherein the transmission timing is delayed when it is detected that the interference position comes closer to the transmission circuit, and the transmission timing is accelerated when it is detected that the interference position goes away from the transmission circuit.

11. The obstacle detection method according to claim 8, wherein the object is detected based on a change amount of signal intensity of the reflected wave and a first threshold corresponding to the change amount of the signal intensity of the reflected wave.

12. The obstacle detection method according to claim 11, wherein short-distance interference indicating interference occurring near the transmission circuit and long-distance interference indicating interference occurring far from the transmission circuit are detected.

13. The obstacle detection method according to claim 12, wherein the short-distance interference is detected based on a change amount of signal intensity of the signal and a second threshold corresponding to a change amount of signal intensity of the signal, and a third threshold for detecting the long-distance interference based on the change amount of the signal intensity of the signal and the third threshold corresponding to the change amount of the signal intensity of the signal is different from the second threshold.

14. The obstacle detection method according to claim 13, wherein the second threshold is a value larger than the first threshold, and the third threshold is a value smaller than the first threshold.

15. A non-transitory computer-readable medium on which programmed instructions to be executed by a computer of an obstacle detection device including a transmission circuit, which, in operation, transmits a transmitted wave signal subjected to frequency modulation and a reception circuit, which, in operation, receives a signal externally, are stored, wherein the programmed instructions, when executed by the computer, cause the computer to perform:

detecting an object existing in a wave transmission direction of the transmitted wave signal based on a reflected wave of the transmitted wave signal received by the reception circuit;

detecting, as interference, another transmitted wave signal transmitted from another transmission circuit different from the transmission circuit, based on the signal received by the reception circuit; and determining a frequency modulation pattern to be applied to the transmitted wave signal and a transmission timing of the transmitted wave signal, based on a detection result of the object and a detection result of the interference, wherein the transmission circuit repeatedly transmits the transmitted wave signal, a change in a distance from the transmission circuit to the object is detected based on the reflected wave repeatedly received by the reception circuit, and a change in an interference position indicating a position from the transmission circuit to the interference is detected based on the signal repeatedly received by the reception circuit.

* * * * *